United States Patent
Ikeda et al.

(10) Patent No.: US 10,528,213 B2
(45) Date of Patent: Jan. 7, 2020

(54) INFORMATION PROCESSING DEVICE AND INFORMATION PROCESSING METHOD

(71) Applicant: SONY CORPORATION, Tokyo (JP)

(72) Inventors: Tetsuo Ikeda, Tokyo (JP); Kuniaki Torii, Kanagawa (JP); Naoyuki Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 149 days.

(21) Appl. No.: 15/315,007

(22) PCT Filed: May 28, 2015

(86) PCT No.: PCT/JP2015/065349
§ 371 (c)(1),
(2) Date: Nov. 30, 2016

(87) PCT Pub. No.: WO2015/194341
PCT Pub. Date: Dec. 23, 2015

(65) Prior Publication Data
US 2017/0199627 A1    Jul. 13, 2017

(30) Foreign Application Priority Data

Jun. 20, 2014   (JP) .................................. 2014-127388

(51) Int. Cl.
*G06F 21/31*   (2013.01)
*G06F 3/0481*  (2013.01)
(Continued)

(52) U.S. Cl.
CPC .......... *G06F 3/0481* (2013.01); *G06F 3/0482* (2013.01); *G06F 3/0483* (2013.01); *G06F 3/1431* (2013.01); *G06F 21/31* (2013.01); *G06F 21/84* (2013.01); *G06Q 20/401* (2013.01); *G09G 3/001* (2013.01); *G06F 3/04817* (2013.01); *G06F 2203/04803* (2013.01); *G06F 2221/032* (2013.01); *G09G 5/14* (2013.01); *G09G 2354/00* (2013.01); *G09G 2358/00* (2013.01); *G09G 2370/022* (2013.01)

(58) Field of Classification Search
CPC combination set(s) only.
See application file for complete search history.

(56) References Cited

U.S. PATENT DOCUMENTS 5,107,443 A * 4/1992 Smith ................... G06Q 10/10
                                                    713/166
8,490,157 B2 * 7/2013 Thompson .......... G06F 21/6218
                                                    726/2
(Continued)

FOREIGN PATENT DOCUMENTS

JP      05-020011 A    1/1993
JP      2006-065558 A  3/2006
(Continued)

*Primary Examiner* — Hien L Duong
(74) *Attorney, Agent, or Firm* — Chip Law Group

(57) ABSTRACT

There is provided an information processing device including: a user information management unit configured to set a user in a window in which an operation screen of an application is displayed and grant at least one of execution authority of the application set in the window according to the user and browsing authority of content in the window to the window.

20 Claims, 32 Drawing Sheets

(51) Int. Cl.
  *G06F 3/0482* (2013.01)
  *G06F 3/0483* (2013.01)
  *G06Q 20/40* (2012.01)
  *G06F 3/14* (2006.01)
  *G06F 21/84* (2013.01)
  *G09G 3/00* (2006.01)
  *G09G 5/14* (2006.01)

(56) References Cited

U.S. PATENT DOCUMENTS

| | | | | |
|---|---|---|---|---|
| 8,522,308 | B2* | 8/2013 | Stinson, III | G06F 3/011 |
| | | | | 713/186 |
| 2006/0075106 | A1* | 4/2006 | Hochmuth | H04L 67/125 |
| | | | | 709/227 |
| 2007/0017976 | A1* | 1/2007 | Peyret | G06Q 20/10 |
| | | | | 235/380 |
| 2009/0106667 | A1* | 4/2009 | Lyle | G06F 3/0488 |
| | | | | 715/750 |
| 2010/0223673 | A1* | 9/2010 | Scott | G06F 21/6218 |
| | | | | 726/28 |
| 2013/0097668 | A1* | 4/2013 | Park | G06F 21/31 |
| | | | | 726/2 |
| 2013/0268480 | A1* | 10/2013 | Dorman | G06F 16/1787 |
| | | | | 707/608 |
| 2013/0305354 | A1* | 11/2013 | King | G06F 21/31 |
| | | | | 726/19 |
| 2014/0068755 | A1* | 3/2014 | King | G06F 21/53 |
| | | | | 726/19 |
| 2015/0067320 | A1* | 3/2015 | Chatterton | G06F 21/31 |
| | | | | 713/100 |
| 2015/0135108 | A1* | 5/2015 | Pope | G06K 9/00006 |
| | | | | 715/767 |

FOREIGN PATENT DOCUMENTS

| | | |
|---|---|---|
| JP | 2008-269044 A | 11/2008 |
| JP | 2012-529099 A | 11/2012 |
| JP | 2014-056345 A | 3/2014 |
| WO | 2013/108349 A1 | 7/2013 |

\* cited by examiner

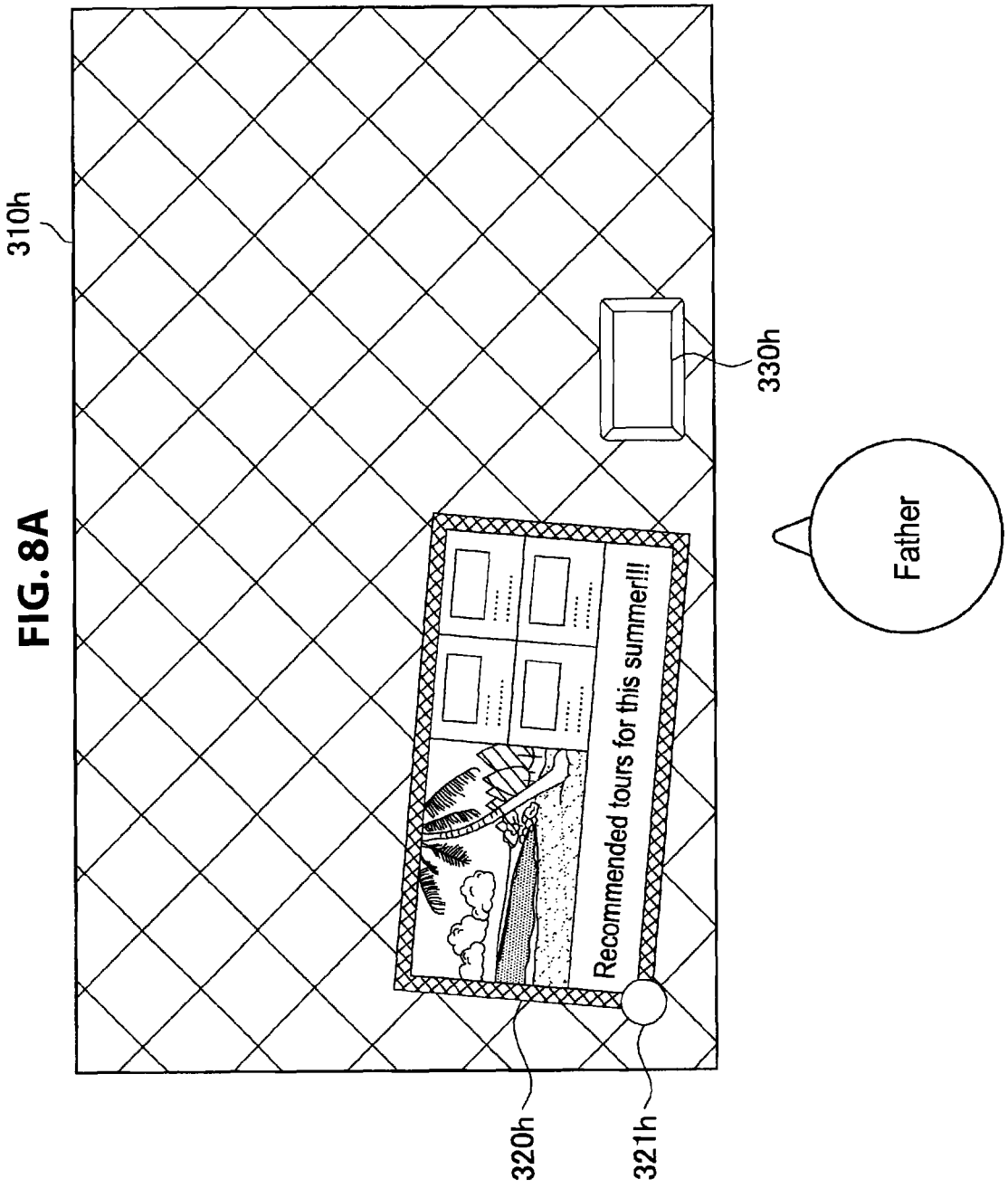

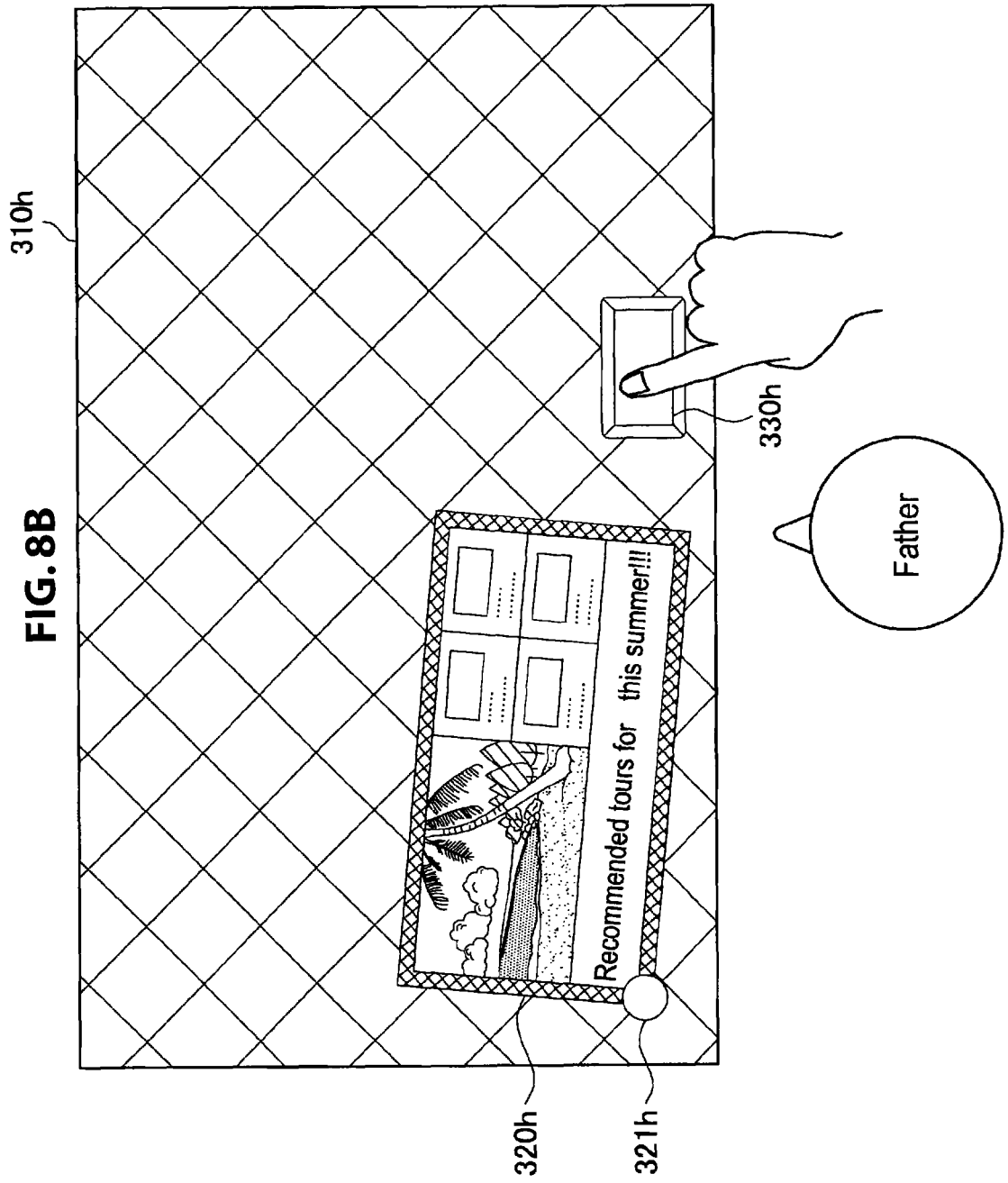

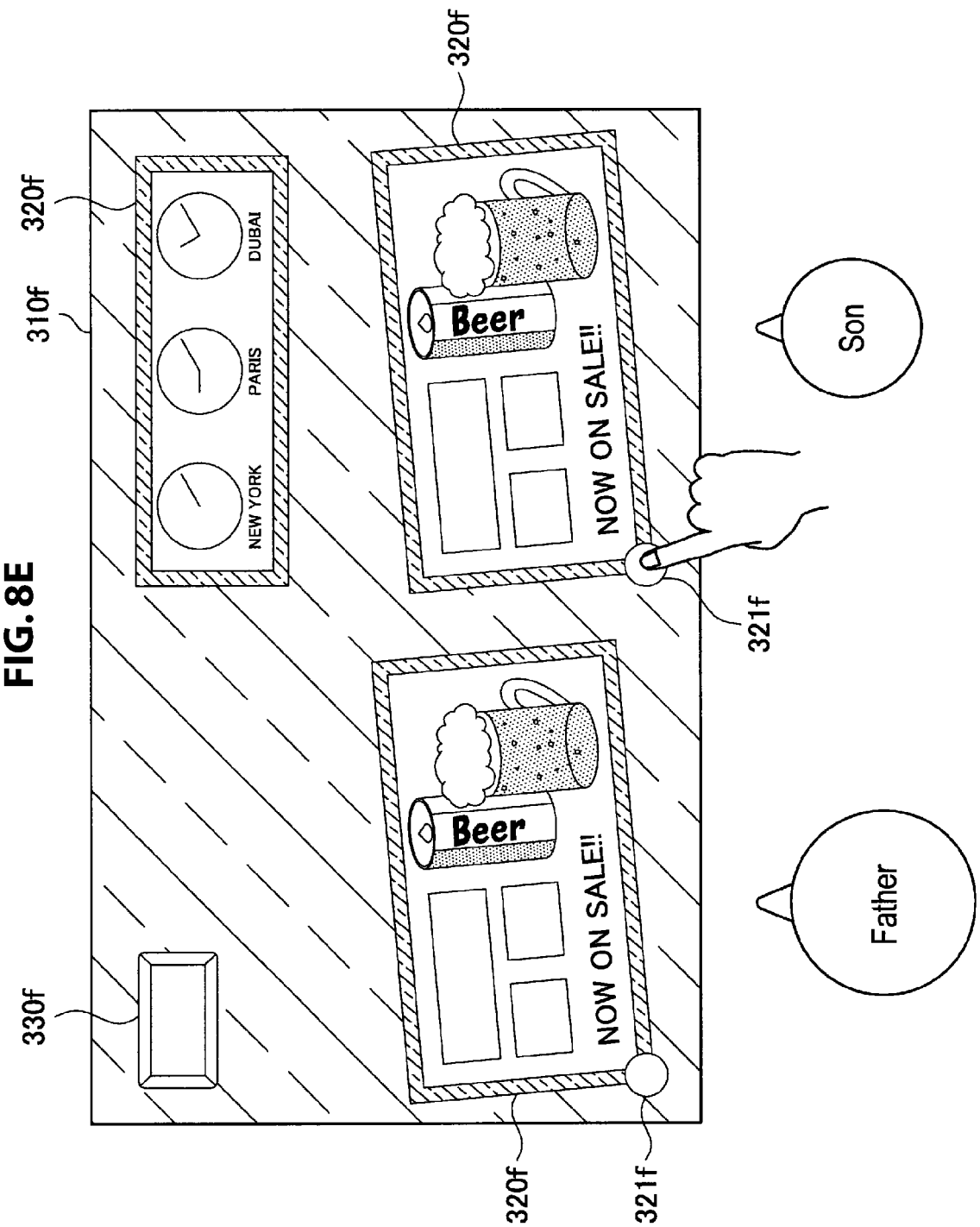

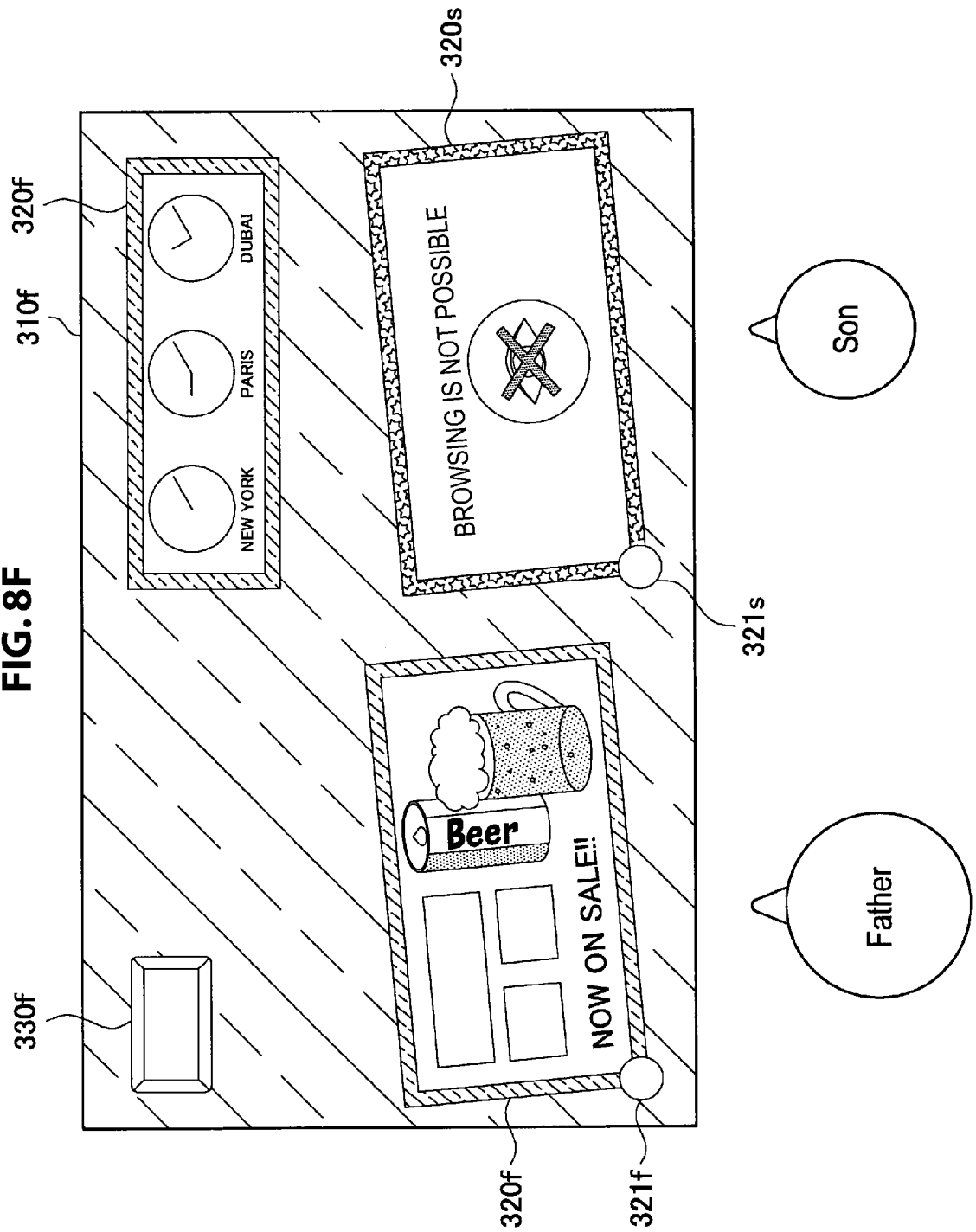

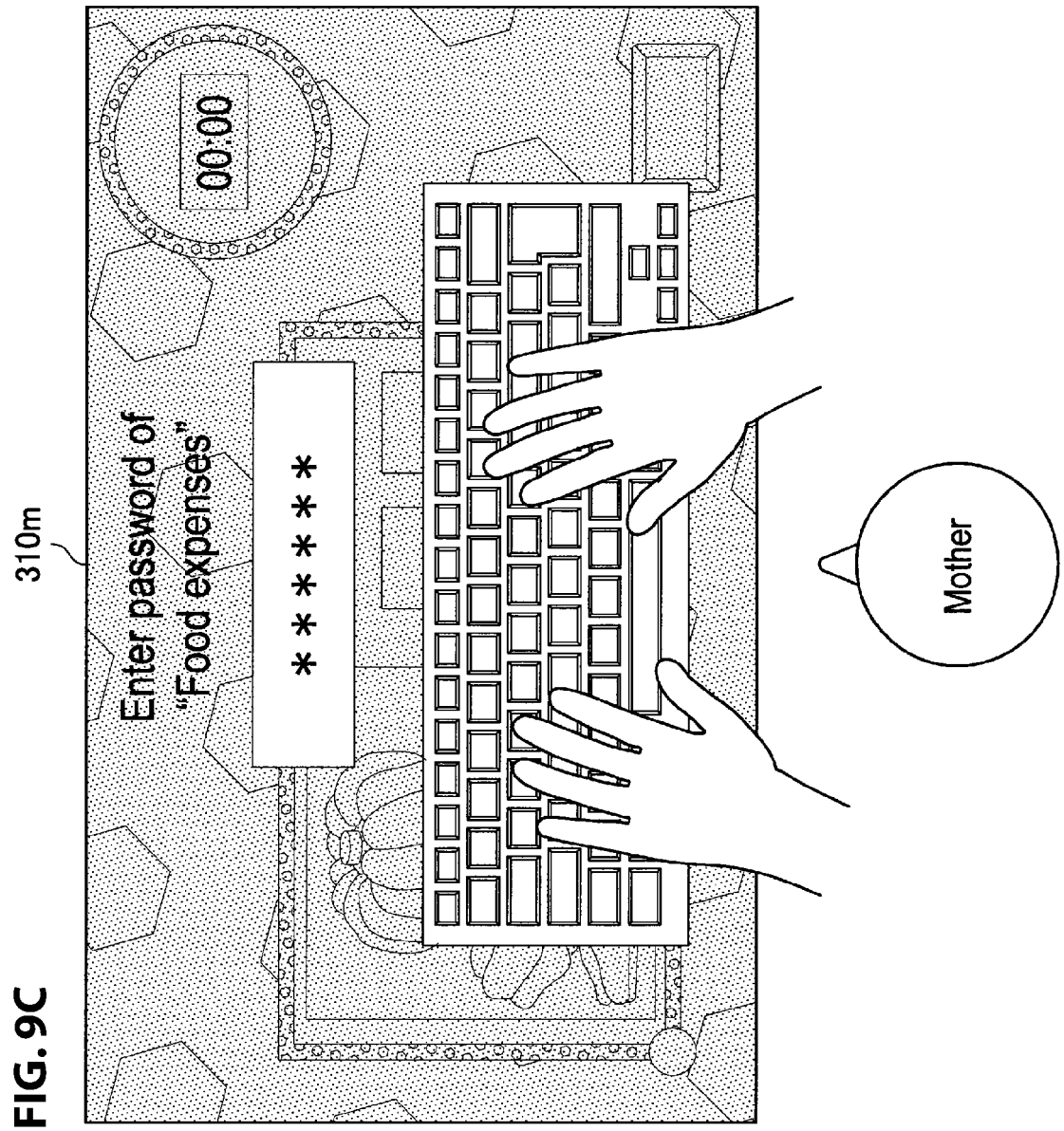

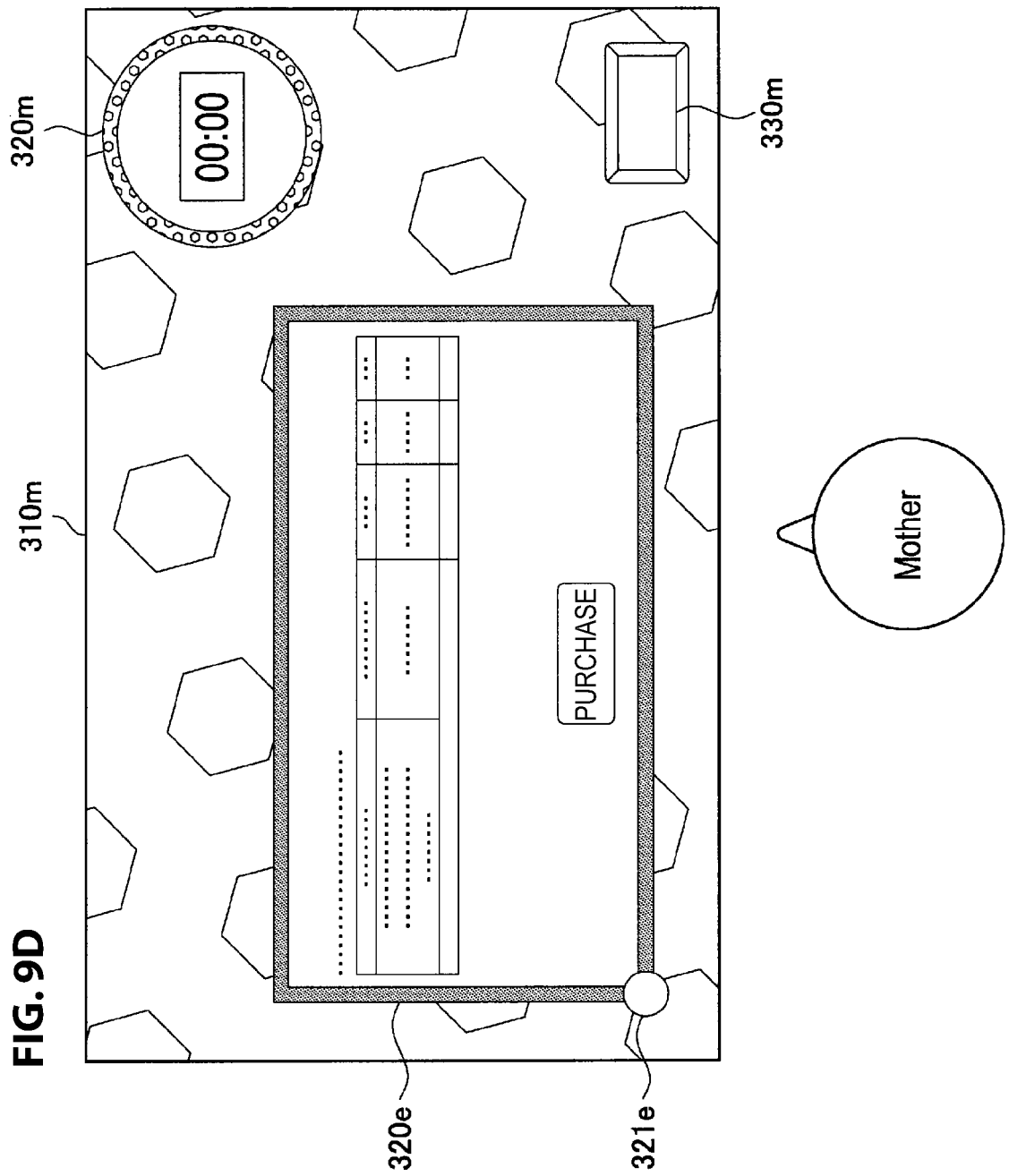

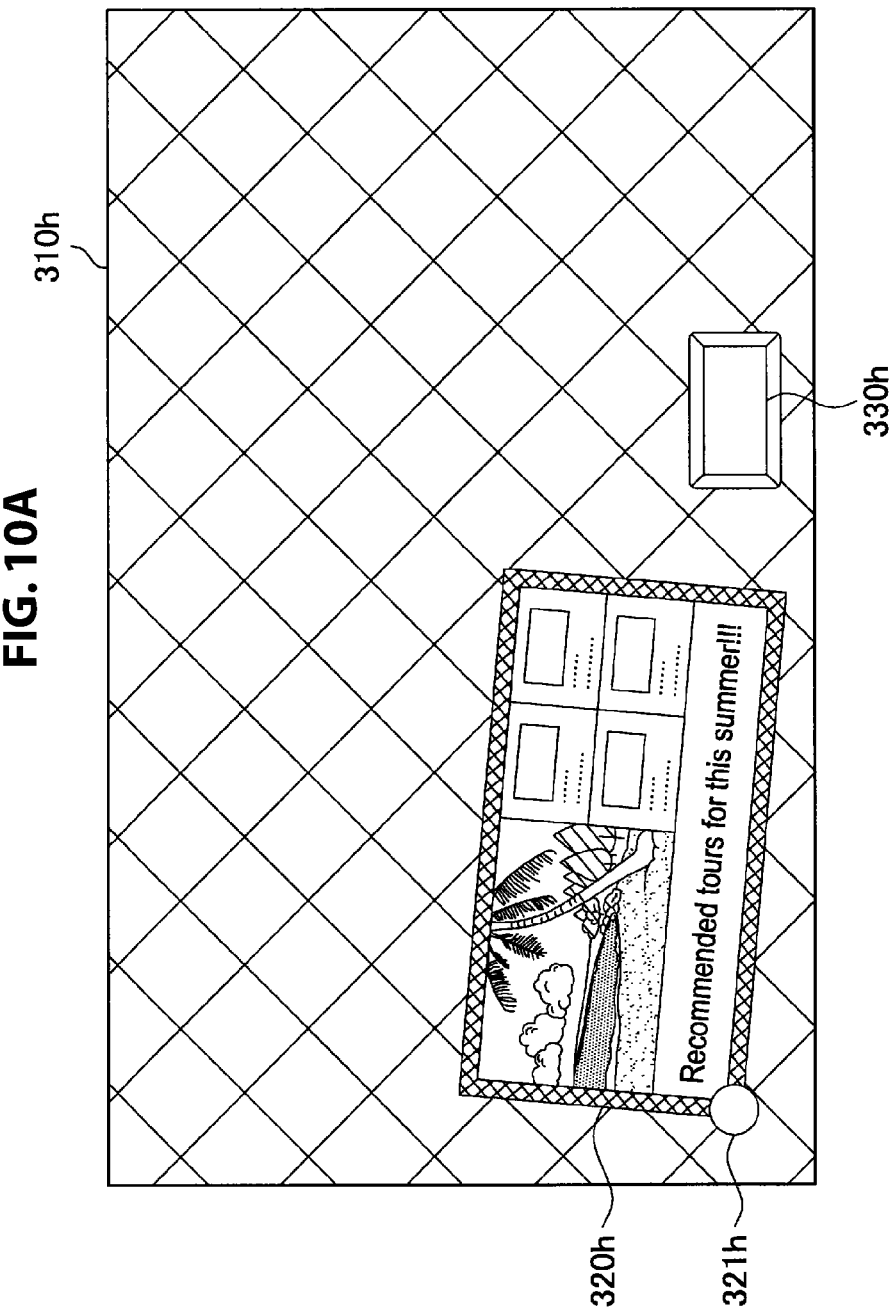

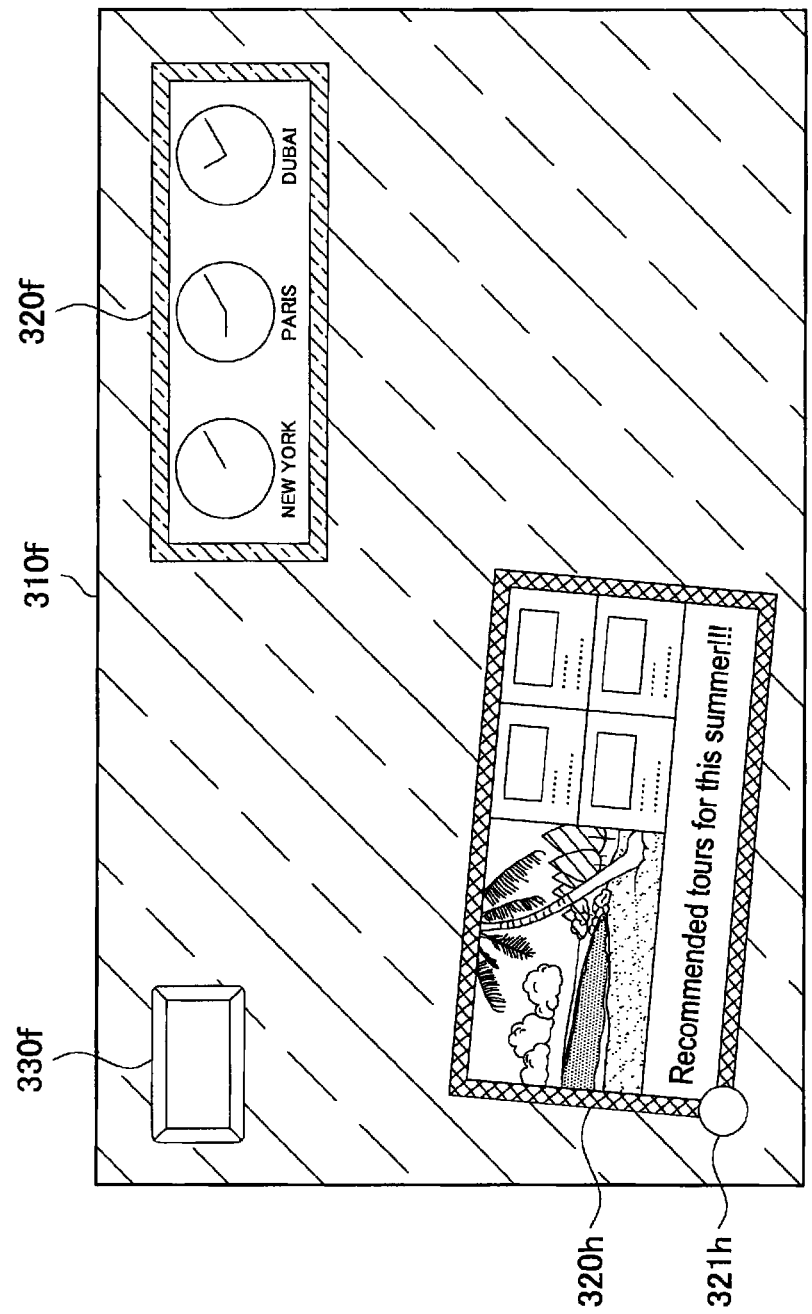

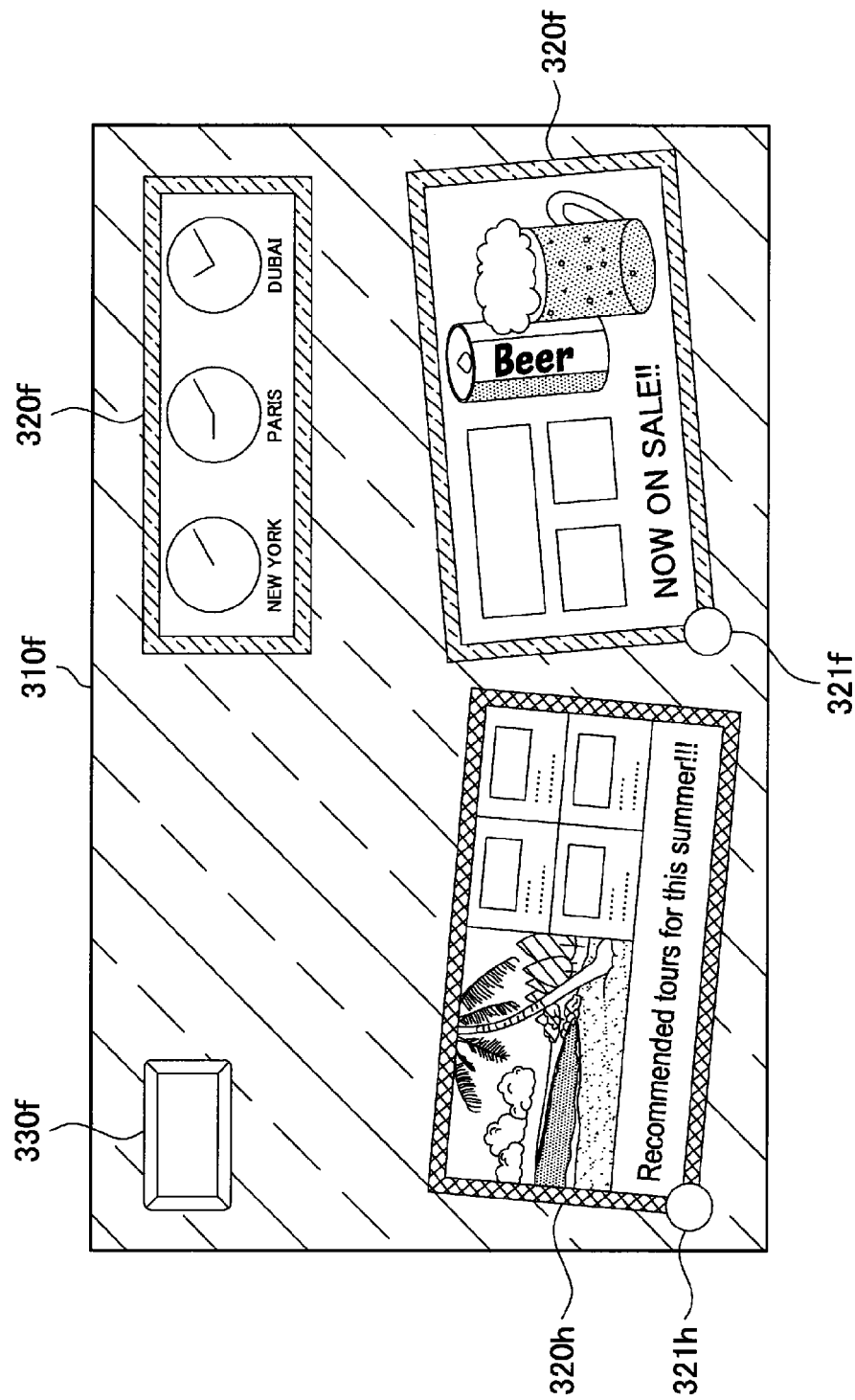

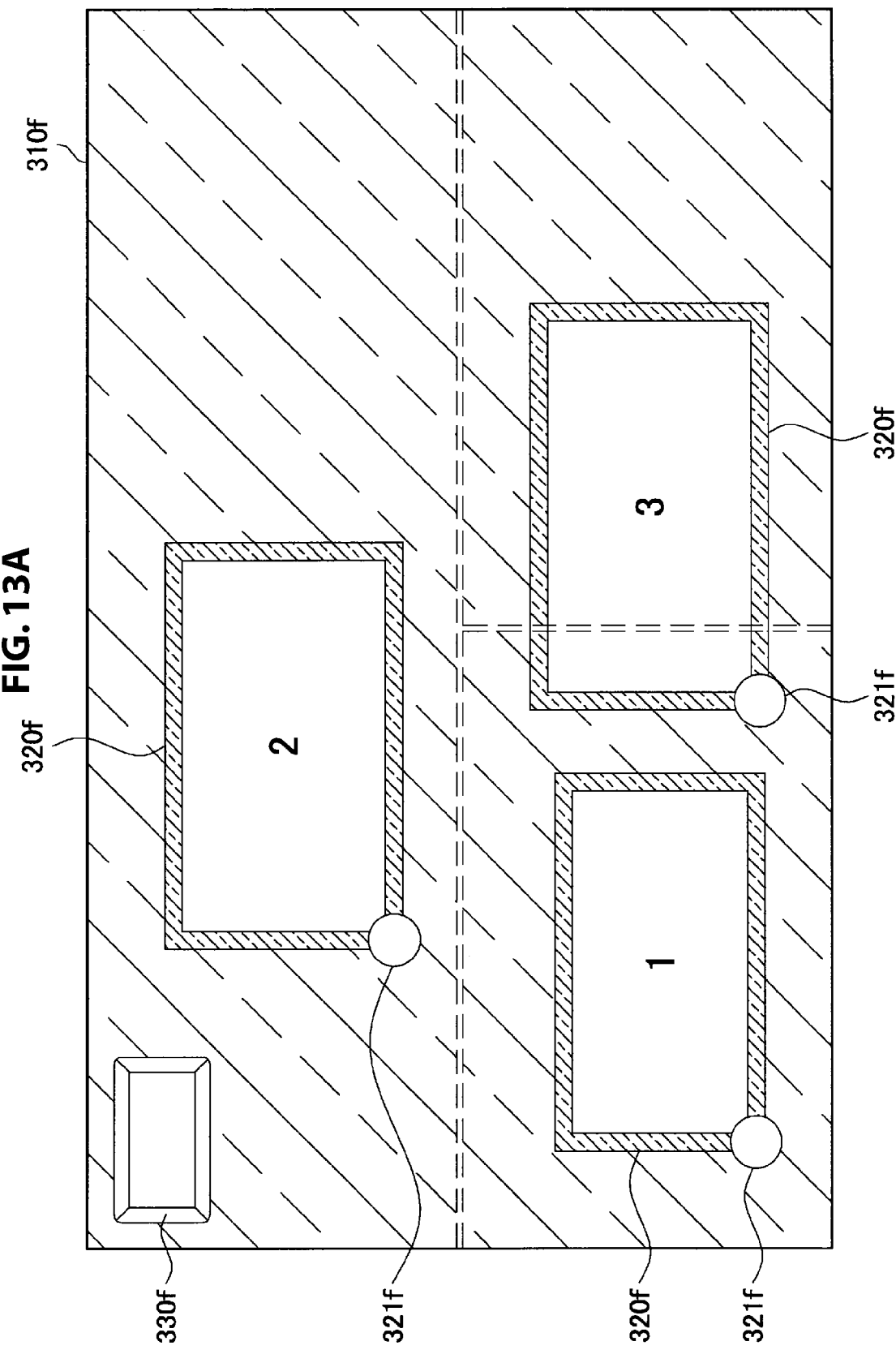

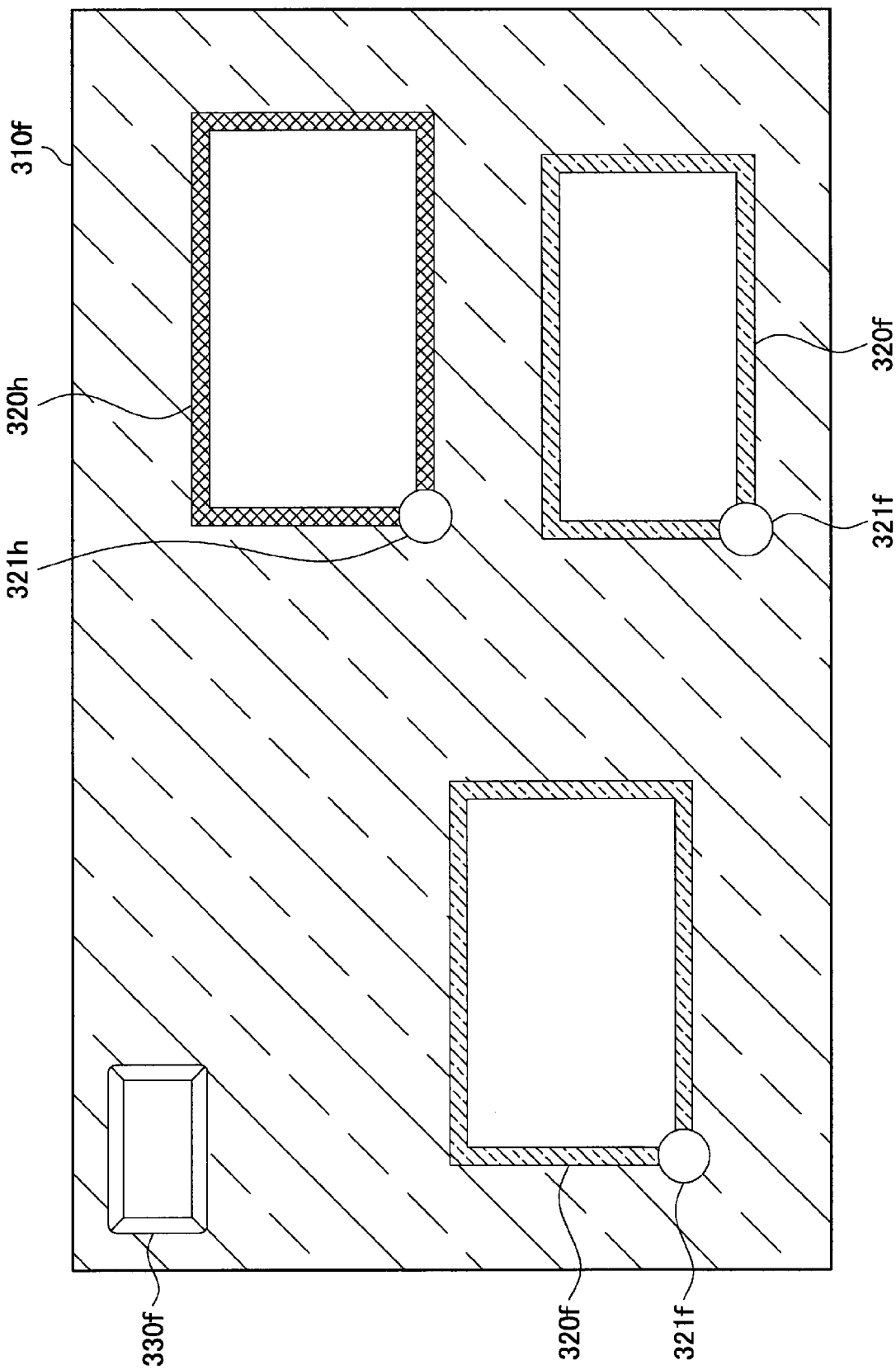

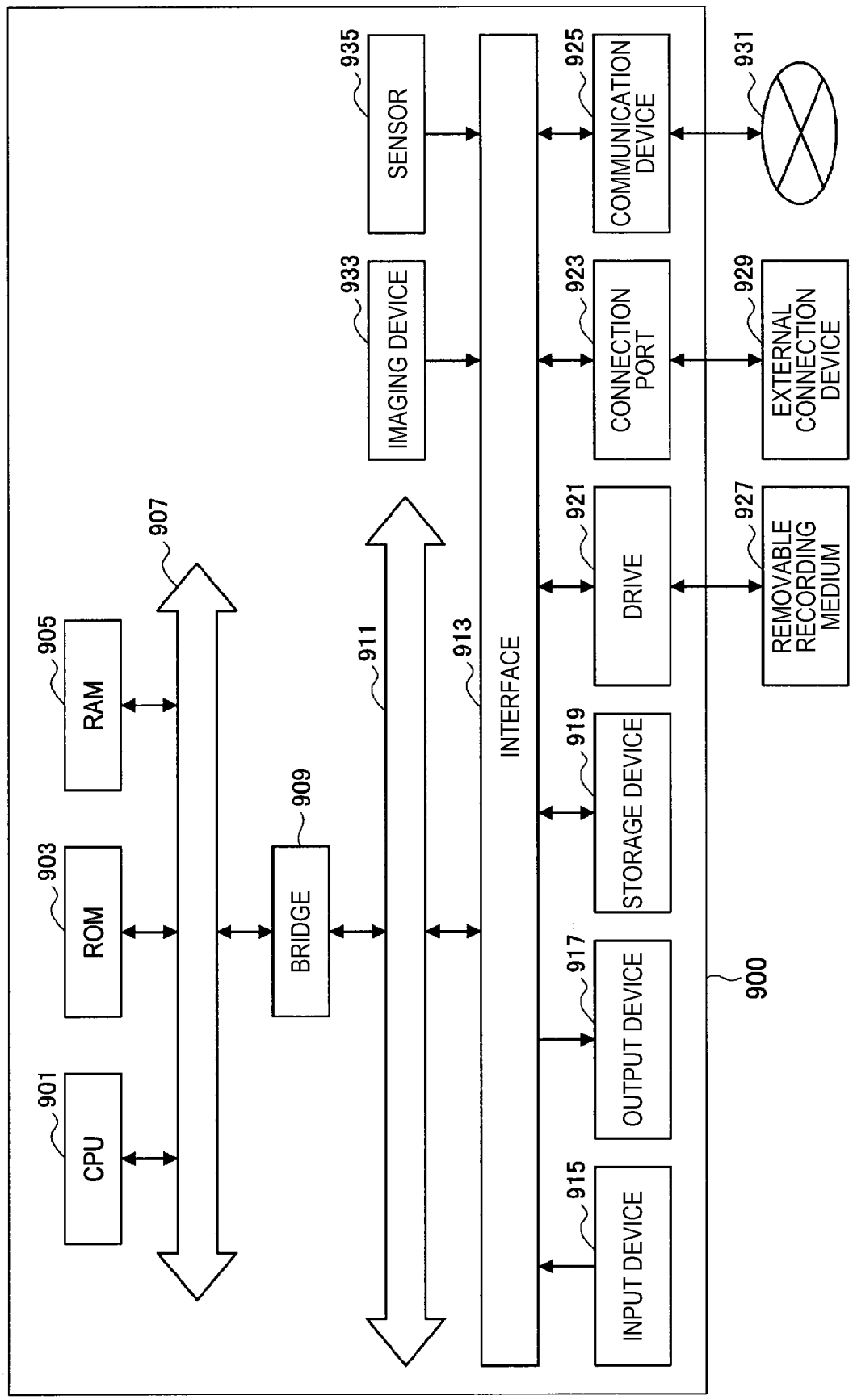

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2015/065349 filed on May 28, 2015, which claims priority benefit of Japanese Patent Application No. JP 2014-127388 filed in the Japan Patent Office on Jun. 20, 2014. The above-referenced applications is hereby incorporated herein by reference in its entirety.

TECHNICAL FIELD

The present disclosure relates to an information processing device, an information processing method, and a program.

BACKGROUND ART

When information processing devices such as personal computers (PCs) are used, a plurality of display regions (so-called windows) are generally displayed simultaneously on display screens of display devices or the like. For example, Patent Literature 1 discloses a technology for displaying windows on a display screen so that the windows are superimposed sequentially with predetermined priorities.

CITATION LIST

Patent Literature

Patent Literature 1: JP H8-20011A

SUMMARY OF INVENTION

Technical Problem

In recent years, methods of using information processing devices have diversified. For example, use methods of sharing one display screen between a plurality of users using a relatively large-scale display have been proposed. In such use methods, there is a possibility of a window used by one user, a window used by other users, and windows used together by a plurality of users coexisting on a display screen. Thus, there is a concern of convenience for the users deteriorating if management of the windows is not appropriately executed. In Patent Literature 1, a use method of sharing a display screen between a plurality of users is not considered and display of windows in such use methods has not been sufficiently examined.

In view of the foregoing circumstances, more appropriate display control is necessary in consideration of convenience for users in technologies for displaying windows on a display screen. Accordingly, according to the present disclosure, it is desirable to propose a novel and improved information processing information, a novel and improved information method, and a novel and improved program capable of further improving convenience for users.

Solution to Problem

According to the present disclosure, there is provided an information processing device including: a user information management unit configured to set a user in a window in which an operation screen of an application is displayed and grant at least one of execution authority of the application set in the window according to the user and browsing authority of content in the window to the window.

According to the present disclosure, there is provided an information processing method including: by a processor, setting a user in a window in which an operation screen of an application is displayed and granting at least one of execution authority of the application set in the window according to the user and browsing authority of content in the window to the window.

According to the present disclosure, there is provided a program causing a processor of a computer to realize: a function of setting a user in a window in which an operation screen of an application is displayed and granting at least one of execution authority of the application set in the window according to the user and browsing authority of content in the window to the window.

According to the present disclosure, a user is set for each window in a display screen. The execution authority and/or the browsing authority is set for each window according to the user set in the window. Accordingly, even when the display screen is shared between the plurality of users, a restriction can be appropriately imposed on a process executable for each window, and thus it is possible to improve convenience for the users.

Advantageous Effects of Invention

According to the present disclosure, as described above, it is possible to further improve convenience for users. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8A is a diagram showing an example of a display screen which can be realized by the information processing system.

FIG. 8B is a diagram showing an example of a display screen which can be realized by the information processing system.

FIG. 8E is a diagram showing an example of a display screen which can be realized by the information processing system.

FIG. 8F is a diagram showing an example of a display screen which can be realized by the information processing system.

FIG. 9C is a diagram showing another example of the display screen which can be realized by the information processing system.

FIG. 9D is a diagram showing another example of the display screen which can be realized by the information processing system.

FIG. 10A is a diagram showing an example of a display screen to which display of a window is handed over in a modification example when a system user is switched.

FIG. 10B is a diagram showing an example of a display screen to which display of a window is handed over in a modification example when a system user is switched.

FIG. 11A is a diagram showing an example of a display screen on which display control is executed in consideration of authority set for each system user in a modification example when the display of the window is handed over.

FIG. 13A is a diagram showing an example of a display screen on which display control is executed in consideration of use regions in a modification example when display of a window is handed over.

FIG. 15A is a diagram showing an example of a display screen on which display details of the window are hidden due to approach of a person in a modification example.

FIG. 18 is a block diagram showing an example of a hardware configuration of an information processing system according to an embodiment.

DESCRIPTION OF EMBODIMENT(S)

Figure 1:
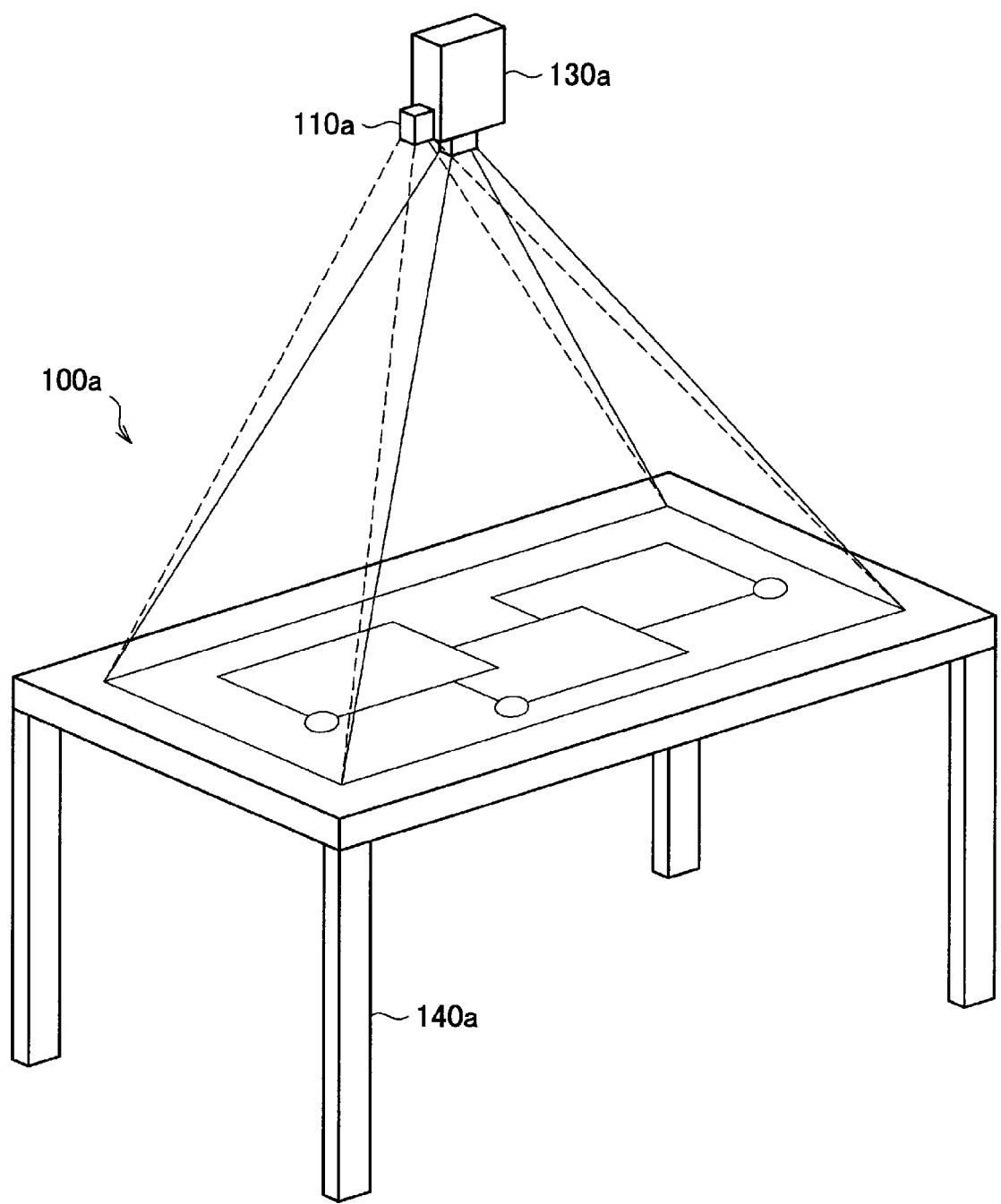
FIG. 1 is a diagram showing an example of the configuration of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be made in the following order.
1. Overview of information processing system
1-1. Configuration example
1-2. Display control example
2. Functional configuration of information processing system
3. Information processing method
4. Display examples
4-1. First display example
4-2. Second display example
5. Modification examples
5-1. Handover of display of window
5-2. Setting of window user in accordance with display position
5-3. Iconization in accordance with display position when display of window is handed over
5-4. Display of window management bar
5-5. Hiding of display details of window in accordance with approach of person
5-6. Display of window user in tab
5-7. Cooperation of plurality of information processing systems
6. Hardware configuration
7. Supplement 1. Overview of Information Processing System (1-1. Configuration Example)

The configuration of an information processing system according to an embodiment of the present disclosure will be described with reference to FIG. 1. FIG. 1 is a diagram showing an example of the configuration of an information processing system according to an embodiment of the present disclosure. In the present specification, a system means a configuration for realizing a predetermined process. The entire system can be considered to be one device. The system can also be considered to be configured by a plurality of devices. The information processing system according to the present embodiment shown in FIG. 1 may be configured to be able to execute a predetermined process (for example, a process realized by a functional configuration shown in FIG. 6) in the entire information processing system and any configuration in the information processing system may be considered to be one device.

Referring to FIG. 1, an information processing system 100a according to an embodiment of the present disclosure includes an input unit 110a and an output unit 130a.

The output unit 130a visually notifies a user of various kinds of information by displaying the information on a table 140a. For example, a projector is used as the output unit 130a. As shown in the drawing, the output unit 130a is suspended above the table 140a from, for example, a ceiling to be disposed at a predetermined distance from the table 140a and projects information to a top surface of the table 140a. A scheme of displaying information on the top surface of the table 140a from the upper side in this way is also referred to as a "projection type."

In the following description, an entire region in which information is displayed by the output unit 130a is also referred to as a display screen. For example, the output unit 130a displays information presented to the user as the information processing system 100a executes an application on the display screen. The displayed information is, for example, an operation screen of each application. Hereinafter, each display region in which such an operation screen of an application is displayed on the display screen is also referred to as a window. For example, the output unit 130a displays a so-called graphical user interface (GUI) component (widget) that receives various manipulations, such as selection and input, by the user, such as a button, a slider, a check box, a text box, and a keyboard, on the display screen. The window can be considered as one of the GUI components. In the present specification, however, to distinguish the window from other GUI components, the window is not included as a GUI component for convenience and display elements other than the window are referred to as GUI components.

Here, when the information processing system 100a is of a projection type, the output unit 130a may include an illumination device. When the output unit 130a includes an illumination device, the information processing system 100a may control an on or off state or the like of the illumination device based on details of information input through the input unit 110a and/or details of information displayed by the output unit 130a.

The output unit 130a may include a speaker or may output various kinds of information as audio. When the output unit 130a is configured of a speaker, the number of speakers may be singular or plural. When the output unit 130a is configured of a plurality of speakers, the information processing system 100a may restrict the speakers outputting audio or adjust a direction in which audio is output.

The input unit 110a is a device that inputs manipulation details of the user using the information processing system 100a. In the example shown in FIG. 1, the input unit 110a is installed to be suspended above the table 140a from, for example, a ceiling. In this way, the input unit 110a is installed to be distant from the table 140a which is a target on which information is displayed. The input unit 110a can be configured of an imaging device capable of photographing the top surface of the table 140a, that is, a display screen. As the input unit 110a, for example, a camera that images the table 140a with one lens can be used or a stereo camera capable of imaging the table 140a with two lenses to record information in a depth direction can be used. When the input unit 110a is a stereo camera, for example, a visible-light camera or an infrared camera can be used.

When a camera that images the table 140a with one lens is used as the input unit 110a, the information processing system 100a can detect an object located on the table 140a, for example, the position of a hand of the user, by analyzing an image (captured image) captured by the camera. When a stereo camera is used as the input unit 110a, the information processing system 100a can acquire not only positional information of an object located on the table 140a but also depth information of the object by analyzing an image captured by the stereo camera. Based on the depth information, the information processing system 100a can detect touch or approach of a hand of the user on or to the table 140a in a height direction and can detect separation of the hand from the table 140a. In the following description, a user touching or approaching information on a display screen with a manipulator such as a hand is also collectively referred to simply as "touch."

In the embodiment, the position of a manipulator, for example, a hand of the user, on a display screen (that is, the top surface of the table 140a) is detected based on a image captured by the input unit 110a and various kinds of information are input based on the detected position of the manipulator. That is, the user can execute various manipulation inputs by moving the manipulator on the display screen. For example, by detecting touch of a hand of the user on the window or a GUI component, a manipulation input on the window or the GUI component is executed. In the following description, for example, a case in which a hand of the user is used as a manipulator will be described. However, the embodiment is not limited to this example. Any of various manipulation members such as a stylus may be used as a manipulator.

When the input unit 110a is configured of an imaging device, the input unit 110a may photograph the top surface of the table 140a and may also photograph a user near the table 140a. For example, the information processing system 100a can detect the position of the user near the table 140a based on a captured image. For example, the information processing system 100a may execute personal recognition of the user by extracting physical features, such as the size of the face or body of the user contained in the captured image, by which a personal user can be identified.

Here, the embodiment is not limited to this example, but a manipulation input by the user may be executed in accordance with another method. For example, the input unit 110a may be installed as a touch panel on the top surface of the table 140a and a manipulation input by the user may be detected by touch of a finger or the like of the user on the touch panel. A manipulation input by the user may be detected in accordance with a gesture on the imaging device of which the input unit 110a is configured. Alternatively, the input unit 110a may include an audio input device such as a microphone that collects vocalizations uttered by the user or environmental sounds of a surrounding environment. A microphone array collecting audio in a specific direction can be appropriately used as the audio input device. The microphone array can be configured such that an audio collection direction can be adjusted in any direction. When the audio input device is used as the input unit 110a, a manipulation input may be executed by collected audio. The information processing system 100a may execute the personal recognition based on the audio by analyzing the collected audio. Alternatively, the input unit 110a may be configured of a remote control device (so-called remote controller). In the remote controller, a predetermined instruction may be input when a predetermined button disposed on the remote controller is manipulated. Alternatively, a predetermined instruction may be input when a sensor such as an acceleration sensor or a gyro sensor mounted on the remote controller detects a motion or a posture of the remote controller and the user manipulates the remote controller. Further, the information processing system 100a may include another input device such as a mouse, a keyboard, a button, a switch or a lever (none of which is shown) as the input unit 110a. A manipulation by the user may be input via such an input device.

The configuration of the information processing system 100a according to the embodiment has been described above with reference to FIG. 1. Although not shown in FIG. 1, another device may be connected to the information processing system 100a. For example, an illumination device that illuminates the table 140a may be connected to the information processing system 100a. The information processing system 100a may also control an on state of the illumination device according to a state of a display screen.

Figure 2:
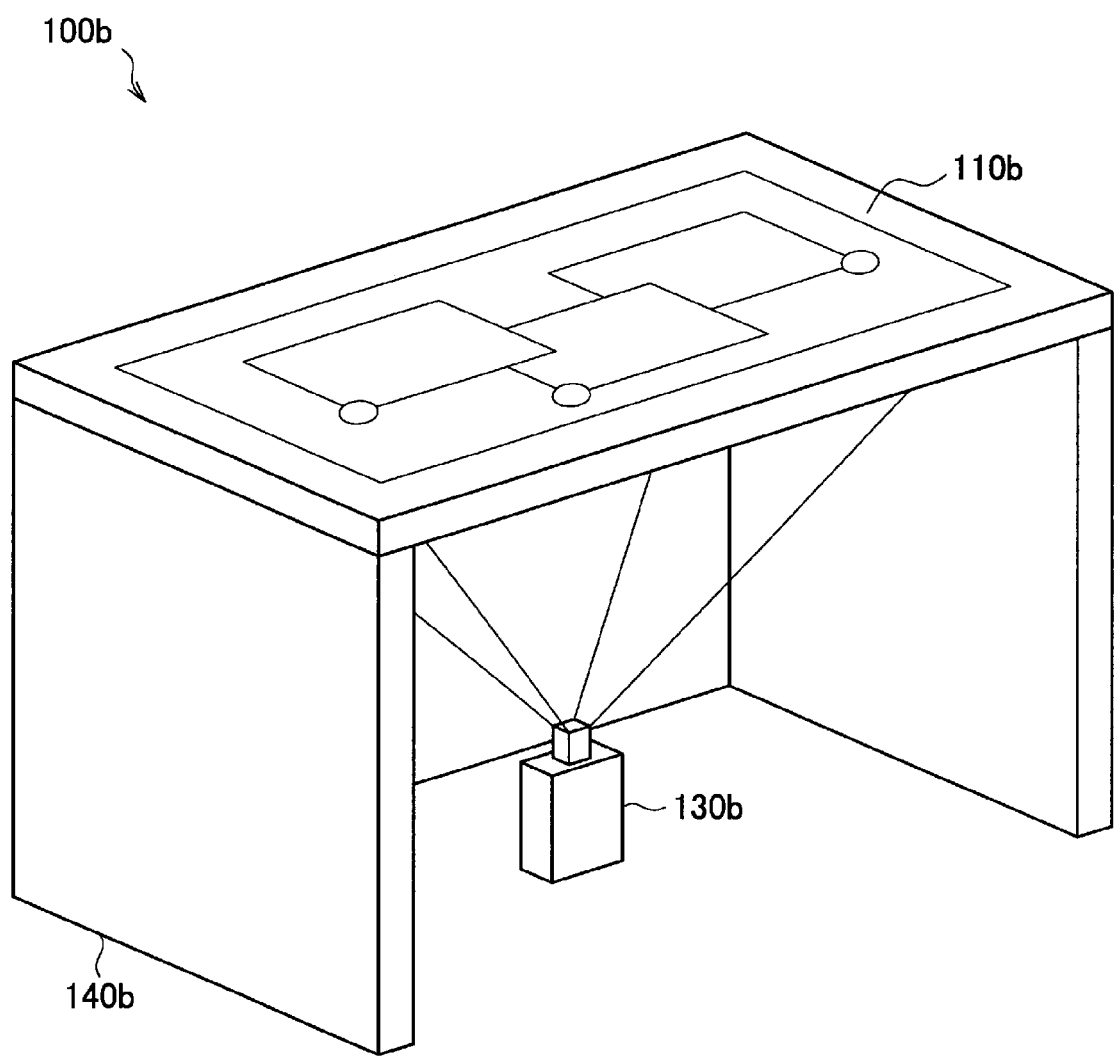
FIG. 2 is a diagram showing another example of the configuration of the information processing system according to the embodiment.
Figure 3:
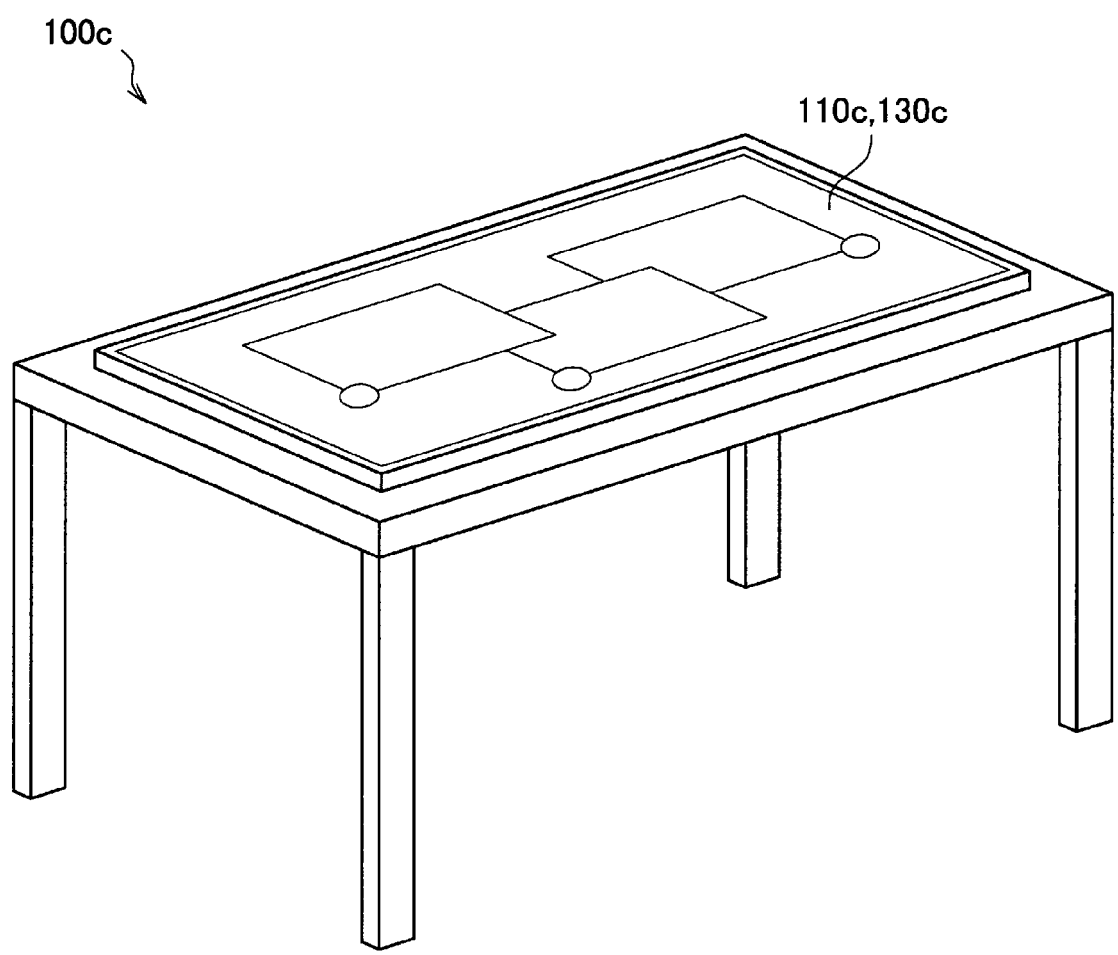
FIG. 3 is a diagram showing another example of the configuration of the information processing system according to the embodiment.
Figure 4:
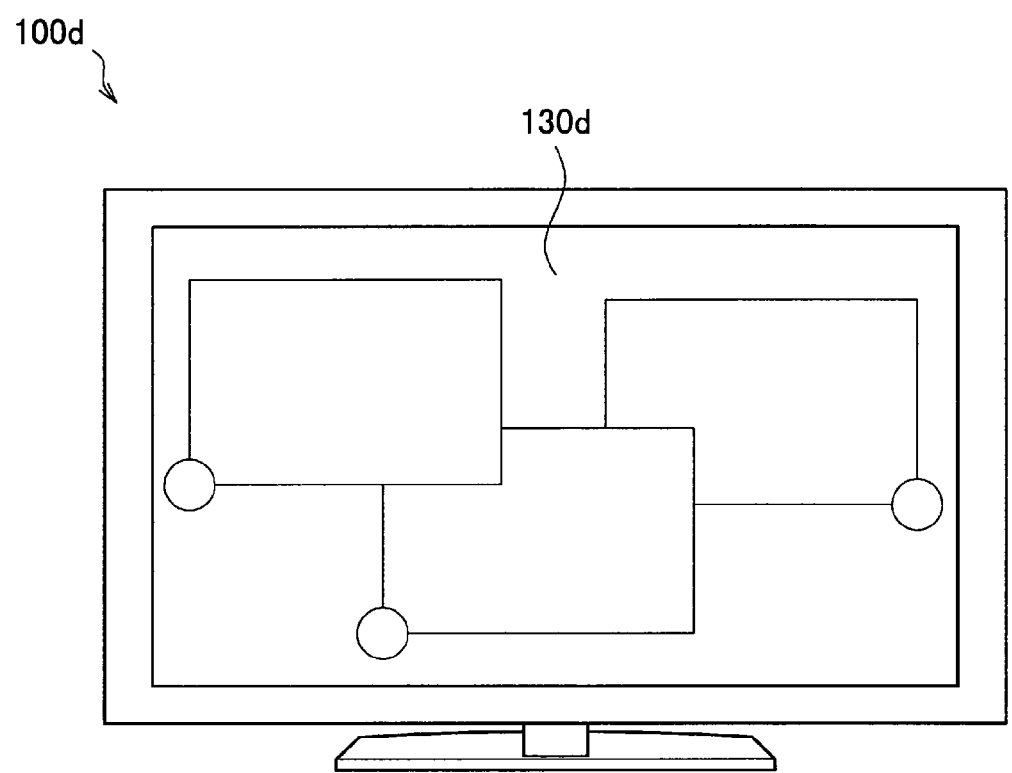
FIG. 4 is a diagram showing another example of the configuration of the information processing system according to the embodiment.

Here, in the embodiment, the configuration of the information processing system is not limited to the configuration shown in FIG. 1. The information processing system according to the embodiment may include an output unit that displays various kinds of information on a display screen and an input unit that is capable of receiving at least a manipulation input on the displayed information, and the specific configuration is not limited. Other examples of the configuration of the information processing system according to the embodiment will be described with reference to FIGS. 2 to 4. FIGS. 2 to 4 are diagrams showing other examples of the configuration of the information processing system according to the embodiment.

In an information processing system 100b shown in FIG. 2, the output unit 130a is installed below the table 140b. The output unit 130a is, for example, a projector and projects information from the lower side to a top plate of the table 140b. The top plate of the table 140b is formed of, for example, a transparent material such as a glass plate or a transparent plastic plate. The information projected by the output unit 130a is displayed on the top surface of the table 140b. A scheme of causing the output unit 130a to project information from the lower side of the table 140b and displaying the information on the top surface of the table 140b in this way is also referred to as a "rear projection type."

In the example shown in FIG. 2, an input unit 110b is installed on the top surface (front surface) of the table 140b. The input unit 110b is configured of, for example, a touch panel and executes a manipulation input by a user by detecting touch of a manipulator on a display screen of the top surface of the table 140b by the touch panel. The configuration of the input unit 110b is not limited to this example. As in the information processing system 100a shown in FIG. 1, the input unit 110b may be installed separately from the table 140b below the table 140b. In this case, the input unit 110b is configured of, for example, an imaging device and can detect the position of a manipulator on the top surface of the table 140b beyond the top plate formed of a transparent material.

In an information processing system 100c shown in FIG. 3, a touch panel type display is installed on a table so that a display surface of the touch panel type display is oriented upward. In the information processing system 100c, an input unit 110c and an output unit 130c can be configured to be integrated as the touch panel type display. That is, various kinds of information are displayed on the display screen of the display and a manipulation input by a user is executed by detecting touch of a manipulator on the display screen of the display by the touch panel. In the information processing system 100c, an imaging device may be installed as the input unit 110c above the touch panel type display, as in the information processing system 100a shown in FIG. 1. The position or the like of a user near the table can be detected by the imaging device.

An information processing system 100d shown in FIG. 4 includes a flat panel type display. In the information processing system 100d, an output unit 130d is configured as the flat panel type display and various kinds of information are displayed on a display screen of the display. An input unit is configured of an input device such as a mouse, a keyboard, or a touch pad (not shown) and a manipulation input by a user is executed when a pointer on the display screen by such an input device is manipulated. As in the information processing system 100c shown in FIG. 3, the input unit of the information processing system 100d may include a touch panel installed in the flat panel type display and a manipulation input by a user may be executed via the touch panel. The input unit may include an imaging device capable of imaging an opposite region to the display surface of the flat panel type display. The position or the like of a user observing the flat panel type display can be detected by the imaging device.

Other examples of the configuration of the information processing system according to the embodiment will be described with reference to FIGS. 2 to 4. As described above, the information processing system according to the embodiment can be realized with diverse configurations. Here, the embodiment will be described exemplifying the configuration of the information processing system 100a in which the input unit 110a and the output unit 130a are installed above the table 140a, as shown in FIG. 1. However, in other configurations, such as the above-described configurations shown in FIGS. 2 to 4, in which the information processing system according to the embodiment can be realized, the same functions as functions to be described below can be realized. In the following description, the information processing system 100a, the input unit 110a, and the output unit 130a are simply referred to as an information processing system 100, an input unit 110, and an output unit 130 for simplicity.

(1-2. Display Control Example)

Figure 5:
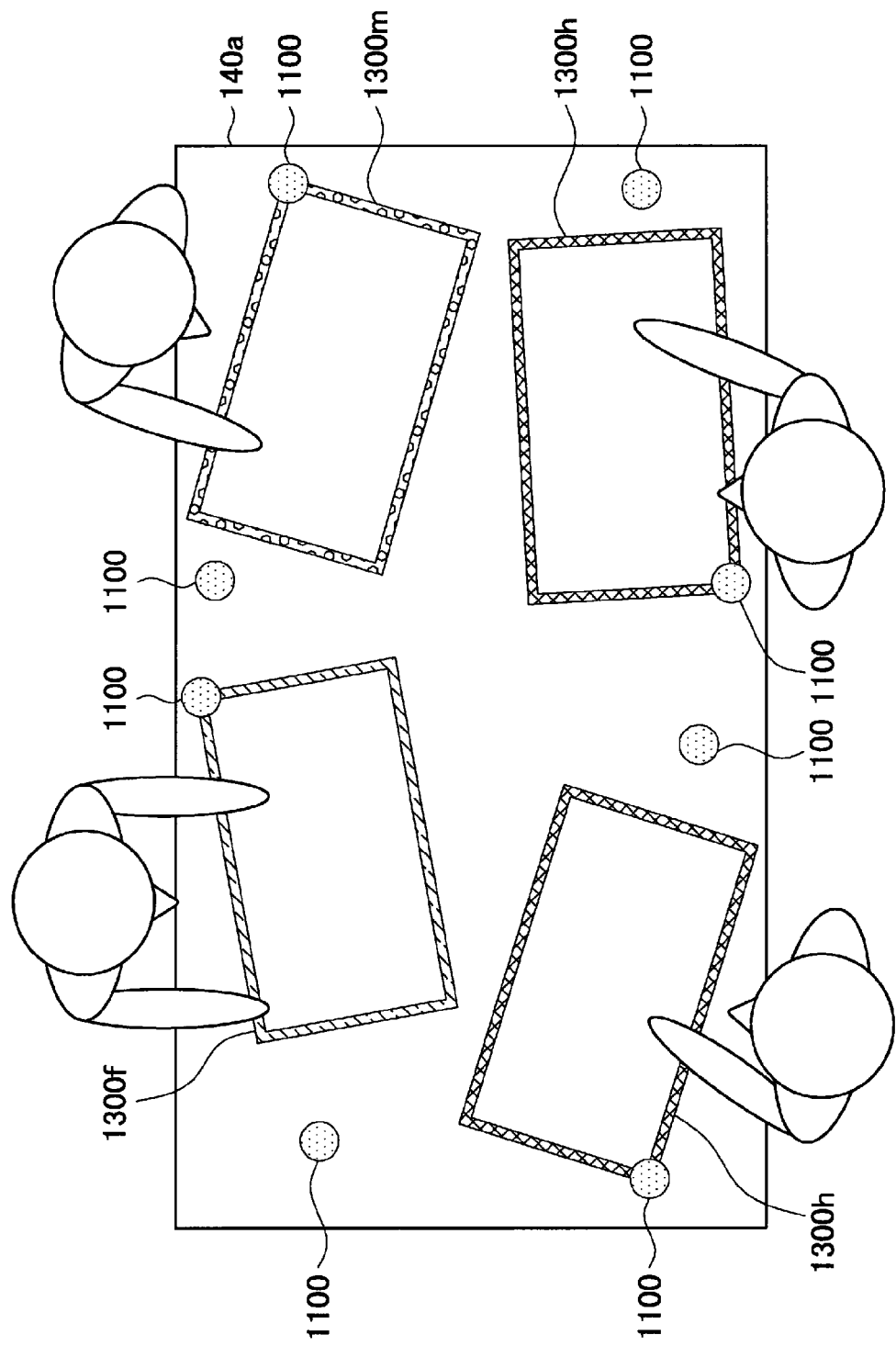
FIG. 5 is an explanatory diagram showing an example of display control of the information processing system according to the embodiment.

An example of display control of the information processing system 100 according to the embodiment will be described with reference to FIG. 5. FIG. 5 is an explanatory diagram showing an example of display control of the information processing system 100 according to the embodiment. In FIG. 5, a display screen of the information processing system 100 shown in FIG. 1 is overlooked from above, that is, from the direction of the output unit 130. The display control to be described below with reference to FIG. 5 can be executed by a display control unit 244 shown in FIG. 6 to be described below. Information indicating details of various manipulations such as a tap manipulation or a drag manipulation can be acquired by a manipulation information acquisition unit 241 shown in FIG. 6 to be described below.

As shown in FIG. 5, the information processing system 100 is configured such that a plurality of users can execute, for example, independent applications on the same display screen 1200 displayed on the top surface of a table. In the example shown in FIG. 5, four windows 1300f, 1300h, and 1300m (hereinafter collectively referred to as windows 1300 in FIG. 5) are displayed on the display screen 1200 and four users refer to information displayed in the windows 1300. In the windows 1300, for example, display corresponding to operation screens of various applications such as a web browser and mail software is executed.

On the display screen 1200, buttons 1100 are displayed in regions corresponding to backgrounds and at positions corresponding to corners of the windows 1300. The buttons 1100 are, for example, menu buttons used to execute various functions. For example, the user can execute manipulations of executing and ending an application displayed in the window 1300 through the button 1100 installed in the window 1300. For example, the button 1100 installed in the region corresponding to the background is a menu button of the entire information processing system 100. The user can execute a manipulation of turning on or off power of the information processing system 100 or generating a new window through the button 1100.

As described in the foregoing section (1-1. Configuration example), the information processing system 100 can detect the position of a hand of the user on the display screen 1200 by an input unit (not shown). According to the detection result, the information processing system 100 controls an operation of an application or display of the display screen 1200. In this way, the user executes various manipulation inputs on the information processing system 100 by touching the display screen 1200 with his or her hand or moving the touching hand on the display screen 1200.

For example, when the user executes a manipulation of selecting the button 1100 (so-called tap manipulation), the information processing system 100 executes a function allocated to the button 1100 on which the tap manipulation is executed. For example, when the user executes a so-called drag manipulation on the window 1300, the information processing system 100 moves a display position of the window 1300 according to the drag manipulation. When the user executes a so-called pinch-in manipulation or pinch-out manipulation on the window 1300, the information processing system 100 changes a display size of the window 1300 according to the pinch-in manipulation or the pinch-out manipulation. When the user executes a rotation manipulation of moving his or her finger to rotate the window 1300, the information processing system 100 rotates the window 1300 according to the rotation manipulation. In the information processing system 100, the same manipulation inputs as manipulation inputs which can be executed generally in information processing devices capable of executing manipulation inputs through touch panels, such as a smartphone or a tablet PC, may be additionally executed.

Here, in the embodiment, the information processing system 100 can be shared between a plurality of users. Accordingly, a plurality of accounts in which the users can log in to the information processing system 100 can be set for the users and mutually different work environments can be provided to the respective logged-in users. Here, this corresponds to a function which is mounted on a general PC and in which a so-called desk-top screen is supplied to each logged-in user. In this way, a user set in the information processing system 100 is also referred to as a system user below. For example, the system user may indicate a specific person such as "father" or "mother" or may indicate a specific group such as "family." A system user corresponding to an imaginary person, such as an "administrator" who performs a predetermined role in use of the information processing system 100, may be provided.

In the embodiment, the different display screen 1200 is displayed for each logged-in system user. Permission (authority) can be set for each system user. For example, execution authority of an application and/or browsing authority of content is set according to the system user. Here, the execution authority of an application may include authority in which execution of the application is generally restricted or may include authority in which a specific process in the application is restricted. The browsing authority of content can be considered as access authority to a storage region in which content is stored, for example, a predetermined database (DB) or a predetermined folder.

For example, when a certain system user X logs in, the display screen 1200 corresponding to the system user X is displayed. On the display screen 1200, for example, application execution or content browsing which the system user X is permitted to access is possible.

In this state, the system user can be changed by executing a login process with the account of a system user Y different from the system user X. When the system user Y logs in, the display screen 1200 which is different from the display screen 1200 corresponding to the system user X and corresponds to the system user Y is displayed. On the display screen 1200, for example, application execution or file browsing which the system user X is permitted to access is possible.

Here, the system user is assumed to be changed from the system user Y to the system user X again. In this case, the display screen 1200 corresponding to the system user X is displayed again, the display immediately previous to the switch of the system user to the system user Y may remain as it is on the display screen 1200. That is, the display of the display screen 1200 at the time of previous logout can be reproduced. In this way, in the embodiment, a history of the display details on the display screen 1200 (that is, a history of manipulation details on the display screen 1200) can be managed for each system user. When the system user X logs in with his or her account again, the system user X can continue his or her task immediately from the point at which he or she stopped previously. By supplying the work environment, that is, the display screen, to each system user and realizing a configuration such that tasks executed at the time of login of respective system users do not influence one another, smooth use can be realized even when the information processing system 100 is shared between the plurality of users.

In the embodiment, the user is set in each window 1300. Hereinafter, a user set in each window 1300 is also referred to as a window user. The window user may indicate a specific person or group or may indicate an imaginary person, such as an "administrator" who performs a specific role, as with the system user.

Here, in the embodiment, the system user and the window user are mutually independent concepts. For example, on the display screen 1200 corresponding to a certain system user, the window 1300 in which the same window user as the certain system user is set and the window 1300 in which another window user is set can be displayed together. That is, the plurality of windows 1300 in which different window users are set can be displayed on one display screen 1200. Accordingly, to distinguish the windows, display indicating the window user of the window 1300 (hereinafter also referred to as user display) is set to be suitable for the window 1300. For example, display in which the edge of the window 1300 is a different color for each window user or an icon indicating the window user is considered as the user display. In the example shown in FIG. 5, mutually different hatchings are assigned to the edges of the windows 1300 in order to simulatively indicate that mutually different colors are assigned to the edges of the windows 1300. For example, the window 1300f is a window of which the window user is "father," the windows 1300h are windows of which the window user is "family," and the window 1300f is a window of which the window user is "mother."

Like the system user, authority can be set for the window user. That is, the authority can be set in each window 1300. The settable authority is, for example, authority to execute an application in the window and/or authority to browse content in the window. For example, the window 1300f of which the window user is "father" and the window 1300h of which the window user is "family" are different in an executable application or browsable content.

In the embodiment, as in the management of the history of the display details of the display screen 1200 for each system user, a history of display details in the window 1300 (that is, a history of manipulation details on the window 1300) can be managed for each window user, that is, each window 1300. Thus, an execution history of applications or a browsing history of content in the window 1300 is not referred to by other users.

Here, in the embodiment, when a window is newly generated, a window user can be set in the window. The setting of the window user may be executed through, for example, a manipulation input by the user. However, there is a possibility of the user feeling a burden of executing a manipulation of setting the window user whenever newly generating a window. Accordingly, for example, when a new window is derived and generated from an already displayed window (when a slave window is generated from a so-called master window), the same window user as the window of the derivation source may be automatically set in the newly generated window. For example, the same window user as the system user who is logged in at the time of generation of the window may be automatically set in the newly generated window. For example, based on a result of personal recognition of the user manipulating the window, the user manipulating the window may be automatically set as a window user of the newly generated window. In this way, by automatically setting the window user in the newly generated window according to a predetermined condition, it is possible to reduce a burden on the user of setting the window user on the manipulation input.

The system user and the window user can be switched at any timing. The system user and the window user can be switched based on a manipulation input by the user. For example, when the user selects the menu button 1100, a setting screen used to set the system user or the window user may be displayed. The user can explicitly designate the system user or the window user on the setting screen. Necessity and non-necessity of an authentication process at the time of the switch may be set for the system user and the window user. For the system user and the window user for which the authentication process is set to be necessary, the switch to the system user and the window user can be executed, for example, only when the authentication process such as a password input is successful. In this way, by executing the authentication process, it is possible to prevent the execution authority and/or the browsing authority given to a specific system user and window user from being misused by a third person with no due authority.

The example of the display control of the information processing system 100 according to the embodiment has been described above with reference to FIG. 5. Here, as indicated in the foregoing Patent Literature 1, technologies for displaying a plurality of windows on a display screen are already known as general technologies. In the technology disclosed in the foregoing Patent Literature 1, a case in which one user uses a plurality of windows is presupposed, but a case in which a plurality of windows are used by a plurality of users is not assumed. For example, when a plurality of windows are used by a plurality of users, each window can be manipulated by each user. For example, there is a possibility of a history of manipulation details on a certain window (for example, a browsing history in a web browser) being referred to by another user who does not execute the manipulation. In this way, in Patent Literature 1, convenience for users in a situation in which a plurality of windows are used by the plurality of users has not been examined sufficiently.

In contrast, as described above, in the embodiment, the window users can be set in the plurality of windows 1300 displayed on the display screen 1200. In each window 1300, the execution authority and/or the browsing authority can be set according to the window users. Thus, an executable application or browsable content is restricted for each window 1300. Accordingly, unauthorized execution of an application or unauthorized browsing of content between the users is prevented. For example, as described above, it is possible to prevent the history of the manipulation details on the certain window 1300 from being referred to by other users. For example, when the display screen 1200 is shared between parents and children, so-called parental control can be validated only on the windows 1300 used by the children, and thus it is possible to restrict browsing of specific content by specific users. In this way, according to the embodiment, when the plurality of windows 1300 are simultaneously displayed, it is possible to further improve convenience for the users using the windows 1300.

2. Functional Configuration of Information Processing System

Figure 6:
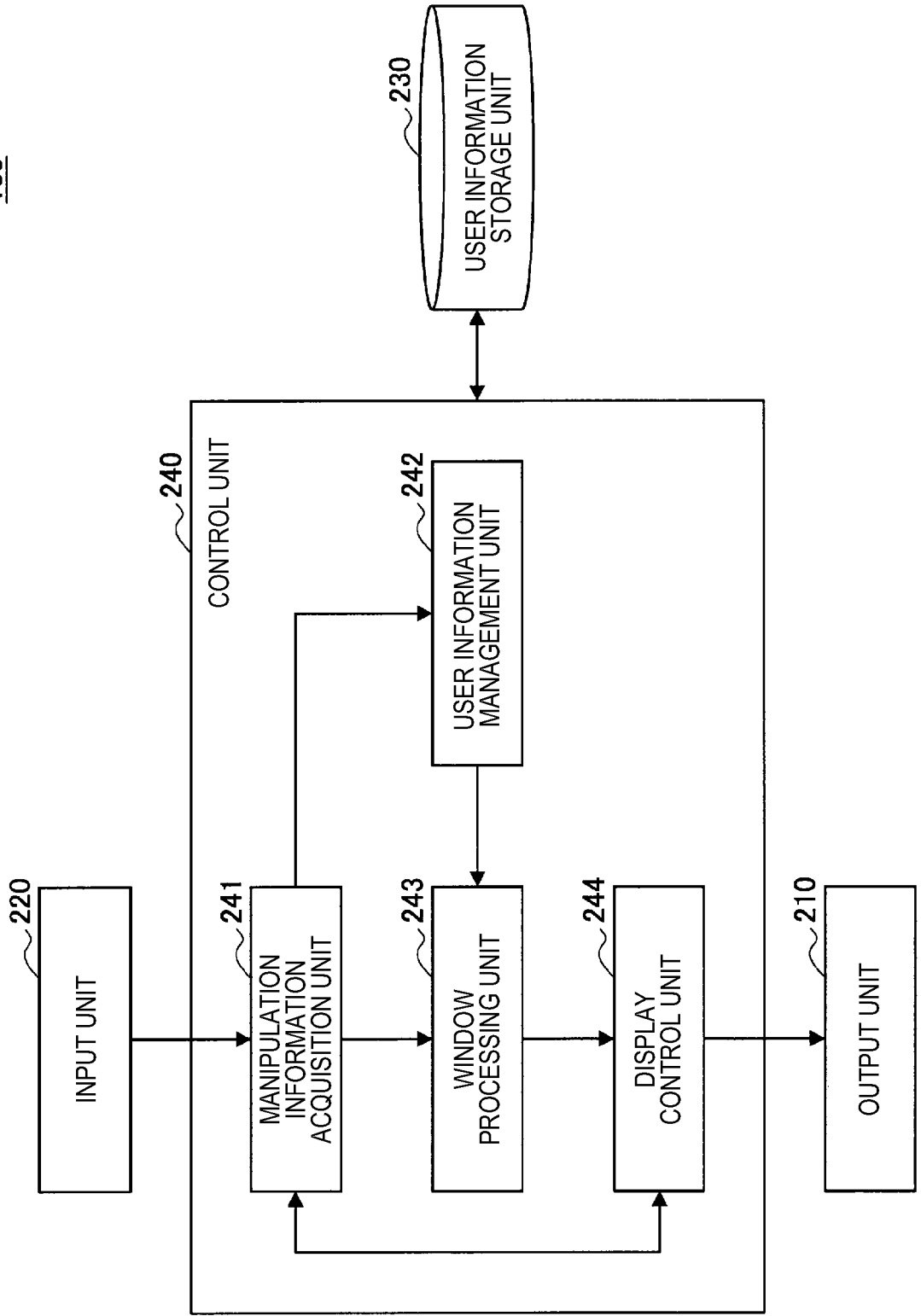
FIG. 6 is a block diagram showing an example of a functional configuration of the information processing system according to the embodiment.

A functional configuration in which the information processing system 100 according to the above-described embodiment can be realized will be described with reference to FIG. 6. FIG. 6 is a block diagram showing an example of the functional configuration of the information processing system 100 according to the embodiment.

Referring to FIG. 6, the information processing system 100 according to the embodiment includes an output unit 210, an input unit 220, a user information storage unit 230, and a control unit 240 as functions. The information processing system 100 can be realized by, for example, a hardware configuration shown in FIG. 18 to be described below.

The output unit 210 is an output interface that notifies a user of various kinds of information processed by the information processing system 100. The output unit 210 is configured of, for example, a display device such as a display or a projector and displays various kinds of information on a display screen under the control of the display control unit 244 of the control unit 240 to be described below. The output unit 210 corresponds to the output units 130*a* to 130*d* shown in FIGS. 1 to 4 and displays windows and GUI components on a display screen, as described above. The embodiment is not limited to this example but the output unit 210 may further include an audio output device such as a speaker and may output various kinds of information as audio.

The input unit 220 is an input interface that inputs various kinds of information to the information processing system 100. The user can input various kinds of information to the information processing system 100 through the input unit 220. The input unit 220 corresponds to the input units 110*a* to 110*d* shown in FIGS. 1 to 4. In the embodiment, the input unit 220 is configured to be able to receive at least a manipulation input by the user on a display screen generated by the output unit 210. For example, the input unit 220 is configured of an imaging device and photographs a captured image containing a manipulator such as a hand of the user on the display screen. The information (for example, information regarding the captured image) input through the input unit 220 is supplied to the manipulation information acquisition unit 241 of the control unit 240 to be described below so that a manipulation input by the user can be detected by the manipulation information acquisition unit

241. The embodiment is not limited to this example. The input unit 220 may be configured of, for example, another input device such as a touch panel, a mouse, a keyboard, a microphone, a button, a switch, and a lever.

The user information storage unit 230 is configured of any of various storage devices such as a magnetic storage device such as a hard disk drive (HDD), a semiconductor storage device, an optical storage device, or a magneto-optical storage device and stores various kinds of information processed by the information processing system 100. In the embodiment, the user information storage unit 230 stores various kinds of information regarding the system user and the window user of the information processing system 100. Here, the information regarding the system user includes, for example, information regarding an authority set for each system user and information regarding display details on a display screen corresponding to each system user. Further, the information regarding the display details on the display screen includes, for example, information regarding a background (wallpaper) of the display screen or information regarding display details (for example, a display position of the window or the GUI component) at a time point at which the user has logged out recently. In this way, in the embodiment, a history of the display details on the display screen can be managed for each system user.

The information regarding the window user includes, for example, for example, information regarding the authority set for the window user, information regarding the user display indicating the window user, and information regarding the display details in the window. Further, the information regarding the display details in the window include, for example, information regarding a history of tasks in the window (for example, a browsing history of a web browser). In this way, in the embodiment, the history of the display details in the window can be managed for each window user.

Additionally, the user information storage unit 230 can store various kinds of information regarding processes executed by the control unit 240, such as a program that causes the control unit 240 to execute a predetermined calculation process and information regarding a result of the calculation process by the control unit 240.

The control unit 240 is configured of, for example, any of various processors such as a CPU or a DSP and controls operations of the information processing system 100 by executing various calculation processes. For example, the control unit 240 operates according to a program stored in the user information storage unit 230 or another storage device. The control unit 240 can be considered as an information processing device that processes various kinds of information. As shown in the drawing, the control unit 240 includes the manipulation information acquisition unit 241, a user information management unit 242, a window processing unit 243, and the display control unit 244 as the functions. Each function of the control unit 240 including these functions is realized when the processor of which the control unit 240 is configured operates according to a predetermined program.

The manipulation information acquisition unit 241 acquires manipulation information indicating manipulation details of the user based on information input from the input unit 220. For example, the manipulation information acquisition unit 241 receives information regarding a captured image containing a manipulator such as a hand of the user on the display screen from the input unit 220 and analyzes the position and/or a motion of the hand of the user on the display screen based on the information regarding the captured image. The manipulation information acquisition unit 241 can detect a manipulation by the hand of the user on the window or the GUI component on the display screen from the analysis result and can acquire information regarding the details of the detected manipulation as manipulation information. The detected manipulation can be a manipulation such as movement or selection of the window and/or the GUI component, for example, a tap manipulation or a drag manipulation described in the foregoing section (1-2. Display control example). Based on the detected manipulation, the manipulation information acquisition unit 241 can acquire, for example, manipulation information indicating that the window user or the system user is set, manipulation information indicating that a predetermined application is executed in the window, manipulation information indicating that predetermined content is displayed in the window, manipulation information indicating that a display position or a manipulation size of the window is changed, and manipulation information indicating that an instruction to generate or erase the window is given. The manipulation information acquisition unit 241 supplies the acquired manipulation information to the user information management unit 242, the window processing unit 243, and the display control unit 244.

The manipulation information acquisition unit 241 can acquire appropriate manipulation information according to the configuration of the input unit 220. For example, when the input unit 220 is configured of a touch panel, the manipulation information acquisition unit 241 can acquire manipulation information regarding the window or the GUI component when the touch panel is touched with a finger of the user or the like. For example, when the input unit 220 includes a pointing device such as a mouse, the manipulation information acquisition unit 241 can acquire manipulation information regarding the window or the GUI component executed through a manipulator such as a pointer displayed on the display screen. For example, when the input unit 220 includes an audio input device such as a microphone, the manipulation information acquisition unit 241 can analyze a voice of the user collected by the audio input device and acquire manipulation information regarding the window or the GUI component according to the details of an utterance. Further, the manipulation information acquisition unit 241 can acquire not only the manipulation information regarding the window or the GUI component but also, for example, manipulation information regarding various manipulation inputs executed generally in an information processing device through a switch or the like.

The user information management unit 242 manages information regarding the system user and the window user. For example, when the user information management unit 242 receives information indicating that the window user is set in a certain window as manipulation information, the user information management unit 242 sets the window user on the window according to the manipulation information. Then, the user information management unit 242 acquires information regarding the set window user, information regarding, for example, the authority set for the window user, information regarding the user display indicating the window user, and information regarding the display details in the window from the user information storage unit 230. The user information management unit 242 restricts display of the window or a process executable in the window by supplying the information to the window processing unit 243.

Similarly, the user information management unit 242 sets the system user according to the manipulation information when the information indicating that the system user is changed is received as the manipulation information. Then, information regarding the system user, for example, information regarding the authority set for the system user or information regarding the display details on the display screen corresponding to the system user, is acquired from the user information storage unit 230. The information is supplied to the display control unit 244. Based on the information, the display control unit 244 displays the display screen corresponding to each system user.

Here, when information indicating that the system user or the window user is set is received as the manipulation information, the user information management unit 242 can determine necessity or non-necessity of an authentication process at the time of setting of the system user or the window user and can execute the authentication process as necessary. For example, when the currently logged-in system user is identical to the window user to be set at the time of setting of the user of the window, the user the user information management unit 242 can determine that the authentication process is not necessary. In this case, this is because the authentication process is considered to be unnecessary to execute again at the time of the setting of the window user since the authentication process is assumed to be already executed at the time of setting of the system user. On the other hand, the necessity and the non-necessity of the authentication process at the time of switch are set for each system user and each window user and are stored in the user information storage unit 230. The user information management unit 242 can determine the necessity and the non-necessity of the authentication process at the time of setting of each system user and each window user by referring to information regarding the necessity and the non-necessity of the authentication process stored in the user information storage unit 230. When the authentication process is necessary in the setting of the window user or the system user, the user information management unit 242 appropriately executes the authentication process. The new window user or system user is set only when the authentication is successful.

As the authentication process, for example, any of various known authentication processes such as a password input, biometric authentication (for example, fingerprint authentication, palm print authentication, vein authentication, or iris authentication), and face recognition can be applied. Alternatively, when the input unit 220 includes an imaging device, a person may be recognized and the authentication process may be executed by determining the size of a hand of the user or presence or absence of a decoration such as a ring from a captured image. When the input unit 220 includes an audio input device such as a microphone, a person may be recognized based on a voice of the user and the authentication process may be executed. The input unit 220 may include a device that executes the authentication process, and information for executing the authentication process (for example, text information corresponding to a password or image information for executing face recognition) can be supplied to the user information management unit 242 through the input unit 220. The user information management unit 242 executes the authentication process based on the information. For example, when the user carries a portable terminal such as a wearable device or a smartphone, the information processing system 100 and the portable terminal may communicate so that the authentication process is executed based on information indicating an owner of the portable terminal registered in the portable terminal. In this case, the information processing system 100 can further include a communication unit that communicates with an external device.

The window processing unit 243 executes various processes on the display details of the window. For example, based on manipulation information indicating that a predetermined application is executed, the window processing unit 243 executes the designated application in the window. For example, based on manipulation information indicating that predetermined content is displayed, the window processing unit 243 displays the designated content in the window. Here, the window processing unit 243 decides a process in the window, that is, display details of the window, based on information regarding the window user supplied from the user information management unit 242, for example, information regarding authority set for the window user. For example, in the window of which the window user to whom execution authority of a predetermined application is not given is set, the window processing unit 243 does not execute the application. For example, in the window of which the window user to whom browsing authority of predetermined content is not given is set, the window processing unit 243 does not display the details of the content. The window processing unit 243 supplies the display control unit 244 with information regarding the decided display details of the window to the display control unit 244.

The display control unit 244 controls driving of the output unit 210 such that the output unit 210 displays various kinds of information. In the embodiment, the display control unit 244 causes the output unit 210 to display a display screen containing at least the window. The display control unit 244 can execute the various kinds of display control described in the foregoing section (1-2. Display control example), the following section (4. Display examples), and the following (5. Modification examples).

The display control unit 244 controls display of the window according to the display details of the window decided by the window processing unit 243. An execution result or content of the application is displayed in the window by the display control unit 244. Based on information regarding the window user supplied from the user information management unit 242, the display control unit 244 executes the user display indicating the window user set in the window. The user display may be, for example, display in which the edges of the windows are different colors corresponding to each user or an icon indicating the window user.

For example, the display control unit 244 moves, enlarges, or rotates display of the window based on manipulation information acquired by the manipulation information acquisition unit 241 and indicating that the display position or the display size of the window is changed. Further, based on manipulation information indicating that an instruction to generate or erase the window is given, the display control unit 244 can newly display the window or erase the display of the window.

Further, based on information regarding the system user supplied from the user information management unit 242, the display control unit 244 can display a display screen corresponding to the set system user. Based on information regarding the display details on the display screen, the display control unit 244 can display a display screen corresponding to the system user so that display in a state immediately previous to the switch of the previous system user is reproduced.

The display control unit 244 may further execute, for example, display control executed in a general information processing device, such as movement of display of a pointer on a display screen based on manipulation information acquired by the manipulation information acquisition unit 241. When a manipulation of selecting a GUI component is detected by the manipulation information acquisition unit 241, the display control unit 244 can execute general display control according to the manipulation of selecting the GUI component, such as changing of display of a display screen according to a function assigned to the selected GUI component. Further, the display control unit 244 can cause the output unit 210 to display, for example, information necessary to execute the authentication process at the time of switch of the window user or the system user, such as a password input screen, as necessary.

The functional configuration of the information processing system 100 according to the embodiment has been described above. In FIG. 6, only the characteristic configuration of the information processing system 100 according to the embodiment is shown. The information processing system 100 may have functions which a general information processing device can have in addition to the shown functions. That is, the information processing system 100 can, of course, execute functions which can be executed in a general information processing device, in addition to the above-described functions.

In addition, the configurations shown in FIG. 6 may be integrally formed as one device or formed as a plurality of devices communicatively connected to one another via a network. For example, functions of the control unit 240 may be performed by one processor or one information processing device or may be performed by a plurality of processors or a plurality of information processing devices in cooperation. Alternatively, functions of the control unit 240 may be performed by an information processing device or an information processing device group such as a server that is provided on a network (for example, a so-called cloud). In this case, functions of the output unit 210 and the input unit 220 may be implemented by a display device or an imaging device that are provided in a place to which the user can directly access, for example, inside a home. Such a configuration performs communication of various types of information, an instruction, or the like with an information processing device that can realize the function of the user information storage unit 230 and the control unit 240 arranged in another place via a network, and thus the functions shown in FIG. 6 may be implemented.

In addition, a computer program for implementing the above-described functions of the information processing system 100 according to the present embodiment and particularly, the functions of the control unit 240, is created, and can be installed in a personal computer or the like. In addition, it is possible to provide a computer readable recording medium in which such a computer program is stored. The recording medium may be, for example, a magnetic disk, an optical disc, a magneto optical disc, or a flash memory. In addition, the above computer program may be delivered, for example, via a network, without using the recording medium.

3. Information Processing Method

Figure 7:
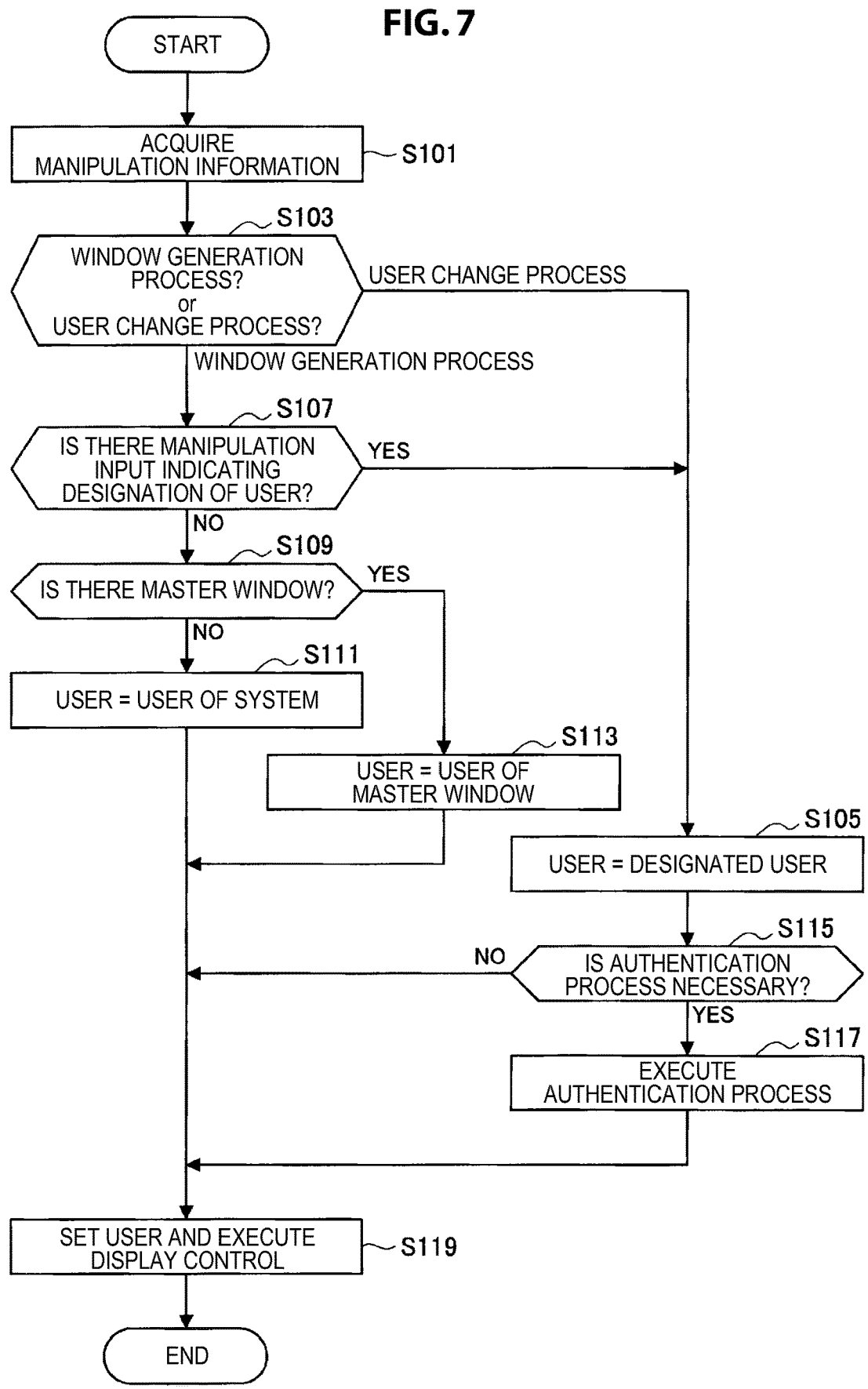
FIG. 7 is a flowchart showing an example of a processing order of an information processing method according to the embodiment.

A processing order of an information processing method which is executed by the information processing system 100 according to the embodiment will be described with reference to FIG. 7. FIG. 7 is a flowchart showing an example of a processing order of an information processing method according to the embodiment. Here, a processing order of processes in which the user is set in the window and which are characteristic processes in the information processing method according to the embodiment is mainly shown in FIG. 7 and other processes are not shown. The processes which are not shown can be processes which can be executed in a general information processing device, and thus the detailed description thereof will be omitted. The processes shown in FIG. 7 can be executed in the functional configuration of the information processing system 100 shown in FIG. 6.

Referring to FIG. 7, in the information processing method according to the embodiment, manipulation information is first acquired (step S101). The manipulation information can be information indicating manipulation details regarding the window or the GUI component on the display screen. Based on the manipulation information, various processes are executed on the window. The process of step S101 is executed by, for example, the manipulation information acquisition unit 241 shown in FIG. 6.

Next, it is determined whether the process executed based on the manipulation information acquired in step S101 is a process of generating the window (window generation process) or a process of changing the window user (user change process) (step S103). The process of step S103 can also be said to be a process of determining whether manipulation information indicating that the window is newly generated is acquired or manipulation information indicating that the window user is set is acquired as the manipulation information. The processes from step S103 to step S117 to be described below are executed by, for example, the user information management unit 242 shown in FIG. 6. Here, as described above, the processes of setting the user in the window are mainly shown in FIG. 7 and a specific processing order of other processes is not shown. For example, the information processing system 100 may execute the process of changing the display size or the display position of the window or the process of executing various applications in the window, as described in the foregoing section (1-2. Display control example) or the foregoing (2. Functional configuration of information processing system), according to the input manipulation information in addition to the window generation process and the user change process. A known processing order executed in a general information processing device can be applied as the specific processing order of the processes (not shown).

When the user change process is determined to be executed in step S103, the manipulation information indicating that the window user is set includes information indicating that the window user is designated. Therefore, a user explicitly designated by the user is decided as a new window user of the window (step S105). Conversely, when the window generation process is determined to be executed in step S103, the process proceeds to step S107.

In step S107, it is determined whether there is a manipulation input indicating designation of the window user in the window generation process. When it is determined in step S107 that there is a manipulation input indicating the designation of the window user, the process proceeds to step S105. As in the case in which the user change process is executed, the user explicitly designated by the user is decided as the new window user of the window. Conversely, when it is determined in step S107 that there is no manipulation input indicating the designation of the window user, the process proceeds to step S109.

In step S109, it is determined whether there is a master window of the window newly generated in the window generation process. That is, it is determined whether the window newly generated in the window generation process is a so-called slave window derived and generated from an existing window. When it is determined in step S109 that there is no master window, the process proceeds to step S111. When the process proceeds to step S111, the window user is not explicitly designated by the user and there is no master window either. Therefore, the same user as the system user is decided as the window user of the newly generated window.

Conversely, when it is determined in step S109 that there is a master window, the process proceeds to step S113. When the process proceeds to step S113, the window user is not explicitly designated by the user and there is the master window. Therefore, the window user of the master window is decided as the window user of the newly generated window.

In this way, the window user is decided according to the determination processes of steps S103, S107, and S109, as in steps S105, S111, and S113. When the window user is decided in one process of steps S105, S111, and S113, the decided window user is set as the user of the window and the display control of the window is executed according to the window user (step S119). The process of step S119 is executed by, for example, the user information management unit 242 and the display control unit 244 shown in FIG. 6.

Here, in the processes of steps S111 and S113, the window user of the newly generated window is decided according to the system user or the window user of the master window. In this case, since the authentication process is considered to have been executed already, as necessary, at the time of login to the system or the time of generation of the master window, it is not necessary to execute the authentication process again. However, since any one window user is designated by the user in the process of step S105, the authentication process is executed as necessary. Specifically, when the window user is decided in the process of step S105, it is subsequently determined whether the authentication process is necessary before the window user is actually set in step S119 (step S115).

For example, in step S115, a determination process is executed based on necessity or non-necessity of the authentication process set in advance for the window user designated by the user. The necessity or non-necessity of the authentication process for each window user is stored in, for example, the user information storage unit 230 shown in FIG. 6. By referring to the user information storage unit 230, it is possible to determine the necessity or non-necessity of the authentication process for the window user designated by the user. For example, when the window user designated by the user is identical to the currently logged-in system user despite the fact that the authentication process for the window user designated by the user is necessary, the authentication process may be determined to be unnecessary. In this case, this is because the authentication process is considered to have been executed already on the window user at the time of logging in to the system, as in the process shown in step S111 described above.

When it is determined in step S115 that the authentication process is unnecessary, the process proceeds to step S119. Then, the authentication process is not executed and the window user decided in step S105 is set as the window user of the window. Conversely, when it is determined in step S115 that the authentication process is necessary, the authentication process is executed (step S117).

The authentication process is executed by inputting, for example, a password. However, the embodiment is not limited to this example. For example, any of various known personal recognition technologies described in the foregoing section (2. Functional configuration of information processing system) may be applied to the authentication process of step S117. When the authentication process is successful, the process proceeds to step S119 and the window user decided in step S105 is set as the window user of the window. When the authentication process fails, the window user decided in step S105 is not set as the window user of the window and the window is not generated or a process such as non-exchange of the window user is appropriately executed.

The processing order of the information processing method according to the embodiment will be described above with reference to FIG. 7.

4. Display Examples

Several display examples which can be realized by the information processing system 100 according to the embodiment will be described showing specific display screens. Display of display screens shown in the following FIGS. 8A to 8F and FIGS. 9A to 9F can be controlled by the display control unit 244 shown in FIG. 6.

(4-1. First Display Example)

An example of the display screen which can be realized by the information processing system 100 will be described with reference to FIGS. 8A to 8F. FIGS. 8A to 8F are diagrams illustrating an example of the display screen which can be realized by the information processing system 100.

In the examples shown in FIGS. 8A to 8F, a case in which the information processing system 100 is used at a home is assumed. For example, a situation in which a web browser is used as an application, a web page is displayed in a window, and the web page can be viewed by a plurality of users is assumed. However, the embodiment is not limited to this example. The information processing system 100 may be used, for example, at a meeting in a company or may be used together by many unspecified users in a public place. The application displayed in the window may be an operation screen of any of various applications other than the web browser.

For example, authority of the system user and the window user or necessity or non-necessity of the authentication process is assumed to be set as in the following Table 1. In the following Table 1, "parental control" and "application installation" are examples of the execution authority. Further, "storage of form data" and "access to family folder" are examples of the browsing authority.

TABLE 1

| System user and window user | Parental control | Application installation | Storage of form data | Access to family folder | Authentication process |
|---|---|---|---|---|---|
| Administrator | invalid | possible | valid | possible | necessary |
| Family | valid | not possible | valid | possible | unnecessary |
| Father | invalid | not possible | valid | possible | necessary |
| Son | valid | not possible | valid | possible | unnecessary |
| Guest | valid | not possible | invalid | not possible | unnecessary |

"Administrator" is a user that corresponds to a system administrator. For example, when a user logs in as the system user "Administrator," an application can be installed.

"Family" is a user that is used for family sharing. Since the user can be used by anybody in the family, the authentication process is unnecessary. The parental control is set to be valid in consideration of use by a child. That is, when "Family" is set as the window user, web pages which can be browsed in the window are restricted.

"Father" is a user that is used personally by a father. When "Father" is set as the system user or the window user, the authentication process is necessary so that personal information such as a use history of web browsers or credit card information of the father is not browsed by other family members, particularly, children.

"Son" is a user that is used personally by a son. The parental control is set to be valid assuming that use is by a child.

"Guest" is a guest user other than family members. By invalidating storage of form data in a web browser, a browsing history of others is set not to remain. For example, access to a family folder in which photos of family members or the like are stored is set not to be possible. Further, the parental control is set to be valid so that others other than family members may not freely execute web browsing.

Hereinafter, transition of the display screen according to a specific use example of the information processing system 100 will be described with reference to FIGS. 8A to 8F.

Figure 8C:
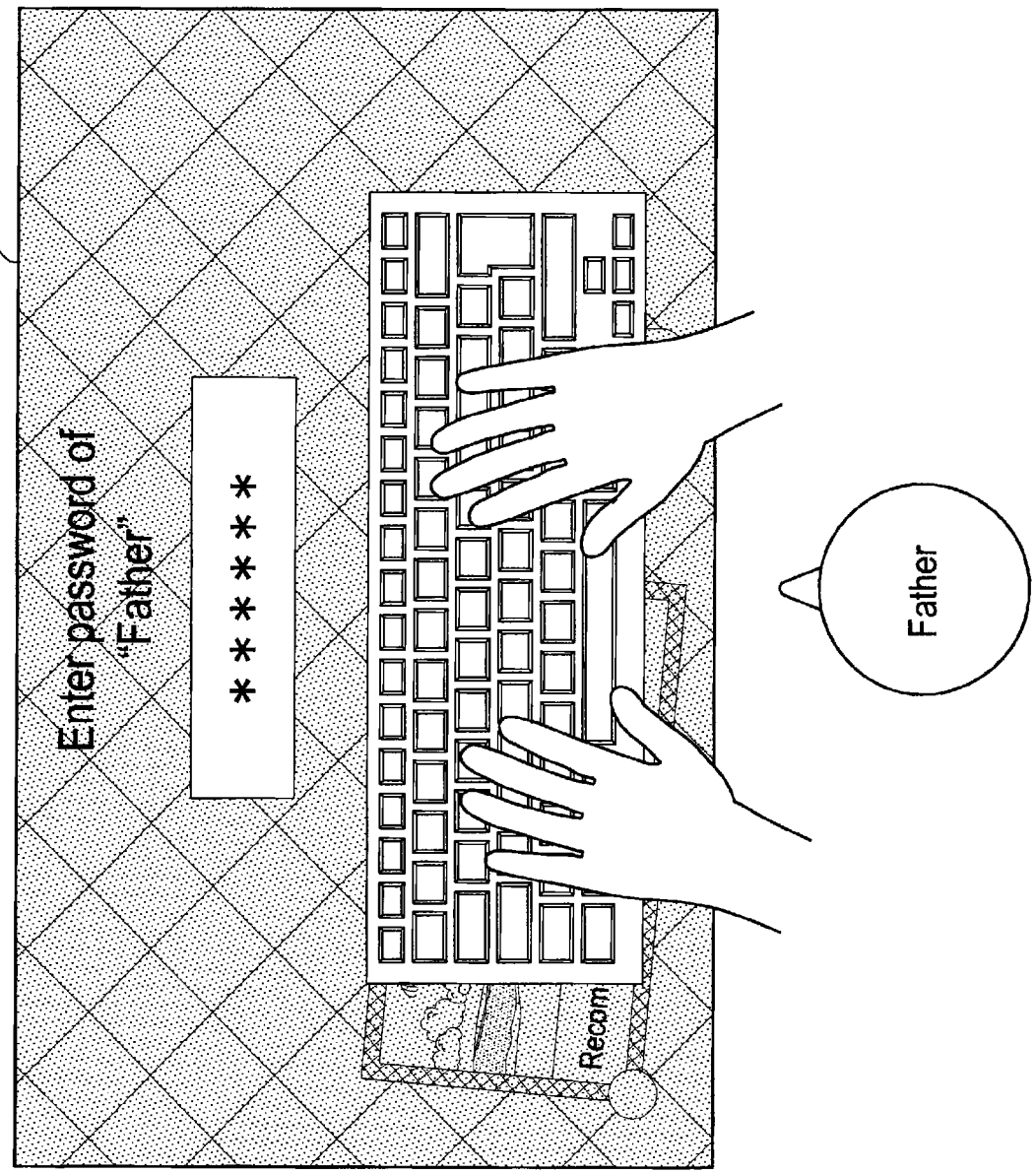
FIG. 8C is a diagram showing an example of a display screen which can be realized by the information processing system.

First, a father is assumed to turn on the information processing system 100. For example, as a standard, the information processing system 100 is set to be activated in a state in which "Family" used together by family members is the system user. FIG. 8A shows an example of a display screen immediately after the information processing system 100 is activated. In the example shown in FIG. 8A, a window 320h and a system menu button 330h are displayed on a display screen 310h. A window menu button 321h is displayed in the window 320h. In FIG. 8A and FIGS. 8B to 8F and FIGS. 9A to 9F to be described below, an actual user (the father in the example shown in FIG. 8A) using the information processing system 100 is simulatively shown. Here, the window 320h corresponds to the windows 1300h, 1300f, and 1300m shown in FIG. 5. The window menu button 321h and the system menu button 330h correspond to the menu button 1100 shown in FIG. 5.

The letter "h" suffixed to the reference numerals of the "display screen 310" and the "system menu button 330" indicates the system user (in the example shown in FIG. 8A, "Family"). Further, the letter "h" suffixed to the reference numerals of the "window 320" and the "window menu button 321" indicates the window user of the window (in the example shown in FIG. 8A, "Family"). In the drawings showing the following display screens, the same reference numerals to which different letters are suffixed denote elements that are actually the same except that the system user or the window user is different.

The background (wallpaper) of the display screen 310h may correspond to the system user "Family" and can be set for, for example, each system user. The user can determine a current system user viewing the background of the display screen 310h.

An operation screen of a web browser, that is, a web page, is displayed in the window 320h. The window 320h is a window of which the window user is "Family." For example, in order to indicate the user of the window 320h, the edge of the window 320h is displayed with a different color for each system user. In the example shown in the drawing, the edge of the window 320h with a color corresponding to "Family" is expressed by assigning hatching to the circumference of the window 320h. In this way, when the window user of the window 320h is visually indicated, the user can determine the window user of the window 320h at a glance. However, the embodiment is not limited to this example. For example, by assigning an icon according to the window user to the window 320h, the window user may be displayed in accordance with another method.

In the example shown in the drawing, only one window 320h is displayed on the display screen 310h, but the plurality of windows 320h may be simultaneously displayed. When the plurality of windows 320h are displayed, at least partial regions of the windows 320h can be superimposed and displayed. The user can appropriately change a superimposition order (display order) of the superimposed windows 320h by executing a selection manipulation on one of the superimposed and displayed windows 320h. For example, the selected window 320h can be displayed at the forefront of the windows. The user can execute a task using the plurality of windows 320h while appropriately changing the superimposition order of the windows 320h.

The window menu button 321h is a menu button for executing various processes on the window 320h, for example, a process of changing the window user or a process of generating the slave window. The system menu button 330 is a menu button for executing various processes on the information processing system 100, such as a process of changing the system user and a process of turning on or off the information processing system 100. The user can input an instruction indicating execution of each of the above-described processes through the window menu button 321h and/or the system menu button 330. The user can appropriately change the display positions or the display sizes of the window 320h and the system menu button 330 by executing a drag manipulation, a pinch-in manipulation, a pinch-out manipulation, or the like.

For example, the display screen 310h may be displayed so that the display screen 310h is reproduced at a time point at which a previous task ends, that is, a time point at which previous logout is executed. Specifically, a state of the display positions or the display sizes of the window 320h and the system menu button 330h can be reproduced when the previous system user is switched or the information processing system 100 is turned off. In the example shown in FIG. 8A, a web page for a tour viewed together by family members when logged in as the previous system user "Family" is displayed in the window 320h. In this way, when the state of the display screen 310h at the time of ending of the previous task is reproduced, the user can continue the task from that state, and thus convenience for the user is improved.

In the state shown in FIG. 8A, the father is assumed to execute web browsing in regard to a personal hobby. When the web browsing is executed while the system user is maintained in the "Family" state, there is a possibility of a browsing history of web pages being viewed by other users of the family members. Accordingly, as shown in FIG. 8B, the father switches the system user to "Father" by manipulating the system menu button 330h.

As shown in the foregoing Table 1, the authentication process is necessary when the system user is switched to "Father." FIG. 8C shows a password input screen as an example of the display screen 310h at the time of the authentication process. On the password input screen, as shown in FIG. 8C, for example, a keyboard is displayed on the display screen 310. Then, the user can input text information corresponding to a password by touching displayed keys with his or her fingers. When an authentication process other than the password input is executed, the display screen 310 according to the authentication process is appropriately displayed.

Here, when the keyboard is displayed on the display screen 310, as shown in FIG. 8C, and the password is input with the keyboard, there is a concern of an action of inputting the password being viewed by other users. The method of inputting the password can be unlikely to be a preferred method when the information processing system 100 is used in a situation in which highly confidential information can be used, for example, at a meeting or the like in a company. Accordingly, for example, the information processing system 100 and a portable terminal carried by the user may communicate and the password may be input through the portable terminal. Since the user can input the password at his or her hand using the portable terminal, it is possible to reduce a risk of leakage of the password.

Figure 8D:
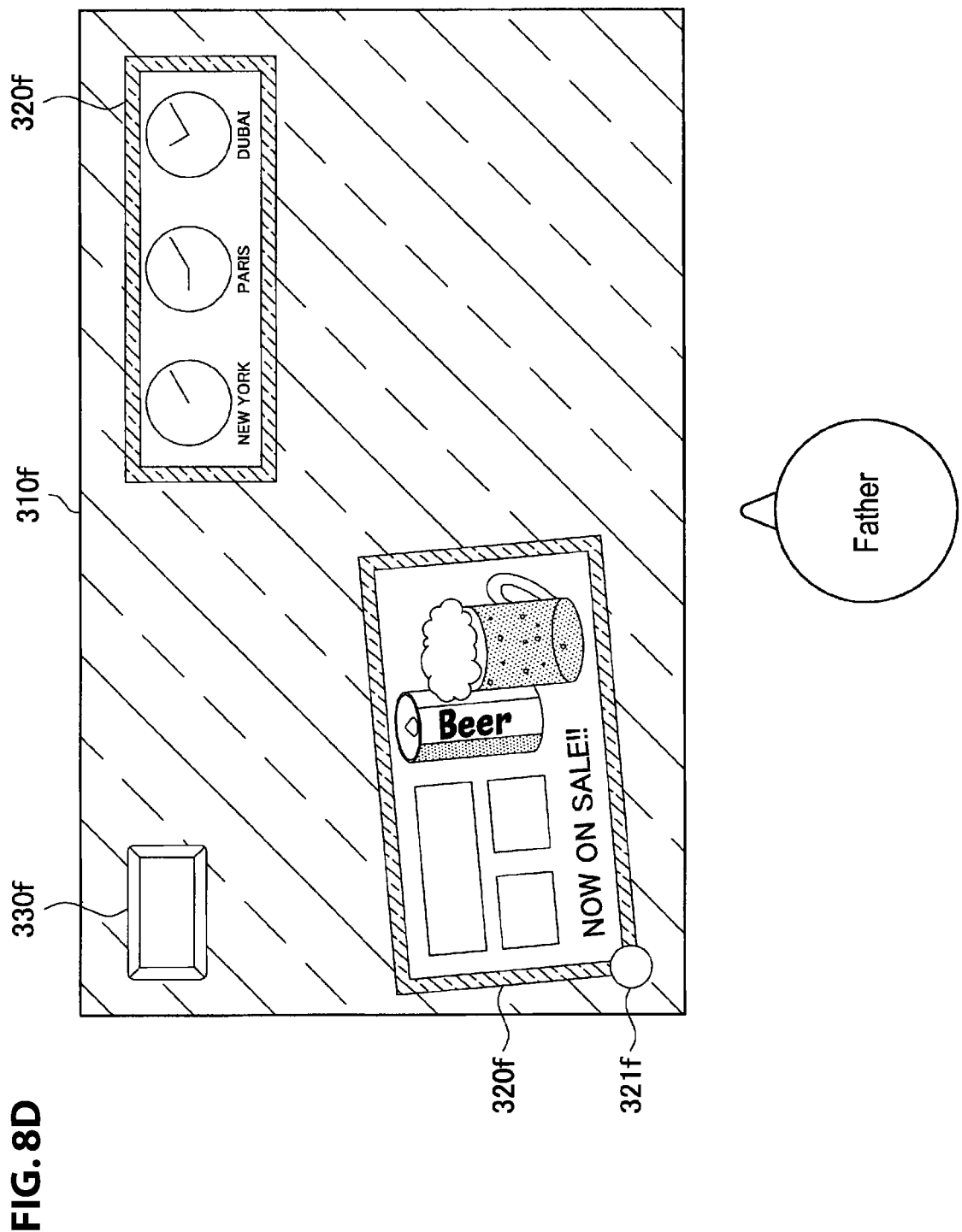
FIG. 8D is a diagram showing an example of a display screen which can be realized by the information processing system.

FIG. 8D shows an example of a display screen 310*f* in a state in which the system user is switched to "Father." On the display screen 310*f*, display at the time of execution of the task with the previous system user "Father" can be reproduced without change, as in the display screen 310*h* shown in FIG. 8A. In the example shown in FIG. 8D, a window 320*f*, a window menu button 321*f*, and a system menu button 330*f* are displayed on the display screen 310*f*. In the background of the display screen 310*f*, a different wallpaper from the case of the system user "Family" shown in FIG. 8A is set to visually clarify a difference between system users. The user of the window 320*f* is "Father." When the web browsing is executed using the window 320*f*, a browsing history of the web browser in the window 320*f* can be linked to the window user "Father." Accordingly, the browsing history in the window 320*f* may not be confirmed from windows in which other window users are set. Thus, the father can execute the web browsing so that the browsing history is not visible to other users.

Further, in the example shown in FIG. 8D, the plurality of windows 320*f* are displayed. A web page is displayed in one window 320*f*. An operation screen of an application (an application displaying times around the world in the example shown in the drawing) normally used by the father is displayed in another window 320*f*. In this way, all the applications can be displayed in the windows 320*f* as well as the web browser. The display of the windows 320*f* in which various applications are displayed can be reproduced whenever the system user is switched to "Father." Accordingly, when the applications such as mail software and a weather forecast report application used every morning by the father are opened in the windows 320*f*, the display screen 310*f* in which these applications are activated is displayed merely by starting the information processing system 100 in the morning and switching the system user to "Father," and thus it is possible to save the effort of activating the applications deliberately.

A child (son) is assumed to approach and attempt to execute the web browsing like the father in the state shown in FIG. 8D. In this case, for example, it can be considered that the system user is switched to "Family" or "Son" and the son executes web browsing. However, when the father also desires to continue the web browsing, a use method of newly generating a window 320*f* to be usable by the son while the system user is maintained as "Father" is considered. Accordingly, the father newly generates a window 320*f*, for example, as shown in FIG. 8E. In the example shown in the drawing, the newly generated window 320*f* is derived and generated from the existing window 320*f* and is a so-called slave window. Therefore, the same window user (that is, "Father") as the existing window 320*f* which is a master window is set in the newly generated window 320*f* and the same web page is displayed.

Since it is not preferable to allow the son to use the window 320*f* of which the window user is "Father" without change, a process of changing the window user of the newly generated window 320*f* is executed. For example, as shown in FIG. 8E, the window user can be switched by manipulating the window menu button 321*f*.

An example of the display screen 310*f* after the user of the newly generated window 320*f* is changed to "Son" is shown in FIG. 8F. In FIG. 8F, one of the windows 320*f* shown in FIG. 8E is changed to a window 320*s* of which the window user is "Son." For example, by showing the edge of the window 320*s* with a different color from the window 320*f*, display is executed to distinguish the window users from each other.

In the embodiment, when the window user is changed, display of the window is updated. Here, the web page viewed by the father in the window 320*f* of the father is assumed to be a page unsuitable for the child which is a parental control target. As shown in the foregoing Table 1, the parental control functions validly in the window 320*s* of which the window user is "Son." Therefore, in the example shown in FIG. 8F, the same web page as the window 320*f* of which the window user is "Father" is not displayed in the window 320*s* as a result of the switch of the window user and update of the display. In the window 320*s*, a browsing history of the windows 320*f* may not be referred to. In this way, according to the embodiment, it is possible to appropriately restrict the information which can be referred to by the child even when the display screen 310*f* is shared between the father and the child.

The example of the display screen which can be realized by the information processing system 100 has been described above with reference to FIGS. 8A to 8F. As described above, in the embodiment, the window user can be set for each window irrespective of the system user. Accordingly, it is possible to subtly execute, for example, the control of the browsing history or the restriction of the browsing target for each window.

(4-2. Second Display Example)

Another example of a display screen which can be realized by the information processing system 100 will be described with reference to FIGS. 9A to 9F. FIGS. 9A to 9F are diagrams illustrating another example of the display screen which can be realized by the information processing system 100.

In the examples shown in FIGS. 9A to 9F, a case in which the information processing system 100 is used at a home is assumed. The display example is an example of display when the information processing system 100 has a function of managing expenditure of the home. Specifically, the information processing system 100 has a function of setting an amount of money (budget) which can be used for each system user and window user and restricting purchase of articles by mail order through a web browser or the like to the amount of money or less. The restriction of the purchase of articles can be realized by restricting execution of an application related to the purchase of articles according to a use amount of money for each window user by, for example, the user information management unit 242 and the window processing unit 243 shown in FIG. 6. That is, in the display example, the execution authority of the application according to the usable amount of money is given for each window user. The usable amount of money for each system user and window user is stored in, for example, the user information storage unit 230 shown in FIG. 6 in linkage with each user account. For example, the usable amount of money for the system user and the window user can be set as in the following Table 2.

TABLE 2

| System user and window user | Budget | Budget addition |
|---|---|---|
| Mother | unrestricted | possible |
| Father | ¥20,000 | not possible |
| Son | ¥1,000 | not possible |
| Daughter | ¥500 | not possible |
| Guest | ¥0 | not possible |
| Food expenses | ¥50,000 | not possible |
| Book expenses | ¥40,000 | not possible |
| Other expenses | ¥15,000 | not possible |

"Mother" is a user that is personally used by a mother. To purchase articles used for all the housework, "Budget" (a usable upper limit amount of money every month) is set unrestrictedly. "Mother" has authority to add to the budgets of other users, and thus can give an allowance to other users temporarily or increase the use upper limit amount of money of a user for food expenses or book expenses.

"Father" is a user that is used personally by a father. Budget is set to 20,000 yen.

"Son" is a user that is used personally by a son. Budget is set to 1,000 yen.

"Daughter" is a user that is used personally by a daughter. Budget is set to 500 yen.

"Guest" is a guest user other than family members. Budget is set to 0 yen, and thus no purchase of articles by people other than the family members is possible.

"Food expenses" is not a user linked to a person but is a user corresponding to food expenses of the household. Budget is set to 50,000 yen.

Similarly, "Book expenses" is not a user linked to a person but is a user corresponding to book expenses of the household. Budget is set to 40,000 yen.

Similarly, "Other expenses" is not a user linked to a person but is a user corresponding to other expenses of the household. Budget is set to 15,000 yen.

Hereinafter, transition of the display screen according to a specific use example of the information processing system 100 will be described with reference to FIGS. 9A to 9F.

Figure 9A:
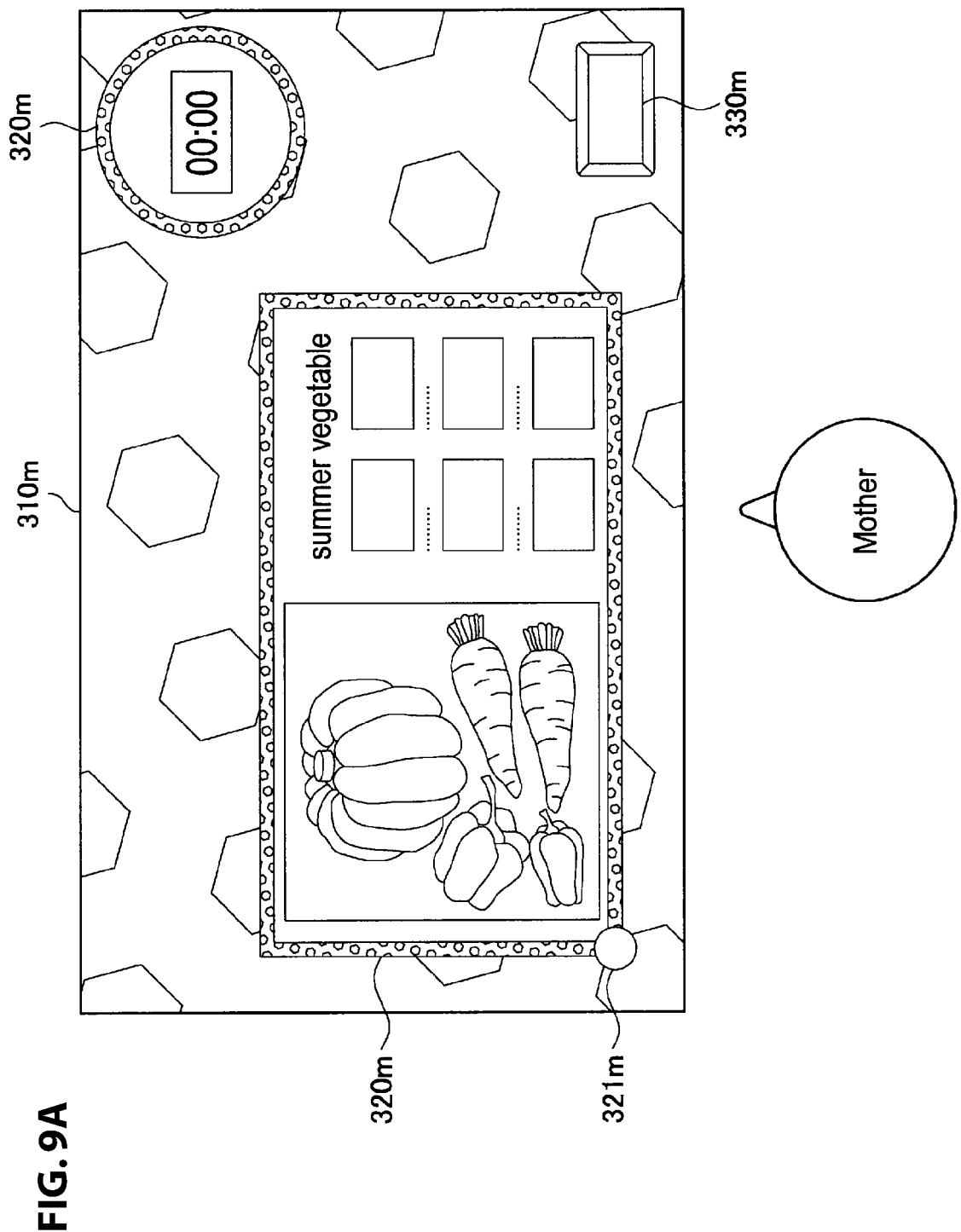
FIG. 9A is a diagram showing another example of the display screen which can be realized by the information processing system.

First, the mother logs in to the information processing system 100 as the system user "Mother." FIG. 9A illustrates an example of a display screen for the system user "Mother." In the example shown in FIG. 9A, a window 320m and a system menu button 330m are displayed in a display screen 310m. A window menu button 321m is displayed in the window 320m.

The background (wallpaper) of the display screen 310m corresponds to the system user "Mother" and is, for example, a different background from the display screens 310h and 310f of the system users "Family" and "Father" shown in FIGS. 8A and 8D. In the window 320m, display indicating the window user is executed. In the example shown in FIG. 9A, the edge of the window 320m with, for example, a different color from the window users "Family," "Father," and "Son" shown in FIGS. 8A and 8D is expressed by assigning a different kind of hatching.

For example, a web page of a mail order is displayed in the window 320m. The mother browses the web page to find an article which the mother desires to purchase. Here, in the example shown in FIG. 9A, the plurality of windows 320m are displayed. A web page related to the above-described mail order is displayed in one window 320m and an operation screen of an application (an application functioning as a kitchen timer in the example shown in the drawing) normally used by the mother is displayed in another window 320m. In this way, various applications can be displayed in the windows 320m and the display of the windows 320m in which the various applications are displayed can be reproduced when the system user is switched to "Mother."

Figure 9B:
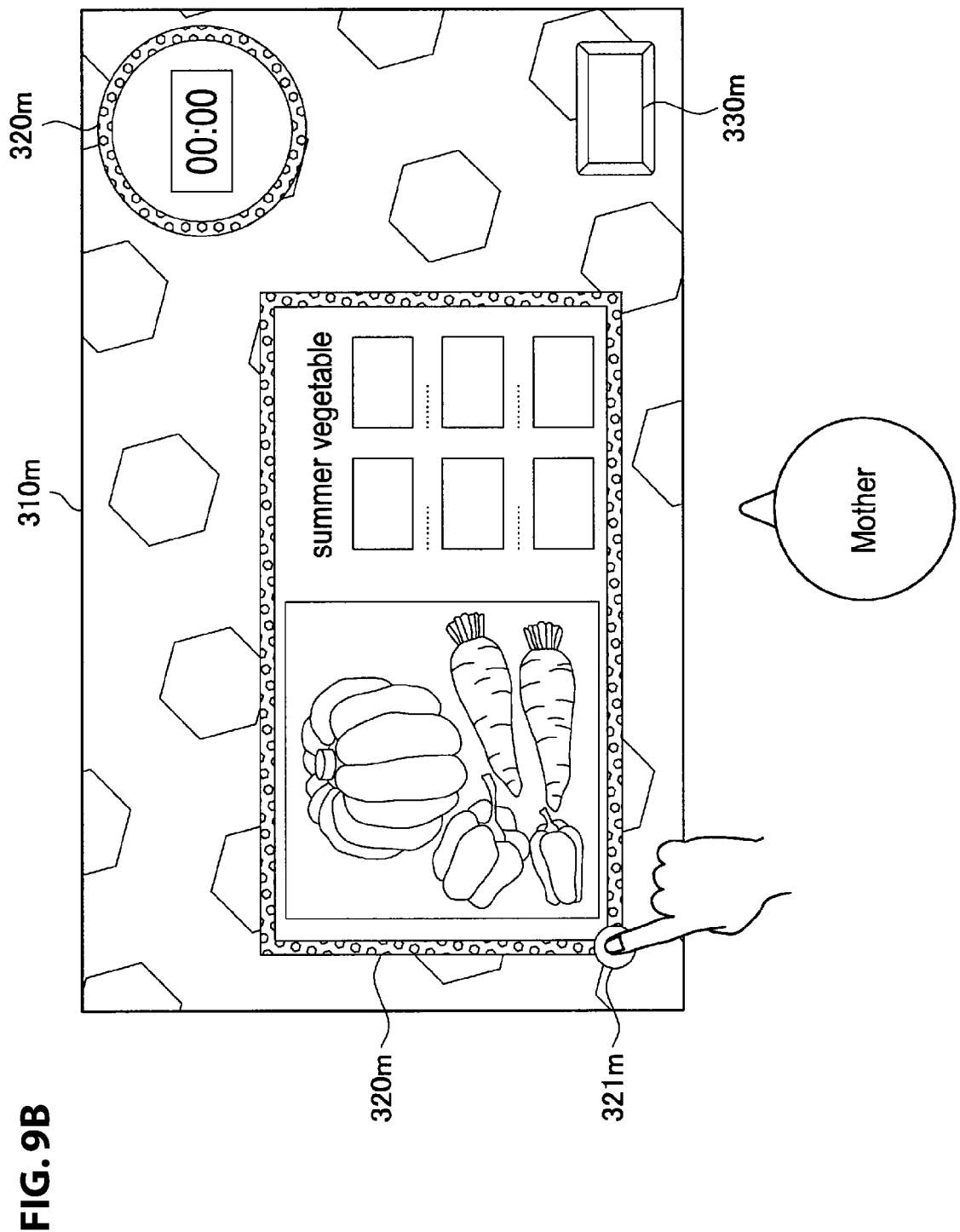
FIG. 9B is a diagram showing another example of the display screen which can be realized by the information processing system.

For example, foodstuffs which the mother desires to purchase are found in the state shown in FIG. 9A. In this case, in order for the mother to purchase the foodstuffs from the food expenses of the household, the window user of the window 320m is switched to "Food expenses." A process of switching the window user can be executed by manipulating the window menu button 321m of the window 320m of which the window user is desired to be switched, for example, as shown in FIG. 9B.

For example, when the window user is switched to "Food expenses," the authentication process is assumed to be necessary. In this case, as shown in FIG. 9C, the display screen 310 for executing the authentication process is displayed. FIG. 9C shows a password input screen as an example of the display screen 310m at the time of the authentication process. As in the authentication process at the time of switch of the system user described with reference to FIG. 8C, any of various known authentication processes may also be applied to the authentication process at the time of switch of the window user.

FIG. 9D shows an example of the display screen 310m in the state in which the window user of one window 320m is switched to "Food expenses." A window 320e is a window of which the window user is "Food expenses" and display is executed to distinguish the window users from each other, for example, showing the edges of the window 320e with a different color from the window 320m. In the example shown in FIG. 9D, a purchase confirmation screen (payment screen) is displayed in the window 320e. When a purchase process (payment process) is executed in the state in which the window user is "Food expenses," the purchase sum of money is deducted from Budget of "Food expenses." Specifically, for example, the sum of money of Budget associated with "Food expenses" stored in the user information storage unit 230 shown in FIG. 6 is updated to a remaining balance (that is, a remaining amount of balance of food expenses usable this month) by deducting the purchase sum of money. When the purchase sum of money exceeds the balance of Budget, the information processing system 100 does not execute the process of purchasing the articles and executes an alert such as display of a warning indicating that the balance of Budget is insufficient for the user. In this way, when the balance or a purchase history is managed for each category of the purchased commodities (foodstuffs or books), management of the household is easy. Further, it is possible to prevent the articles over the set Budget from being purchased.

Figure 9E:
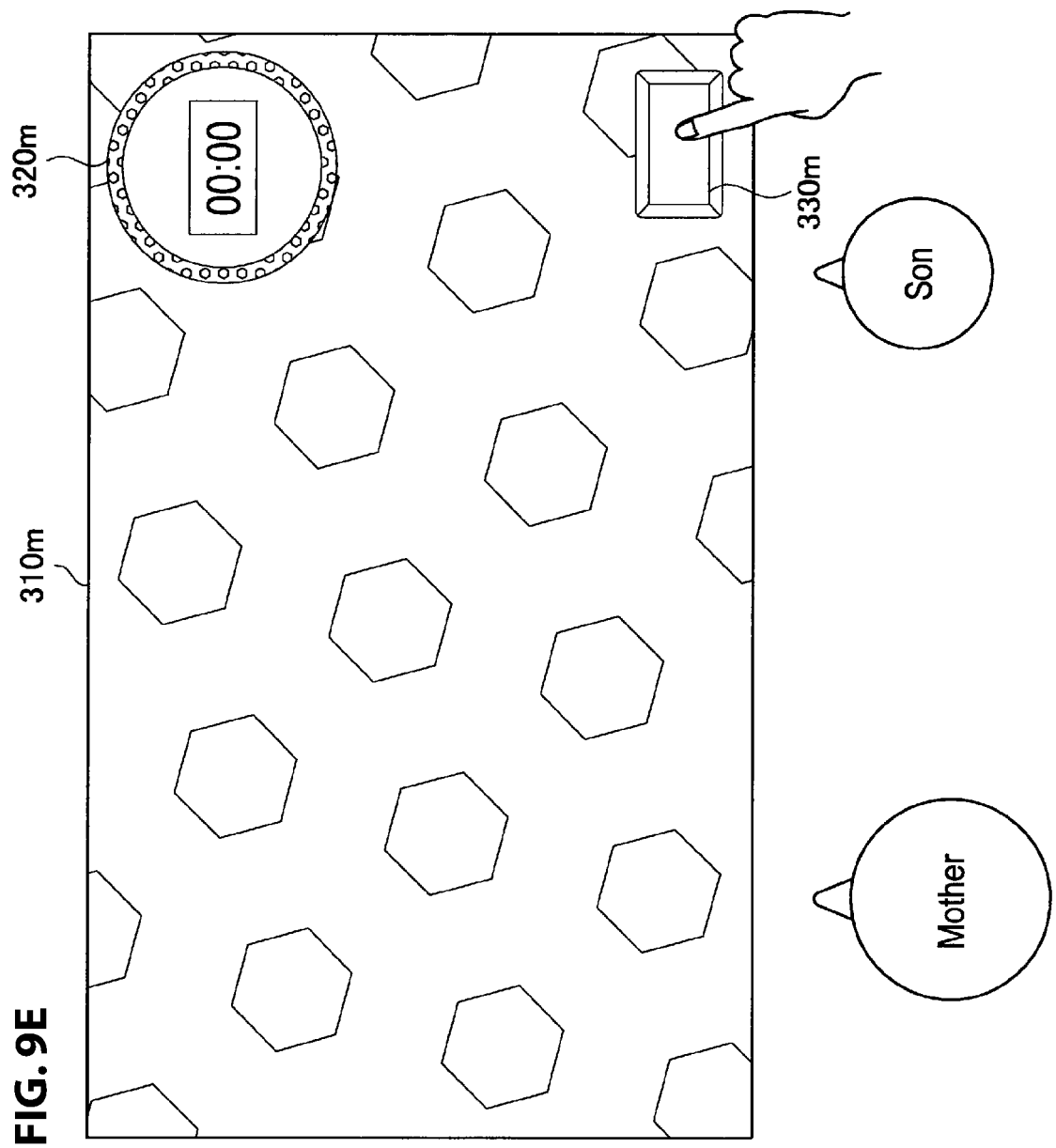
FIG. 9E is a diagram showing another example of the display screen which can be realized by the information processing system.

After the purchase process ends in the state shown in FIG. 9D, a child (son) is assumed to approach and shop like his mother through a web site of a mail order. The mother can newly generate a window of which the window user is "Son" while the system user is maintained as "Mother." A process of newly generating a window can be executed by manipulating the system menu button 330m, for example, as shown in FIG. 9E. A process of setting a window user in the newly generated window can be executed, for example, by manipulating the window menu button of the newly generated window.

Figure 9F:
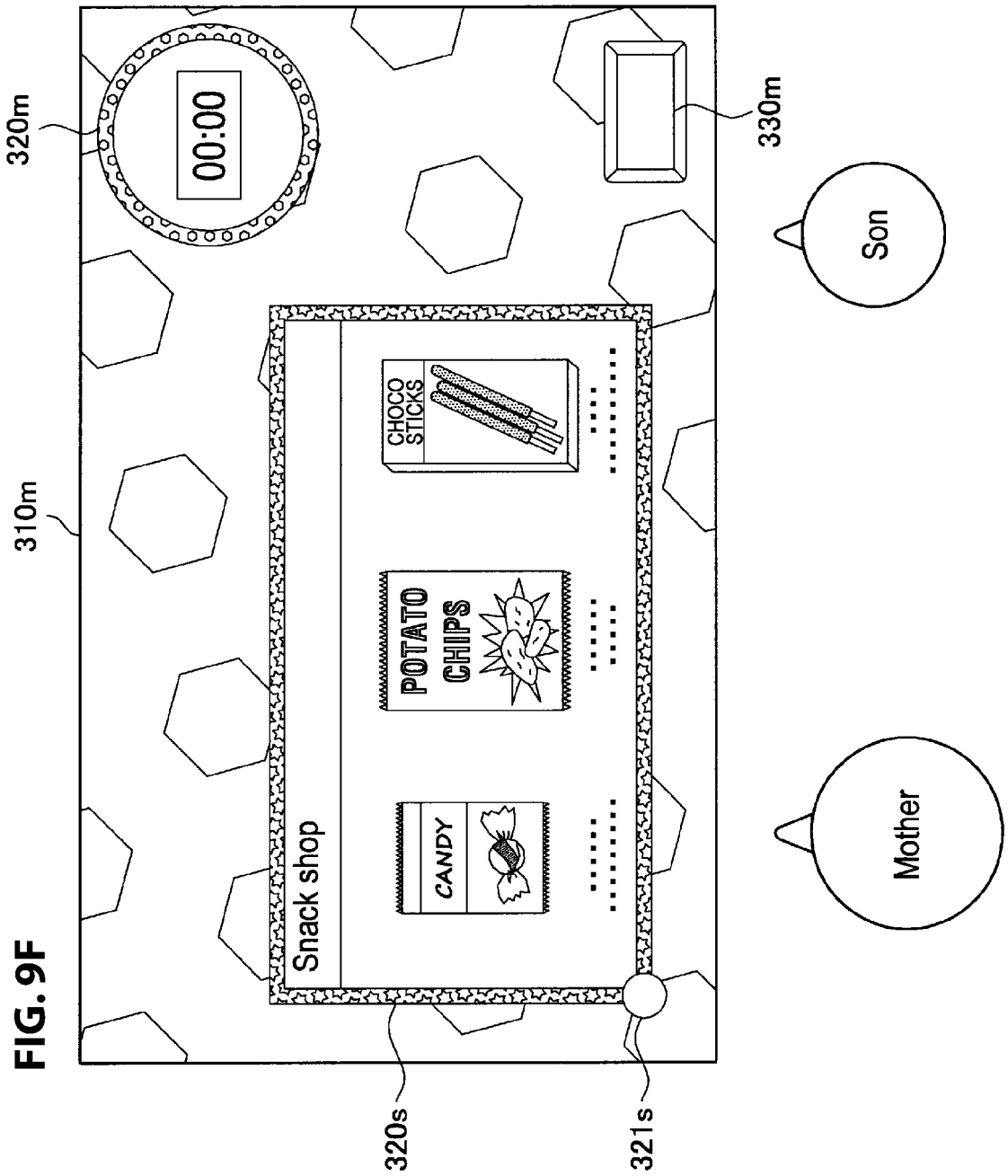
FIG. 9F is a diagram showing another example of the display screen which can be realized by the information processing system.

FIG. 9F shows a form of the display screen 310m on which the window 320s of which the window user is "Son" is displayed. For example, the edges of the window 320s are displayed differently to indicate that the window user is "Son" as in the window 320s shown in FIG. 8F. In the example shown in FIG. 9F, a web page of a mail order for purchasing sweets is displayed in the window 320s. The son can purchase sweets within a range of Budget set for the user "Son" through the web page displayed in the window 320s.

The other example of the display screen which can be realized by the information processing system 100 has been described above with reference to FIGS. 9A to 9F. As described above, by switching the window user for each window, setting Budget for each window user, and managing the expenses for each window user, for example, it is possible to prevent, for example, an incident in which the child purchases a large number of articles using the authority of the parent. By defining food expenses, book expenses, incidental expenses, or the like as a window user, appropriately changing the window user according to articles to be purchased, and executing a purchase process, it is possible to clearly manage a purchase history, a budget upper limit, a usable balance, or the like for each use such as food expenses or book expenses.

5. Modification Examples

Several modification examples of the above-described embodiment will be described. Hereinafter, modification examples of the display screen will be mainly described. Display of the display screen in each modification example can be controlled by the display control unit 244 shown in FIG. 6. In the description of each modification example, a case in which the system user and the window user shown in the foregoing Table 1 are set will be described as an example. In the description of the display screen in each modification example, the details of the matters described above in the foregoing section (4. Display examples) will be omitted. In the drawings in which the display screen in each modification example is shown, display of each window is not shown for simplicity. Regions in the windows may be blank in the drawings, but practically any information can be displayed in the windows.

(5-1. Handover of Display of Window)

In the above-described embodiment, the display screen is prepared for each system user, and the display screen corresponding to each system user is displayed when the system user is switched. When the system user is switched by executing such display control, the display screen is reproduced in the state in which a task ends at the time of previous logging in by the system user. Therefore, the user can continue the task without opening the window again. However, when such display control is executed, the display of the window is not handed over before and after the switch of the system user. Therefore, it is necessary for the user executing a task using the window to interrupt the task with the switch of the system user, and thus there is a possibility of an inconvenience occurring. Accordingly, in the embodiment, display of a window may be handed over at the time of switch of a system user.

A modification example in which the display of the window is handed over at the time of switch of the system user will be described with reference to FIGS. 10A and 10B. FIGS. 10A and 10B are diagrams showing an example of a display screen in the modification example in which the display of the window is handed over at the time of switch of the system user.

FIG. 10A shows an example of the display screen 310h of the system user "Family." In the example shown in FIG. 10A, for example, a window 320h in which a web page is displayed to be viewed together by family members is displayed on the display screen 310h. The window user of the window 320h is "Family."

In this state, the system user is assumed to be switched to "Father." FIG. 10B shows an example of the display screen 310f after the switch of the system user. Referring to FIG. 10B, the window 320h displayed on the display screen 310h of the system user "Family" is displayed on the display screen 310f of the system user "Father" without change.

In this way, in the modification example, the display of the window 320h is handed over when the system user is changed. When the system user is changed by executing the display control, the same window 320h is handed over. Therefore, the user can continuously use the window 320h. When the window is already on the display screen 310f of the system user "Father" and the display position is superimposed with the window 320h to which the display is handed over, a plurality of windows may be superimposed and displayed. The user can appropriately change a superimposition order (display order) of the superimposed windows by executing a manipulation of selecting the window. Therefore, even when the plurality of windows are superimposed and displayed, the user feels no particular inconvenience.

Here, when the display of the window is handed over at the time of switch of the system user and display of all the windows is automatically handed over, it is inconvenient for the user in some cases. For example, a case in which the system user is switched to "Family" is considered since a child approaches during browsing of a web page including details harmful to the child on the display screen 310f of the system user "Father." In this case, when the display of the window is handed over, the web page including the details harmful to the child will be displayed without change.

Figure 11B:
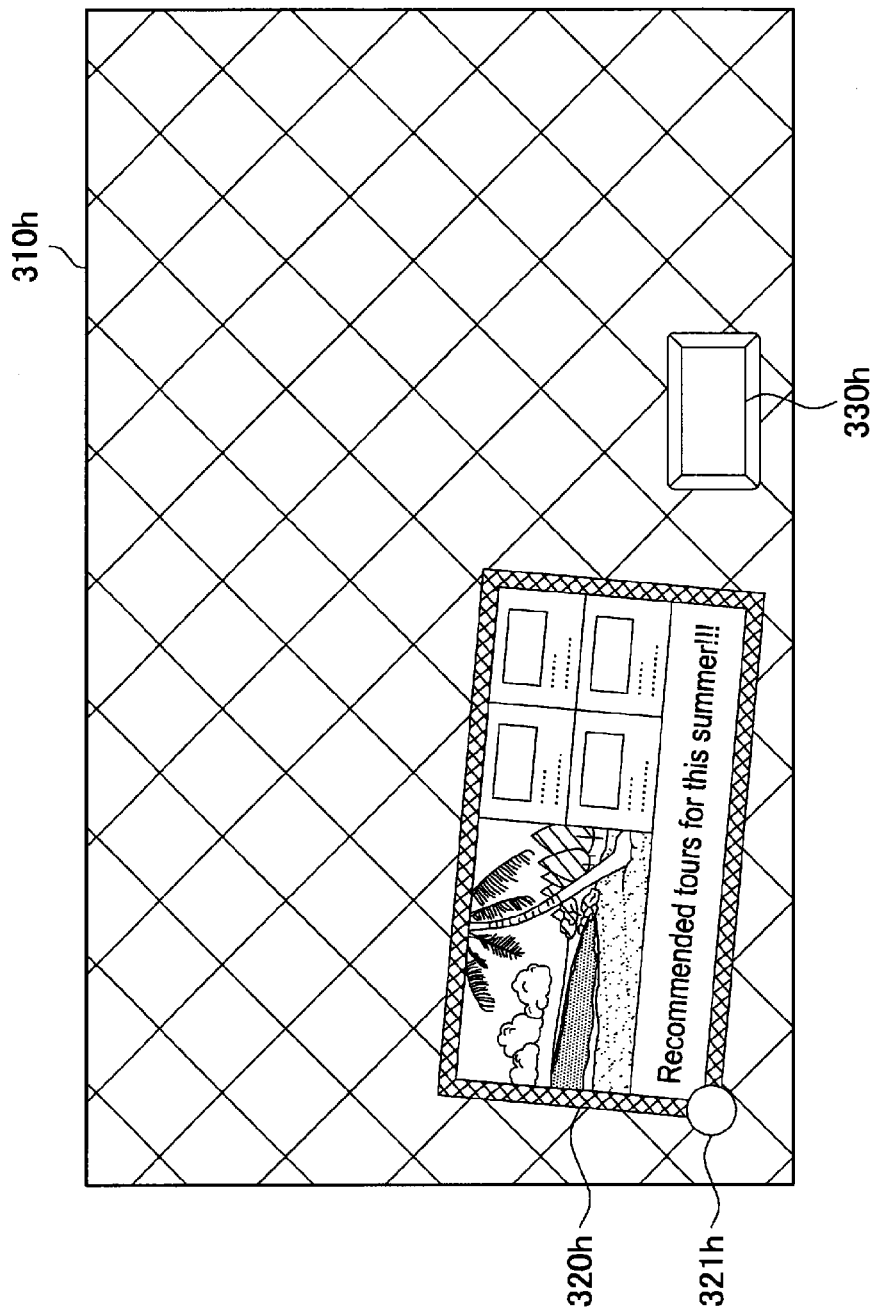
FIG. 11B is a diagram showing an example of a display screen on which display control is executed in consideration of authority set for each system user in a modification example when the display of the window is handed over.

Accordingly, in the modification example, display control may be executed in consideration of authority set for each system user when display of a window is handed over. The modification example in which the display control is executed in consideration of authority set for each system user at the time of handover of the display of the window will be described with reference to FIGS. 11A and 11B. FIGS. 11A and 11B are diagrams showing an example of a display screen in the modification example in which display control is executed in consideration of authority set for each system user at the time of handover of display of a window.

FIG. 11A shows an example of the display screen 310f of the system user "Father." In the example shown in FIG. 11A, the window 320h in which, for example, a web page viewed together by family members is displayed and the window 320f in which a web page which is viewed personally by a father and is a parental control target is displayed are displayed on the display screen 310f The user of the window 320h is "Family" and the user of the window 320f is "Father."

In this state, the system user is assumed to be switched to "Family." FIG. 11B shows an example of the display screen 310h after the switch of the system user. Referring to FIG. 11B, the window 320h of which the window user is "Family" is displayed on the display screen 310h without change after the system user is switched. However, the window 320f of which the window user is "Father" is not displayed on the display screen 310*h* and the display is not handed over. In this way, in the modification example, at the time of switch to the system user in which the parental control is set to be valid, the display control in which the display is not handed over may be executed on the window in which parental control target details are displayed.

In the example shown in FIGS. 11A and 11B, as shown in the foregoing Table 1, the system user "Family" is set such that the parental control is valid. On the other hand, the web page which is the parental control target is displayed in the window 320*f* Accordingly, the window 320*f* is not displayed on the display screen 310*h* after the switch of the system user. Such display control can be realized when the user information management unit 242 shown in FIG. 6 executes a process of selecting a handover target window, for example, by comparing the authority set for the switched system user to display details of each window with reference to the user information storage unit 230 and supplies the processing result to the display control unit 244.

In this way, by executing a process of determining whether the window is handed over in consideration of the authority set for the system user, it is possible to appropriately prevent the display of a window that is inconvenient at the time of display from being handed over. Instead of not displaying a window which is not a handover target, the user may be notified that there is a window of which details are invisible, for example, by displaying an icon so that whether to display the window can be selected according to a manipulation by the user. A window to which display is handed over may be settable in advance for each window user. Thus, display of only a window in which a predetermined window user is set is handed over at the time of switch of the system user.

The modification example in which the display of the window is handed over at the time of switch of the system user has been described with reference to FIGS. 10A to 11B. According to the modification example, by handing the display of the window over at the time of switch of the system user, the user can continuously use the window, and thus convenience for the user is further improved. When the display of the window is handed over, it is possible to control the display of the window more appropriately by executing a process of determining whether there is display in consideration of the authority set for the system user.

Here, as described in the foregoing section (2. Functional configuration of information processing system), in the embodiment, the history of the display details of the window is managed for each window user. Accordingly, when a certain window user is set in a window, details displayed recently in another window in which the window user is set may be reproduced in the window in which the window user is newly set. For example, a history of display details of the window for each window user is stored in the user information storage unit 230 shown in FIG. 6. For example, when information indicating that the window user is set in a certain window is received as manipulation information, the user information management unit 242 shown in FIG. 6 acquires information regarding display details of the window corresponding to the window user from the user information storage unit 230 and supplies the information to the display control unit 244, so that the foregoing display control in the window can be realized. By executing such display control, for example, the state of the display screen 310*f* shown in FIG. 10B can be realized even when a new window is generated after switch of the system user to "Father" and the window user of the window is set to "Family." Thus, even when the display control according to the modification example is not executed, the window can be continuously used.

(5-2. Setting of Window User in Accordance with Display Position)

In the above-described embodiment, the window user is set in each window, for example, by manipulating the window menu button disposed in each window. For example, the window user of the newly generated window is set according to the window user of the system user or the master window. However, the embodiment is not limited to this example, but a window user may be set in accordance with another method.

Figure 12:
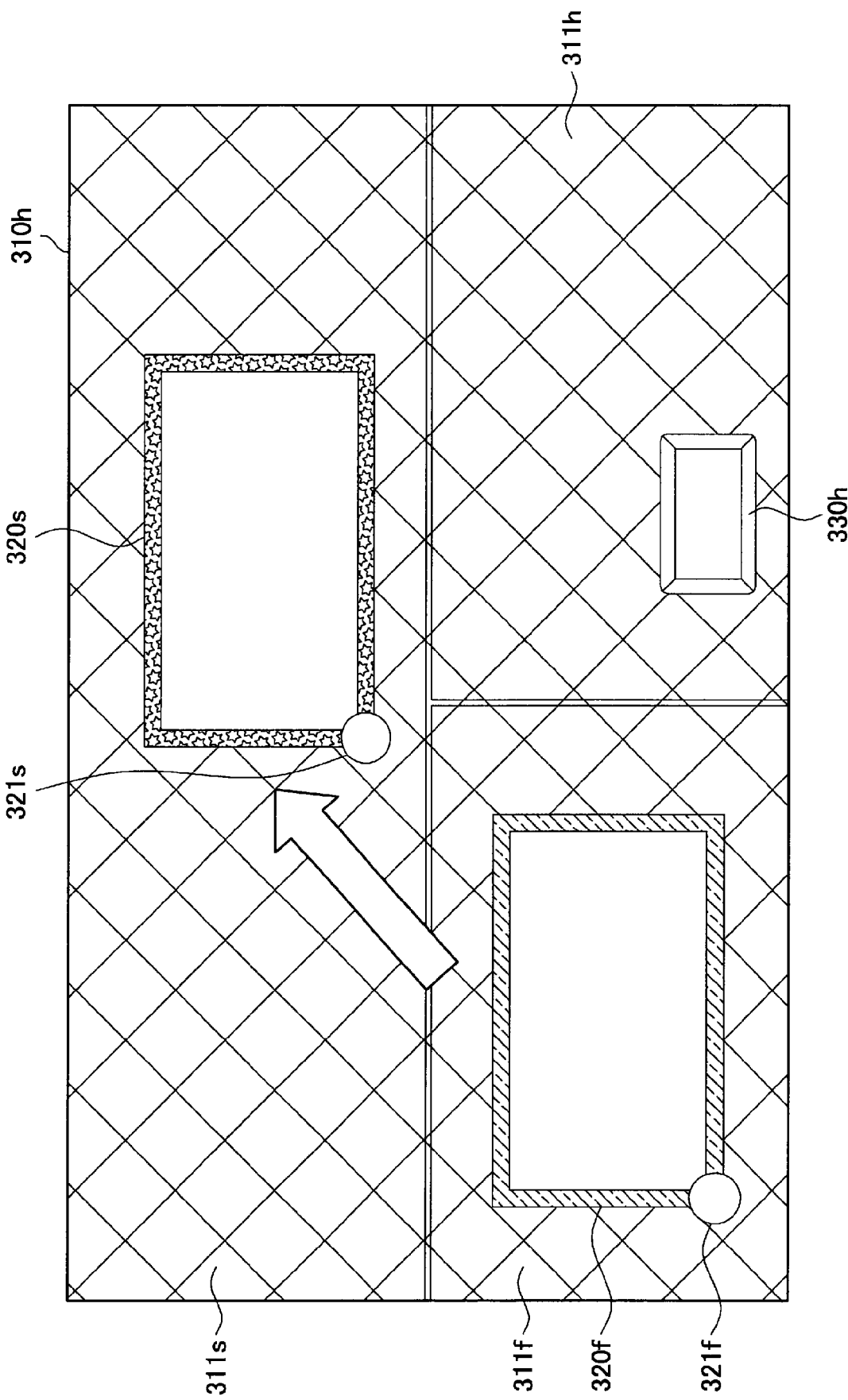
FIG. 12 is a diagram showing an example of a display screen on which a window user is set in accordance with a display position of a window in a modification example.

A modification example in which a window user is set according to a display position of a window will be described with reference to FIG. 12. FIG. 12 is a diagram showing an example of a display screen on which a window user is set in accordance with a display position of a window in the modification example.

Referring to FIG. 12, an example of a display screen 310*h* of the system user "Family" is shown. In the modification example, the display screen 310*h* is partitioned into a plurality of use regions corresponding to respective users. In the example shown in FIG. 12, the display screen 310*h* is partitioned into a son use region 311*s*, a father use region 311*f*, and a family use region 311*h*. The method of partitioning the display screen 310*h* is not limited to the example shown in the drawing, but the number of use regions, the sizes of the use regions, the positions of the use regions, and the like may be able to be set arbitrarily on the display screen 310*h*. Alternatively, the information processing system 100 may detect the actual positions of the users on the display screen 310*h* and execute personal recognition of each user, and the use regions of the respective users may be automatically set according to the detection result and the recognition result.

In the modification example, the window user of the window can be set according to the user set in the use region in which the window is located. For example, the window user of the window displayed in the father use region 311*f* is set to "Father." Thus, since the use region on the display screen 310*h* and the window user of the window are automatically matched, the window user is appropriately set according to each user without deliberately setting the window user.

In the modification example, when the display position of the window is moved, the window user may be automatically changed according to a moved display position. For example, FIG. 12 shows a form in which the window user of the window moved from the father use region 311*f* to the son use region 311*s* is changed from "Father" to "Son." In this way, by automatically changing the window user of the window according to the user corresponding to the use region displayed after movement when the display position of the window is moved, it is possible to change the window user more easily.

The modification example in which the window user is set according to the display position of the window has been described with reference to FIG. 12. As described above, according to the modification example, the window user of the window is automatically set according to the user set in the use region in which the window is displayed. Accordingly, the user set in the use region is automatically identical to the window user of the window displayed in the use region, and thus convenience for the user is improved. By automatically changing the window user according to the display position after movement when the window is moved, it is possible to set the window user more easily.

(5-3. Iconization in Accordance with Display Position when Display of Window is Handed Over)

In the foregoing section (5-1. Handover of display of window), the modification example in which the display of the window is handed over at the time of switch of the system user was described. In the foregoing section (5-2. Setting of window user in accordance with display position), one display example in which the use regions are set on the display screen was described. Here, by executing display control in consideration of use regions when the system user is switched and the display of the window is handed over, it is possible to further improve convenience for the user.

Figure 13B:
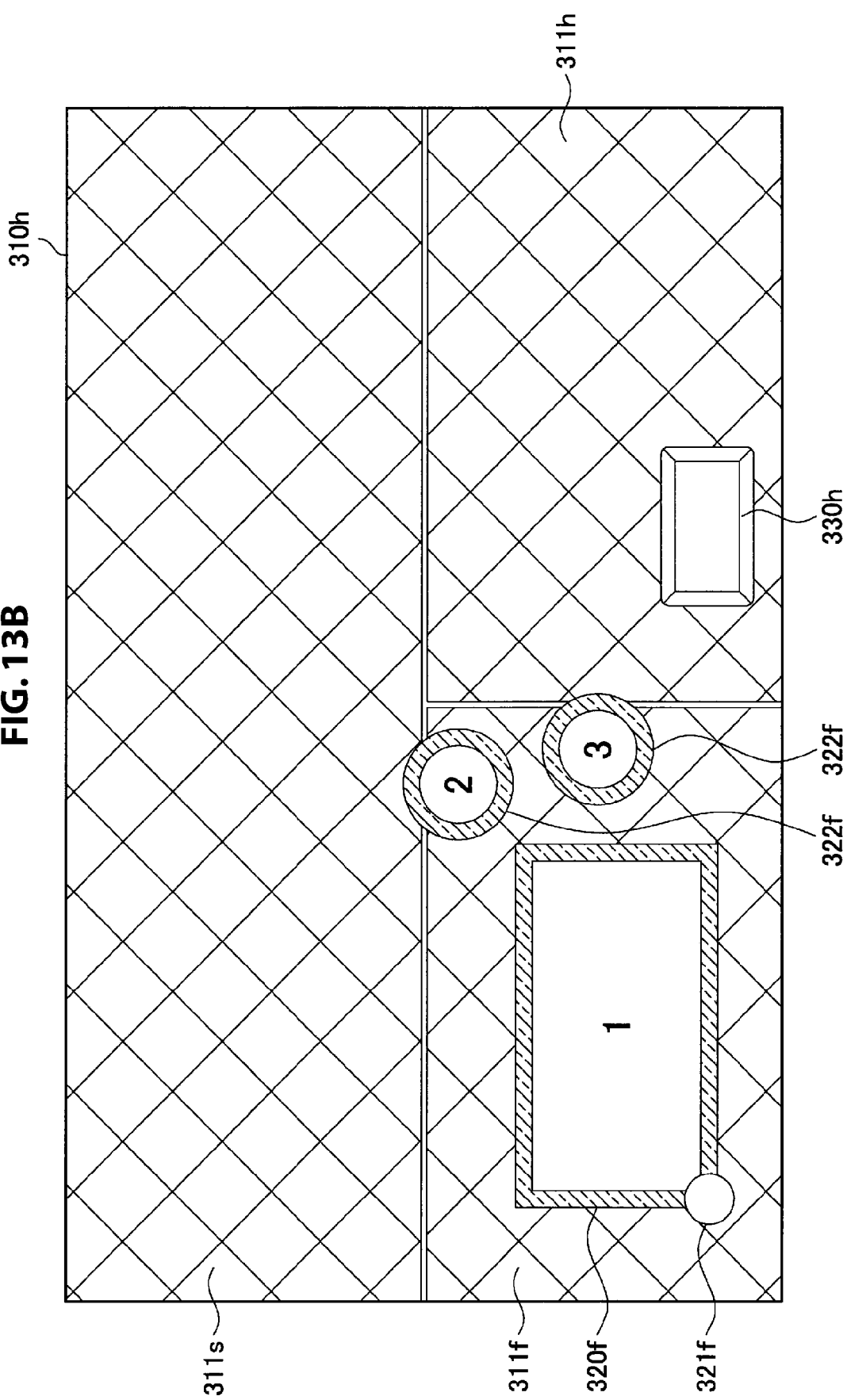
FIG. 13B is a diagram showing an example of a display screen on which display control is executed in consideration of use regions in a modification example when display of a window is handed over.

A modification example in which the display control is executed in consideration of use regions when display of a window is handed over will be described with reference to FIGS. 13A and 13B. FIGS. 13A and 13B are diagrams illustrating an example of a display screen on which the display control is executed in consideration of use regions in a modification example when display of a window is handed over.

FIG. 13A shows an example of the display screen 310f of the system user "Father." In the example shown in FIG. 13A, a father opens the plurality of windows 320f to execute a task. The window user of each window 320f is "Father."

In this state, the system user is assumed to be switched to "Family." FIG. 13B shows an example of the display screen 310h of the system user "Family" after the switch of the system user. Here, for example, use regions are assumed not to be set in the display screen 310f of the system user "Father" and use regions are assumed to be set in the display screen 310h of the system user "Family." For example, as shown in FIG. 13B, the son use region 311s, the father use region 311f, and the family use region 311h are installed on the display screen 310h of the system user "Family." The use regions are not set on the display screen 310f of the system user "Father," but virtual use regions after the switch of the system user are indicated by double dotted lines in FIG. 13A for the sake of description.

In this case, the father can freely display the window 320f without worrying about the use regions while using the window 320f with the system user "Father." Accordingly, when the system user is switched to "Family" and the display of the window 320f is handed over, there is a possibility of the window 320f being displayed in the use region of a user other than the father. Accordingly, when the display control described in the foregoing section (5-2. Setting of window user in accordance with display position) is set to function validly, there is a possibility of the user of the window 320f being changed unintentionally according to the disposition of the use region of the display screen 310h after the switch of the system user. The window 320f is displayed in the use region of another user, and thus there is concern of a task of the other user being obstructed.

Accordingly, in the modification example, when a window user of a window is identical to a user set in a use region in which the window is displayed at the time of switch of the system user and handover of the display of the window, display details, the display position, and the like of the window are handed over without change. However, when the window user of the window is not identical to the user set in the use region in which the window is displayed, display control is executed to iconize and display the window 320f. FIG. 13B shows a form in which the display details, the display position, and the like of the window 320f displayed in the father use region 311f among the windows 320f shown in FIG. 13A are handed over without change at the time of switch of the system user and the handover of the display of the window 320f, and the windows 320f displayed in the use regions 311s and 311h of the other users are displayed as icons 322f. In FIGS. 13A and 13B, to clarify a correspondence relation between the window 320f and the icons 322f before and after the switch of the system user, numbers are assigned inside the windows 320f and the icons 322f for convenience.

In the icons 322f, for example, display such as thumbnails indicating overviews of the display details of the corresponding windows 320f may be executed. The user can input an instruction of whether to display the windows 320f corresponding to the icons 322f by selecting the icons 322f. In this way, by iconizing and displaying the windows 320f according to the display positions at the time of handover of the display of the windows 320f, it is possible to execute actual handover of the windows 320f without intruding into the use regions 311s and 311h of the other users.

The modification example in which the display control is executed in consideration of the use regions at the time of the handover of the display of the windows has been described above with reference to FIGS. 13A and 13B. As described above, according to the modification example, it is possible to determine whether to hand over the display of the window without change or iconize and display the window according to the users set in the use regions in which the window is displayed when the system user is switched and the display of the window is handed over. Accordingly, for example, it is possible to prevent the window in which a certain window user is set from being displayed in the use regions of the other users, and thus it is possible to execute sharing of the display screen between the plurality of users more smoothly.

(5-4. Display of Window Management Bar)

As described in the foregoing section (1. Overview of information processing system), in the embodiment, the window user can be set for each window apart from the system user. Accordingly, a plurality of windows in which mutually different window users are set can be displayed on one display screen in some cases. As described in the foregoing section (1-2. Display control example), the user display indicating the window user is executed in the window, for example, by showing the edge of the window with a different color for each window user. Therefore, when the user views the window, the user can confirm the window user set in the window. However, when the number of windows displayed at once is large, there is a possibility of the window user of each window being difficult to ascertain.

Figure 14:
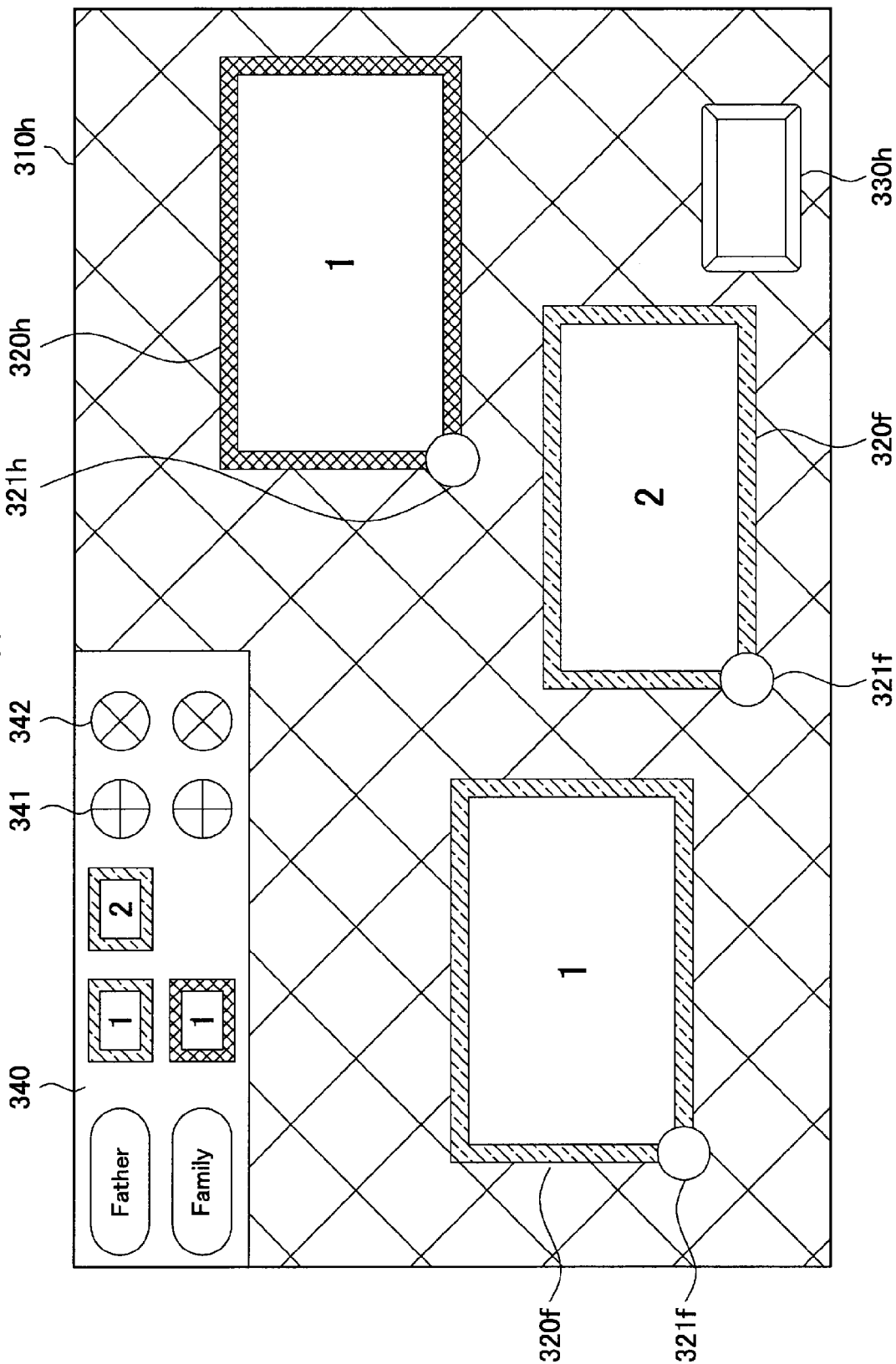
FIG. 14 is a diagram showing an example of a display screen on which a window management bar is displayed in a modification example.

Accordingly, in a modification example, a window management bar is displayed on the display screen to manage windows. The modification example in which the window management bar is displayed will be described with reference to FIG. 14. FIG. 14 is a diagram showing an example of a display screen on which a window management bar is displayed in the modification example.

FIG. 14 shows an example of the display screen 310h of the system user "Family." In the example shown in FIG. 14, two windows 320f of which the window user is "Father" and one window 320h of which the window user is "Family" are displayed on the display screen 310h. In the modification example, a window management bar 340 is displayed in a partial region of the display screen 310h.

The window management bar 340 is used to manage the plurality of windows 320f and 320h displayed on the display screen 310h en bloc for the respective window users set in the windows 320f and 320h. In the window management bar

340, for example, the windows 320f and 320h currently displayed on the display screen 310h are arranged and disposed side by side for the respective window users. In the window management bar 340, for example, the windows 320f and 320h are iconized and displayed. In the icons, display such as thumbnails indicating overviews of display details of the windows 320f and 320h may be executed. The display of the window management bar 340 can be dynamically changed to reflect a current state of the display screen 310h by changing the number of windows to be displayed on the display screen 310h or changing the window users of the windows. The user can easily ascertain the number of windows 320f and 320h the window users of the windows 320f and 320h, and the like currently displayed on the display screen 310h with reference to the window management bar 340. In FIG. 14, to clarify a correspondence relation between the display of the window management bar 340 and the windows 320f and 320h displayed on the display screen 310h, numbers are assigned inside the icons indicating the windows 320f and 320h and the windows 320f and 320h for convenience.

A manipulation input of generating or erasing the windows 320f and 320h through the window management bar 340 may be executed. For example, as shown in FIG. 14, GUI components such as a window generation button 341 and a window erasure button 342 can be displayed in the window management bar 340. The window generation button 341 and the window erasure button 342 may be installed for each window user. For example, when the window generation button 341 is selected, a window of which a corresponding window user is set is newly generated. For example, when the window erasure button 342 is selected, windows of which a corresponding window user is set are erased en bloc. In this way, a manipulation input can be executed to manage the windows for each window user through the window management bar 340, and thus the management of the windows by the users is easier. The manipulation input of the windows executed through the window management bar 340 is not limited to this example. For example, GUI components may be installed in the window management bar 340 to execute various different manipulation inputs on the windows, for example, by minimizing and displaying windows in which a certain window user is set en bloc.

The modification example in which the window management bar is displayed has been described above with reference to FIG. 14. As described above, according to the modification example, by displaying the window management bar 340 through which the windows displayed on the display screen are managed en bloc for each window user, it is possible to more easily ascertain the currently displayed windows and it is possible to execute the manipulation input on the windows en block for each window user.

(5-5. Hiding of Display Details of Window in Accordance with Approach of Person)

As described in the foregoing section (1. Overview of information processing system), for example, a display screen is displayed on a desk, a large-scale display, or the like in the information processing system 100 according to the embodiment. Accordingly, a situation in which a display screen is viewed by many unspecified people depending on the installation position or configuration of the information processing system 100 is considered. On the other hand, in the information processing system 100, a use method in which a display screen is shared between a plurality of users is assumed. However, for example, only specific users are desired to be permitted to view a display screen in some cases depending on display details of a window.

Figure 15B:
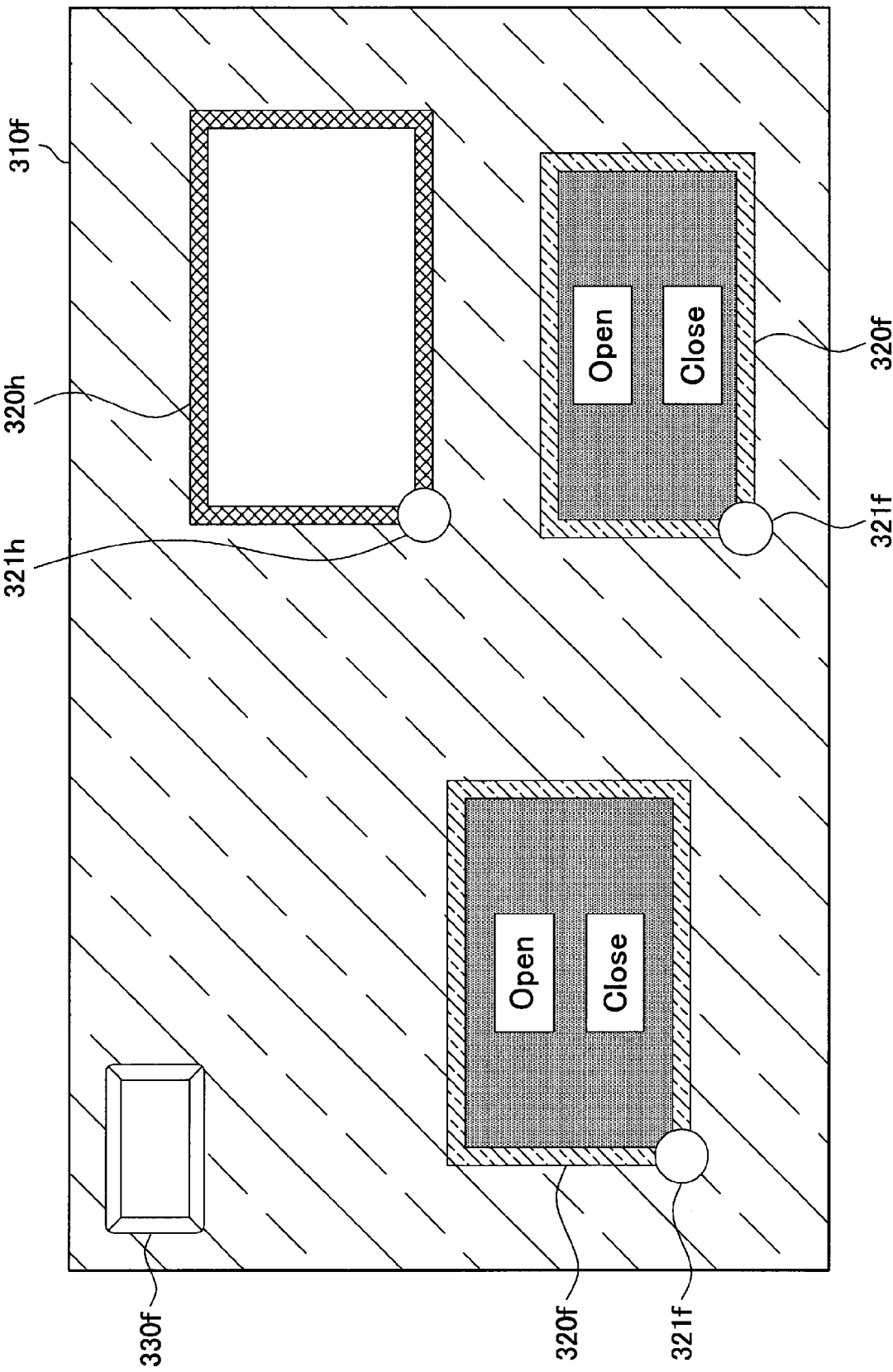
FIG. 15B is a diagram showing an example of a display screen on which display details of the window are hidden due to approach of a person in a modification example.

Accordingly, in a modification example, display control is executed to hide display details of a window according to a window user when a person approaches. The modification example in which display details of a window are hidden due to approach of a person will be described with reference to FIGS. 15A and 15B. FIGS. 15A and 15B are diagrams illustrating an example of a display screen on which display details of the window are hidden due to approach of a person in a modification example.

FIG. 15A shows an example of the display screen 310f of the system user "Father." In the example shown in FIG. 15A, two windows 320f of which the window user is "Father" and one window 320h of which the window user is "Family" are displayed on the display screen 310f For example, information which is to be browsed by an adult and is not desired to be viewed by others (for example, children) is assumed to be displayed in the window 320f of which the window user is "Father." Conversely, for example, information which has no particular restriction on users and is not problematic even when the information is viewed by children is assumed to be displayed in the window 320h of which the window user is "Family."

For example, a parent is assumed to browse information or execute a task using the display screen 310f shown in FIG. 15A. In the modification example, when another person (for example, a child) approaches in this state, for example, display of the display screen 310f transitions as shown in FIG. 15B. FIG. 15B shows an example of the display screen 310f when the person approaches. As shown in FIG. 15B, display details of the window 320f are hidden due to the approach of the person. In the example shown in FIG. 15B, the display region of the information in the window is painted out to hide the display details of the window 320f. In the window 320f in which the display details are hidden, for example, buttons indicating display of "Open" and "Close" may be displayed. When the user selects the buttons, display or non-display of the window 320f can be instructed. In this way, by hiding the display details of the window 320f due to the approach of the person, it is possible to maintain confidentiality of the information.

Here, in the modification example, for example, it is possible to set whether to hide display details due to approach of a person for each window user set in the window. In the example shown in FIG. 15B, the display details of the window of which the window user is "Father" are hidden due to the approach of the person, but the display of the window of which the window user is "Family" is set to be unchanged irrespective of the approach of the person. This is because the information to be browsed by only an adult is assumed to be displayed in the window 320f of which the window user is "Father." Whether display details are hidden in regard to which window user of a window due to approach of a person may be arbitrarily settable.

The approach of a person can be detected by, for example, the input unit 220 shown in FIG. 6. For example, when the input unit 220 includes an imaging device, the approach of a person can be detected based on a captured image obtained by the imaging device. For example, the input unit 220 may include various sensors that detect a motion of a nearby object, such as a distance sensor, and the approach of a person may be detected based on detection results of the sensors.

The modification example in which the display details of the window are hidden due to the approach of the person has been described above with reference to FIGS. 15A and 15B.

As described above, according to the modification example, the display details of the window are hidden according to the approach of the person. The window of which the display details are hidden may be arbitrarily settable for each window user. Accordingly, by executing setting such that the display details of the window of the window user in which relatively important information is assumed to be displayed are hidden according to the approach of the person, it is possible to prevent the information from being leaked more appropriately.

In the modification example, the display details of the window may be hidden only when an approaching person is determined and a specific person approaches. Any of various known schemes can be applied to the process of determining an approaching person. For example, face recognition based on an image captured by an imaging device or personal recognition based on audio collected by an audio input device such as a microphone may be executed. The imaging device or the audio input device can be included in, for example, the input unit 220 shown in FIG. 6. When an approaching person carries a portable terminal such as a wearable terminal or a smartphone, the information processing system 100 and the portable terminal may communicate and personal recognition may be executed based on information regarding an owner registered in the portable terminal. Alternatively, when the information processing system 100 is used in an environment in which entry and exit of employees can be managed as in a company, an entry and exit management system and the information processing system 100 may cooperate so that display details of a window can be hidden using, as a trigger, the fact that information indicating that employees other than predesignated employees enter a room is supplied from the entry and exit management system. In this way, by determining the approaching person and determining whether to hide the display details of the window according to the determination result, the process of hiding the display details of the window is not executed in an unnecessary case even when the approach of the person is detected, and thus a task can be executed more efficiently.

In the above description, the case in which the window 320f is painted out to hide the display details of the window has been described, but the modification example is not limited to this example. The display details of the window may be hidden in accordance with other methods. For example, the display of the window 320f may be completely erased. For example, the window 320f may be iconized and displayed so that the display details are not invisible.

(5-6. Display of Window User in Tab)

In general, a tab display function is mounted on an application such as a web browser. The tab display function is a function of displaying each web page as a "tab" when a plurality of web pages are displayed in one window. When a tab is selected, a web page corresponding to the selected tab is displayed in a main display portion of a window. When a tab is selected and the selected tab is manipulated to detach the tab from a window (that is, a drag manipulation is executed to detach the tab from the window), a window can be generated for each web page corresponding to the tab. In contrast, when a tab is selected and the selected tab is manipulated to superimpose the tab on another window (that is, a drag manipulation is executed to superimpose the tab on the other window), the tab can be moved to the other window. That is, the tap can be moved between the windows. In the window which is a tab movement destination, the original tabs and the new moved tab can all be displayed.

On the other hand, as described in the foregoing section (1-2. Display control example), in the embodiment, the window user can be set for each window and user display indicating the window user is executed in the window, for example, by showing the edge of the window with a different color for each window user. As described above, an operation screen of an application corresponds to a tab in the tab display function, for example, each tab such as a web page. Therefore, there is a one-to-one correspondence between the tab and the window. Accordingly, in the modification example, the user display indicating the window user of the window corresponding to the tab is executed in not only the window but also the tab.

Figure 16:
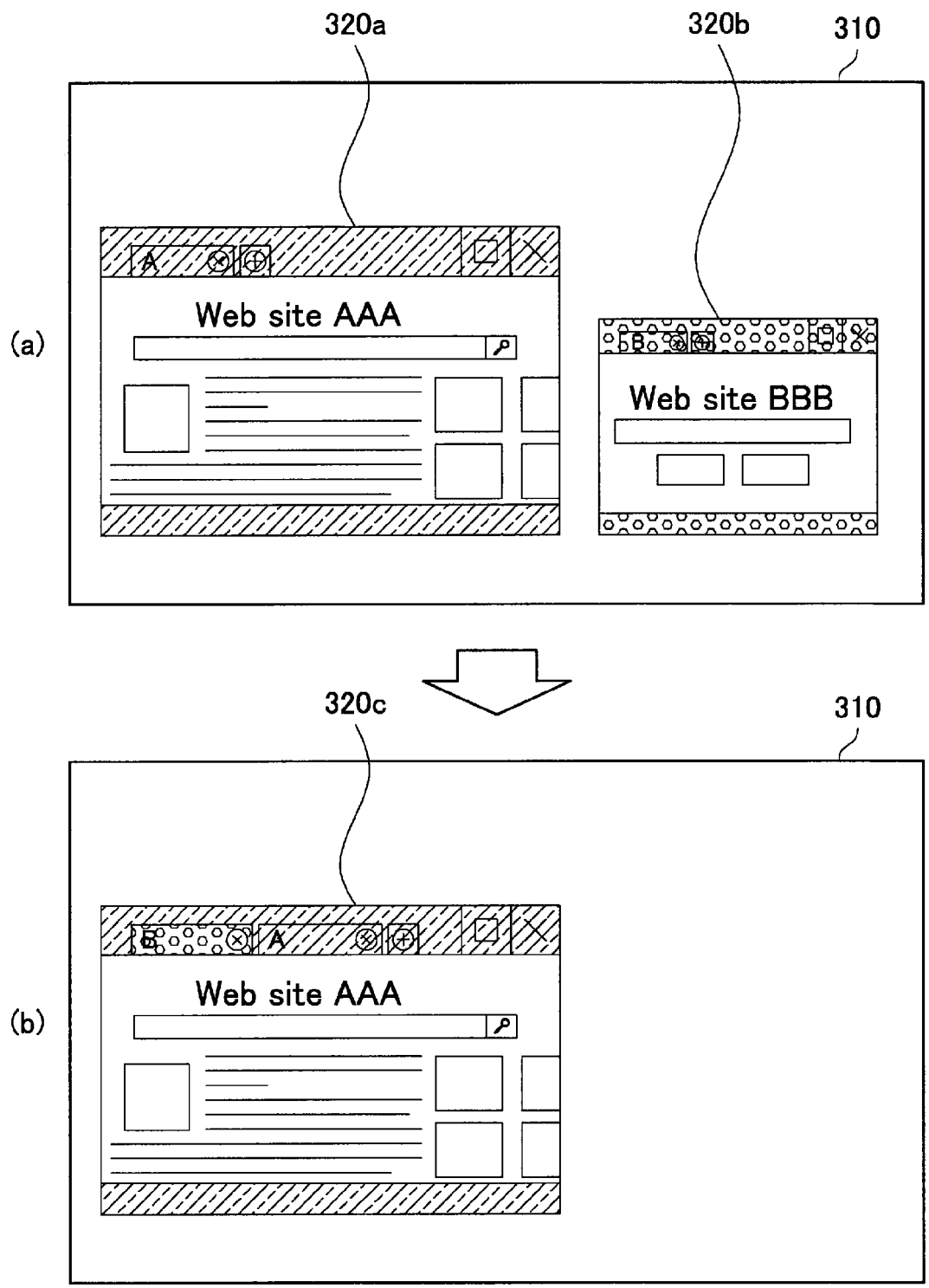
FIG. 16 is a diagram showing an example of a display screen on which display representing a window user is executed in a tab in a modification example.

The modification example in which display representing the window user is executed in the tab will be described with reference to FIG. 16. FIG. 16 is a diagram showing an example of a display screen on which display representing the window user is executed in a tab in a modification example.

Referring to FIG. 16(a), windows 320a and 320b are displayed in the display screen 310. Different window users are set in the windows 320a and 320b. Different colors are assigned to frame portions of the windows 320a and 320b to indicate that the different windows are set in the windows 320a and 320b. In FIG. 16(a), the assignment of the different colors is expressed by assigning different kinds of hatchings.

In this state, a drag manipulation is executed on the tab of the window 320b and the tab is moved so that the tab is superimposed on the window 320a. The similar function to the tab display function mounted on a general web browser or the like is mounted on the windows 320a and 320b, and thus the tab of the window 320b can be integrated with the window 320a by superimposing the tab of the window 320b on the window 320a.

FIG. 16(b) shows a form in which a window 320c generated by moving the tab of the window 320b is displayed on the display screen 310. In the window 320c, the original tab of the window 320a and the tab in the window 320b are displayed together. In the example shown in FIG. 16, there is only one tab in the window 320b which is a tab movement source. Therefore, after the tab is moved, the display of the window 320b is erased. When there are a plurality of tabs in the window 320b and only some of the tabs are moved, the display of the windows 32b may remain with the number of tabs reduced.

As shown in FIG. 16(b), in the modification example, user display representing the window user of the window corresponding to the tab is executed in the tab. For example, a color representing the window user is assigned for each tab. In the example shown in FIG. 16(b), the assignment of the different color for each tab is expressed by assigning different kinds of hatchings. However, the method of representing the window user for each tab is not limited to this example. For example, an icon or the like representing the window user may be assigned to the tab.

The modification example in which the user display representing the window user is executed in the tab has been described above with reference to FIG. 16. As described above, according to the modification example, the display representing the window user of the window corresponding to the tab is also executed in the tab. Accordingly, even when the tab display function is mounted and the window is managed with the tab, the window user of the window corresponding to the tab can be ascertained before the tab is actually selected and the details are displayed. Accordingly, the use method in which convenience for the user is higher can be supplied.

(5-7. Cooperation of Plurality of Information Processing Systems)

Figure 17:
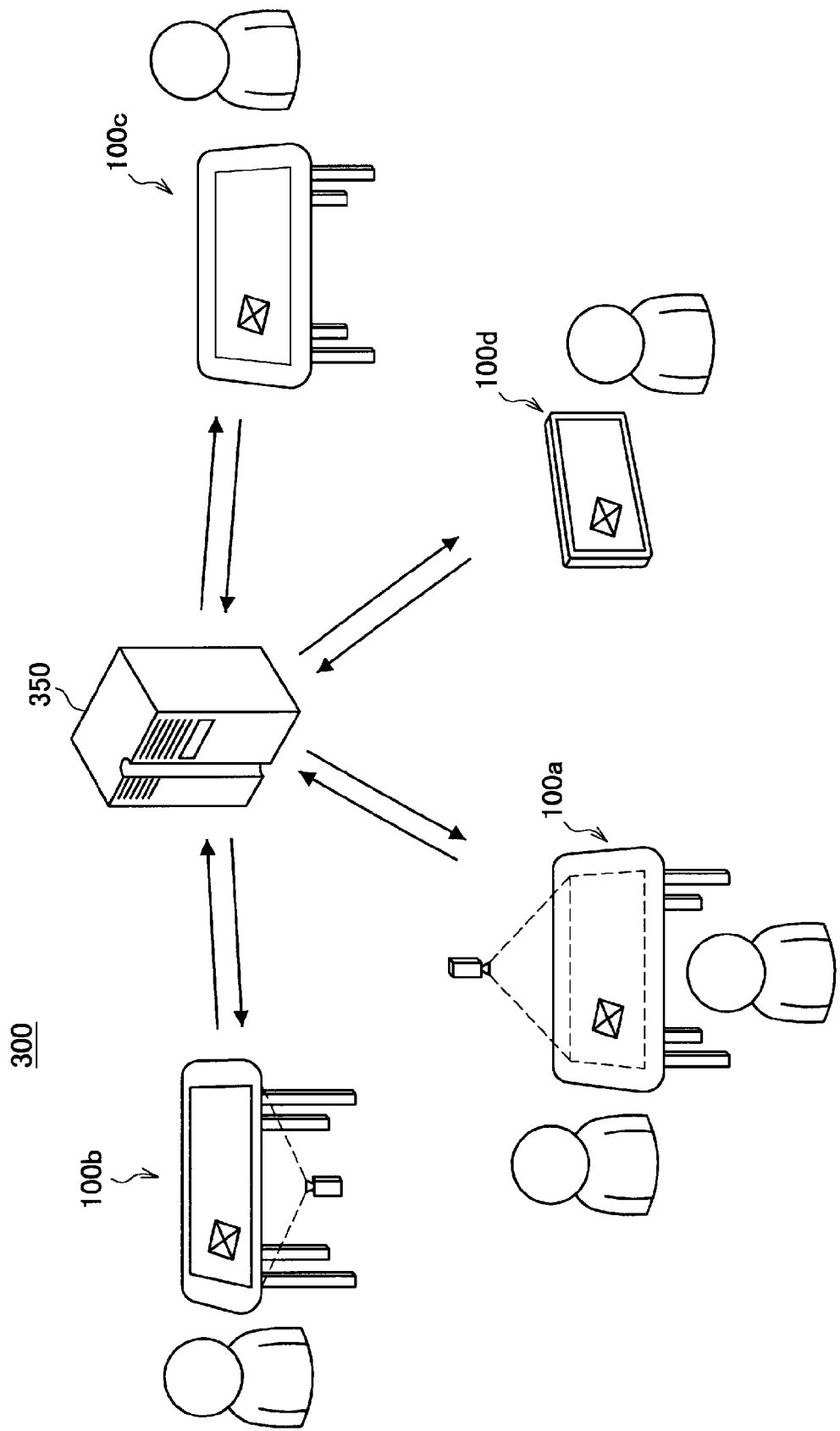
FIG. 17 is a diagram showing an example of the configuration of a system configured such that a plurality of information processing systems cooperate.

The information processing system 100 according to the embodiment may be used alone or a plurality of such information processing systems 100 may be used in cooperation. A modification example in which the plurality of information processing systems 100 are used in cooperation will be described with reference to FIG. 17. FIG. 17 is a diagram showing an example of the configuration of a system 300 configured such that the plurality of information processing systems 100 cooperate.

Referring to FIG. 17, the system 300 according to the modification example is configured such that a plurality of information processing systems 100a, 100b, 100c, and 100d are connected to each other via a server 350. The information processing systems 100a, 100b, 100c, and 100d correspond to the information processing systems 100a, 100b, 100c, and 100d shown in FIGS. 1 to 4, respectively, and thus the detailed description thereof will be omitted. The number of information processing systems 100a, 100b, 100c, and 100d included in the system 300 or the configurations of the information processing systems 100a, 100b, 100c, and 100d are not limited to the shown examples, but any setting may be possible.

The server 350 integratedly manages the system 300 and operates to cause the plurality of information processing systems 100a, 100b, 100c, and 100d to cooperate with one another. The server 350 can be installed on, for example, a network (so-called cloud) and can be connected to the information processing systems 100a, 100b, 100c, and 100d to communicate in accordance with various wired or wireless communication schemes. The user information storage unit 230 and the control unit 240 shown in FIG. 6 may be mounted on, for example, the server 350. That is, the user information storage unit 230 may be realized by a storage device mounted on the server 350 and the control unit 240 may be realized by a processor mounted on the server 350.

In the system 300, display control of the plurality of information processing systems 100a, 100b, 100c, and 100d is executed in an interlocking manner by the server 350. For example, as shown in FIG. 17, the same information can be displayed on the display screens of the information processing systems 100a, 100b, 100c, and 100d. For example, when a user of the information processing system 100a moves the window on the display screen of the information processing system 100a or changes the window user of the window, the change in display of the window made with the manipulation is reflected in the display screens of all the information processing systems 100a, 100b, 100c, and 100d. In this way, by sharing the display screen among the plurality of information processing systems 100a, 100b, 100c, and 100d, for example, it is possible to share the same display screen between, for example, users located in remote locations.

The server 350 may realize communication between the users of the information processing systems 100a, 100b, 100c, and 100d, for example, using a function such as telephone calling or chatting. By establishing communication between the users while they share a display screen, it is possible to realize a so-called television conference system (video conference system).

The modification example in which the plurality of information processing systems 100 are used in cooperation has been described above with reference to FIG. 17. As described above, according to the modification example, the same display screen is simultaneously displayed in distant places when the plurality of information processing systems 100 operate in cooperation with one another. Accordingly, the display screen can be shared between the users located in the remote locations. Accordingly, for example, it is possible to realize a use method in which the degree of freedom is high by the information processing systems 100 as in a television conference system.

(6. Hardware Configuration)

Next, a hardware configuration of an information processing system according to an embodiment will be described with reference to FIG. 18. FIG. 18 is a block diagram showing an example of the hardware configuration of the information processing system according to an embodiment. The illustrated information processing system 900 can realize, for example, the information processing system 100 of the above-described embodiments.

The information processing system 900 includes a CPU 901, ROM (Read Only Memory) 903, and RAM (Random Access Memory) 905. In addition, the information processing system 900 may include a host bus 907, a bridge 909, an external bus 911, an interface 913, an input device 915, an output device 917, a storage device 919, a drive 921, a connection port 923, a communication device 925, an imaging device 933 and a sensor 935 as necessary. The information processing system 900 may include a processing circuit such as a DSP or ASIC (Application Specific Integrated Circuit), alternatively or in addition to the CPU 901.

The CPU 901 serves as an arithmetic processor and a controller, and controls all or some operations in the information processing system 900 in accordance with various programs recorded in the ROM 903, the RAM 905, the storage device 919 or a removable recording medium 927. The ROM 903 stores programs and arithmetic parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909. In the present embodiment, the CPU 901 is implemented as the control unit 240 shown in FIG. 6, as an example.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing system 900. Furthermore, the input device 915 includes an input control circuit which generates an input signal on the basis of the information which is input by a user and outputs the input signal to the CPU 901. By operating the input device 915, a user can input various types of data to the information processing system 900 or issue instructions for causing the information processing system 900 to perform a processing operation. In the embodiment, the input device 915 can configure, for example, the input unit 220 shown in FIG. 6. For example, the user can execute various manipulation inputs on a window or a GUI component on a display screen through the input device 915.

The output device 917 includes a device capable of visually or audibly notifying the user of acquired information. The output device 917 may include a display device such as an LCD, a PDP (Plasma Display Panel), an organic EL displays, a lamp, and a lighting, a projector, an audio output device such as a speaker or a headphone, and a peripheral device such as a printer. The output device 917 may output the results obtained from the process of the information processing system 900 in a form of a video such as text or an image, and an audio such as voice or sound. In the embodiment, the display device can configure, for example, the output unit 210 shown in FIG. 6. In the embodiment, for example, audio according to an application executed in a window can be output from the audio output device.

The storage device 919 is a device for data storage which is configured as an example of a storage unit of the information processing system 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside. In the embodiment, the storage device 919 can configure, for example, the user information storage unit 230 shown in FIG. 6. For example, the storage device 919 stores information regarding a system user and a window user. The storage device 919 can store various kinds of information processed in the control unit 240.

The drive 921 is a reader/writer for the removable recording medium 927 such as a magnetic disk, an optical disk, a magneto-optical disk, or a semiconductor memory, and is embedded in the information processing system 900 or attached externally thereto. The drive 921 reads information recorded in the removable recording medium 927 attached thereto, and outputs the read information to the RAM 905. Further, the drive 921 writes in the removable recording medium 927 attached thereto. In the present embodiment, for example, the drive 921 can read various types of information that are processed by the control unit 240 shown in FIG. 6 and various processing results obtained by the control unit 240 from the removable recording medium 927 and write them in the removable recording medium 927.

The connection port 923 is a port used to directly connect devices to the information processing system 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (registered trademark) (High-Definition Multimedia Interface) port, and so on. The connection of the external connection device 929 to the connection port 923 makes it possible to exchange various data between the information processing system 900 and the external connection device 929. In the present embodiment, for example, various types of information that are processed by the control unit 240 shown in FIG. 6 and various processing results obtained by the control unit 240 may be transmitted to and received from the external connection device 929 through the connection port 923.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like. In the present embodiment, for example, the communication device 925 may transmit and receive various types of information that are processed by the control unit 240 shown in FIG. 6 and various processing results obtained by the control unit 240 to and from another external device through the communication network 931. For example, when the personal recognition of the user in the information processing system 900 is executed based on information regarding an owner of a portable terminal carried by the user, the information processing system 900 can acquire information necessary for the personal recognition by communicating with the portable terminal using the communication device 925. For example, in the system 300 described in the foregoing section (5-7. Cooperation of plurality of information processing systems), the information processing system 900 can communicate with the server 350 using the communication device 925.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images. In the present embodiment, the imaging device 933 is implemented as the input unit 220 shown in FIG. 6, as an example.

The sensor 935 is any of various sensors such as an acceleration sensor, a gyro sensor, a geomagnetic sensor, an optical sensor, a sound sensor, or a distance sensor, for example. The sensor 935 acquires information regarding the state of the information processing system 900, such as the orientation of the case of the information processing system 900, as well as information regarding the environment surrounding the information processing system 900, such as the brightness or noise surrounding the information processing system 900, for example. The sensor 935 may also include a Global Positioning System (GPS) sensor that receives GPS signals and measures the latitude, longitude, and altitude of the apparatus. In the embodiment, the sensor 935 can configure, for example, the input unit 220 shown in FIG. 6. In the embodiment, for example, the position or a motion of a user located near a display screen may be detected by the sensor 935. Based on the detection result, a process such as the setting of the window user in the window or the setting of the use region for each user described in, for example, the foregoing section (5-2. Setting of window user in accordance with display position) may be executed.

The foregoing thus illustrates an exemplary hardware configuration of the information processing system 900. Each of the above components may be realized using general-purpose members, but may also be realized in hardware specialized in the function of each component. Such a configuration may also be modified as appropriate according to the technological level at the time of the implementation.

It is possible to create a computer program used to implement each function of the information processing system 900 as described above and to install the computer program in PC or the like. It is also possible to provide a computer readable recording medium that stores such computer program therein. An example of the recording medium includes a magnetic disk, an optical disk, a magneto-optical disk, and flash memory. The computer program described above may be delivered via a network without use of the recording medium.

(7. Supplement)

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device including:

a user information management unit configured to set a user in a window in which an operation screen of an application is displayed and grant at least one of execution authority of the application set in the window according to the user and browsing authority of content in the window to the window.

(2)

The information processing device according to (1), wherein the user information management unit restricts execution of a predetermined process in an application to be executed in the window by granting the execution authority to the window.

(3)

The information processing device according to (1) or (2), further including:

a display control unit configured to display user display indicating the user set in the window on a display screen along with the window.

(4)

The information processing device according to (3), wherein the user display includes at least one of display in which an edge of the window is a different color for each of the users and an icon indicating the user.

(5)

The information processing device according to (3) or (4), wherein the display control unit further displays a window management bar to manage the plurality of windows en bloc for each of the users set in the windows.

(6)

The information processing device according to (5), wherein a GUI component for manipulating the plurality of windows for each of the users set in the windows is displayed in the window management bar.

(7)

The information processing device according to any one of (3) to (6), wherein the display control unit hides display details of the window in which a specific user is set when approach of a person is detected.

(8)

The information processing device according to any one of (3) to (7), wherein, when a plurality of tabs corresponding to the plurality of windows are displayed along with one of the windows, the display control unit executes the user display indicating the user of the window corresponding to each tab on each of the tabs.

(9)

The information processing device according to any one of (3) to (8), wherein the user is able to log in to a system including the information processing device with an account different for each of the users, and the display control unit displays the different display screen according to the user logged in to the system.

(10)

The information processing device according to (9), wherein display details of the display screen are managed for each user logged in to the system, and the display control unit reproduces and displays the display details of the display screen at a time point of a previous logout when the user logged in to the system is changed and the display screen is switched.

(11)

The information processing device according to (9), wherein the display control unit displays the window on the display screen before user switch even on the display screen after the user switch when the user logged in to the system is changed and the display screen is switched.

(12)

The information processing device according to any one of (9) to (11), wherein, when the window is newly generated, the user information management unit sets the user logged in to the system as a user of the newly generated window.

(13)

The information processing device according to any one of (1) to (11), wherein, when the window is derived and newly generated from the window that has already been displayed, the user information management unit sets the user set in the window that has already been displayed as a user of the newly generated window.

(14)

The information processing device according to any one of (1) to (11), wherein the user information management unit sets the user in the window based on a result of personal recognition of the user manipulating the window.

(15)

The information processing device according to any one of (3) to (11), wherein the display screen including the window is partitioned into a plurality of use regions corresponding to the respective users, and the user information management unit sets the user corresponding to the use region in which the window is displayed as a user of the window.

(16)

The information processing device according to (15), wherein, when the user corresponding to the use region is not identical to the user set in the window displayed in the use region, the display control unit iconizes and displays the window.

(17)

The information processing device according to any one of (1) to (16), wherein, in an application in which purchase of an article is possible, the execution authority includes details restricting the purchase of the article according to a usable upper limit amount of money.

(18)

The information processing device according to any one of (1) to (17), wherein identical display screens including the window are simultaneously displayed at a plurality of mutually distant locations.

(19)

An information processing method including: by a processor, setting a user in a window in which an operation screen of an application is displayed and granting at least one of execution authority of the application set in the window according to the user and browsing authority of content in the window to the window.

(20)

A program causing a processor of a computer to realize:

a function of setting a user in a window in which an operation screen of an application is displayed and granting at least one of execution authority of the application set in the window according to the user and browsing authority of content in the window to the window.

REFERENCE SIGNS LIST 100, 100a, 100b, 100c, 100d, 900 information processing system
110, 110a, 110b, 110c, 220 input unit
130, 130a, 130b, 130c, 130d, 210 output unit
230 user information storage unit
240 control unit
241 manipulation information acquisition unit
242 user information management unit
243 window processing unit
244 display control unit
310, 310f, 310h, 310m display screen
320, 320f, 320h, 320m, 320s, 320e window

The invention claimed is:

1. An information processing device, comprising:
circuitry configured to:
control a display device to display a first window of a plurality of windows on a display screen, wherein the first window includes an operation screen of a first application of a plurality of applications;
receive a captured image of a manipulator, wherein the manipulator is associated with a user operation on the first window of the display screen, and the user operation is associated with a first user of a plurality of users;
acquire manipulation information based on the captured image;
set the first user to the first window based on the manipulation information;
grant at least one of execution authority of the first application to the first window based on the set first user or browsing authority of content in the first window to the first window based on the set first user; and
control the display device to display the plurality of windows as a user display on the display screen, wherein
the user display indicates the plurality of users,
an edge of the first window of the plurality of windows has a first color,
an edge of a second window of the plurality of windows has a second color different from the first color, and
the second window is associated with a second user of the plurality of users.

2. The information processing device according to claim 1, wherein the circuitry is further configured to restrict execution of a second application of the plurality of applications in the first window based on the grant of the execution authority of the first application to the first window.

3. The information processing device according to claim 1, wherein the first window of the plurality of windows includes an icon that indicates the set first user.

4. The information processing device according to claim 1, wherein the circuitry is further configured to control the display device to display a window management bar to manage the plurality of windows for each user of the plurality of users.

5. The information processing device according to claim 4, wherein the circuitry is further configured to control the display device to display a Graphical User Interface (GUI) component, in the window management bar, to manipulate the plurality of windows for each user of the plurality of users.

6. The information processing device according to claim 1, wherein the circuitry is further configured to:
detect an approach of the second user of the plurality of users towards the display screen; and
hide a plurality of display details of the first window based on the detection.

7. The information processing device according to claim 1, wherein the circuitry is further configured to control the display device to display a plurality of tabs corresponding to the plurality of windows along with the first window, wherein
a first tab of the plurality of tabs corresponds to the first window,
a second tab of the plurality of tabs corresponds to the second window, and
a color of the first tab is different from a color of the second tab.

8. The information processing device according to claim 1, wherein the display of the first window is based on a log in of the first user to a system with an account different for each user of the plurality of users, and the system includes the information processing device.

9. The information processing device according to claim 8, wherein the circuitry is further configured to:
manage a plurality of display details of the display screen for each user of the plurality of users logged in to the system; and
control, based on a change of the login of the first user and a switch of a display of the display screen, the display device to display the plurality of display details of the display screen at a time point of a previous logout.

10. The information processing device according to claim 8, wherein the circuitry is further configured to control, based on a change of the login of the first user and a switch of a display of the display screen, the display device to display the second window on the display screen.

11. The information processing device according to claim 8, wherein the circuitry is further configured to:
generate a new window of the display screen; and
set the first user that is logged in to the system as a user of the new window.

12. The information processing device according to claim 1, wherein the circuitry is further configured to:
   generate a new window based on a derivation of the first window; and
   set the first user as a user of the new window.

13. The information processing device according to claim 1, wherein the circuitry is further configured to set the first user to the first window based on a result of personal recognition of the first user that manipulates the first window.

14. The information processing device according to claim 1, wherein the circuitry is further configured to:
   divide the display screen including the first window into a plurality of use regions corresponding to a respective user of the plurality of users; and
   set the second user corresponding to a use region of the plurality of use regions in which the first window is displayed, as a user of the first window.

15. The information processing device according to claim 14, wherein the circuitry is further configured to control, based on a determination that the second user is different from the first user, the display device to display an icon of the first window.

16. The information processing device according to claim 1, wherein the circuitry is further configured to restrict purchase of an article based on a usable upper limit amount of money.

17. The information processing device according to claim 1, wherein the circuitry is further configured to control the display device to display the plurality of windows simultaneously at a plurality of mutually distant locations.

18. The information processing device according to claim 1, wherein the manipulator comprises one of a hand of the first user or a stylus.

19. An information processing method, comprising:
   in an information processing device:
      controlling a display device to display a first window of a plurality of windows on a display screen, wherein the first window includes an operation screen of an application of a plurality of applications;
      receiving a captured image of a manipulator, wherein
         the manipulator is associated with a user operation on the first window of the display screen, and
         the user operation is associated with a first user of a plurality of users;
      acquiring manipulation information based on the captured image;
      setting the first user to the first window based on the manipulation information;
      granting at least one of execution authority of the application to the first window based on the set first user or browsing authority of content in the first window to the first window based on the set first user; and
      controlling the display device to display the plurality of windows as a user display on the display screen, wherein
         the user display indicates the plurality of users,
         an edge of the first window of the plurality of windows has a first color,
         an edge of a second window of the plurality of windows has a second color different from the first color, and
         the second window is associated with a second user of the plurality of users.

20. A non-transitory computer-readable medium having stored thereon computer-executable instructions that, when executed by a processor, cause the processor to execute operations, the operations comprising:
   controlling a display device to display a first window of a plurality of windows on a display screen, wherein the first window includes an operation screen of an application of a plurality of applications;
   receiving a captured image of a manipulator, wherein
      the manipulator is associated with a user operation on the first window of the display screen, and
      the user operation is associated with a first user of a plurality of users;
   acquiring manipulation information based on the captured image;
   setting the first user to the first window based on the manipulation information;
   granting at least one of execution authority of the application to the first window based on the set first user or browsing authority of content in the first window to the first window based on the set first user; and
   controlling the display device to display the plurality of windows as a user display on the display screen, wherein
      the user display indicates the plurality of users,
      an edge of the first window of the plurality of windows has a first color,
      an edge of a second window of the plurality of windows has a second color different from the first color, and
      the second window is associated with a second user of the plurality of users.

* * * * *